(12) United States Patent
Hu et al.

(10) Patent No.: US 12,113,823 B2
(45) Date of Patent: Oct. 8, 2024

(54) REMOTE ATTESTATION METHOD AND DEVICE FOR COMPOSITE DEVICE

(71) Applicant: Huawei Technologies Co., Ltd., Shenzhen (CN)

(72) Inventors: Junli Hu, Nanjing (CN); Wei Pan, Nanjing (CN); Haifei Zeng, Nanjing (CN); Yuguo Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 274 days.

(21) Appl. No.: 17/720,848

(22) Filed: Apr. 14, 2022

(65) Prior Publication Data

US 2022/0237295 A1    Jul. 28, 2022

Related U.S. Application Data

(63) Continuation of application No. PCT/CN2020/116936, filed on Sep. 22, 2020.

(30) Foreign Application Priority Data

Oct. 17, 2019 (CN) .......................... 201910990240.3
Nov. 8, 2019 (CN) .......................... 201911089398.X

(51) Int. Cl.
*H04L 9/40* (2022.01)
*G06F 1/3206* (2019.01)
(Continued)

(52) U.S. Cl.
CPC ........ *H04L 63/1433* (2013.01); *G06F 1/3206* (2013.01); *G06F 21/57* (2013.01); *G06F 21/606* (2013.01)

(58) Field of Classification Search
CPC ...... G06F 21/57; G06F 1/3206; G06F 21/606; H04L 63/1433; H04L 9/3236; H04L 9/3263
See application file for complete search history.

(56) References Cited

U.S. PATENT DOCUMENTS 5,784,566 A    7/1998  Viavant et al.
9,276,905 B2   3/2016  Coker, II et al.
(Continued)

FOREIGN PATENT DOCUMENTS

CN    1658551 A       8/2005
CN    101043338 A     9/2007
(Continued)

OTHER PUBLICATIONS

Katsuno, Y., et al., "Layering Negotiations for Flexible Attestation," STC'06, Nov. 3, 2006, Alexandria, Virginia, USA, 4 pages.
(Continued)

*Primary Examiner* — Abiy Getachew
(74) *Attorney, Agent, or Firm* — Conley Rose, P.C.

(57) ABSTRACT

A remote attestation method includes a first unit of a composite device obtains first measurement information of a second unit of the composite device. The first unit performs, based on the first measurement information, trustworthiness attestation on the second unit to obtain a first attestation result, and the first unit sends the first attestation result to a remote attestation device. In this way, the first unit in the composite device has a remote attestation function, and may perform trustworthiness attestation on another unit in the composite device to which the first unit belongs.

19 Claims, 21 Drawing Sheets

(51) Int. Cl.
*G06F 21/57* (2013.01)
*G06F 21/60* (2013.01)

(56) References Cited

U.S. PATENT DOCUMENTS

| | | | |
|---|---|---|---|
| 2005/0132202 A1* | 6/2005 | Dillaway | H04L 9/3265 |
| | | | 713/179 |
| 2005/0210252 A1 | 9/2005 | Freeman et al. | |
| 2008/0178004 A1 | 7/2008 | Wei et al. | |
| 2010/0031047 A1 | 2/2010 | Coker, II et al. | |
| 2010/0082984 A1 | 4/2010 | Ellison et al. | |
| 2012/0011352 A1 | 1/2012 | Shimatani | |
| 2012/0036553 A1 | 2/2012 | Xiao et al. | |
| 2012/0131334 A1 | 5/2012 | Haikney et al. | |
| 2012/0246470 A1* | 9/2012 | Nicolson | G06F 21/57 |
| | | | 713/158 |
| 2016/0087882 A1* | 3/2016 | Bragg | H04L 45/50 |
| | | | 370/392 |
| 2016/0164862 A1 | 6/2016 | Berger et al. | |
| 2017/0257365 A1 | 9/2017 | Gonzalez et al. | |
| 2018/0136943 A1* | 5/2018 | Chew | G06F 1/24 |
| 2019/0042779 A1 | 2/2019 | Agerstam et al. | |
| 2019/0114431 A1 | 4/2019 | Cheng et al. | |
| 2019/0123903 A1 | 4/2019 | Fu et al. | |
| 2020/0252503 A1* | 8/2020 | Li | H04M 3/2281 |
| 2020/0260278 A1 | 8/2020 | Du et al. | |

FOREIGN PATENT DOCUMENTS

| | | |
|---|---|---|
| CN | 101477602 A | 7/2009 |
| CN | 101610273 A | 12/2009 |
| CN | 101951388 A | 1/2011 |
| CN | 102271320 A | 12/2011 |
| CN | 103501303 A | 1/2014 |
| CN | 103560887 A | 2/2014 |
| CN | 103841198 A | 6/2014 |
| CN | 104969528 A | 10/2015 |
| CN | 105159744 A | 12/2015 |
| CN | 105227319 A | 1/2016 |
| CN | 109005035 A | 12/2018 |
| CN | 109669734 A | 4/2019 |
| CN | 109714168 A | 5/2019 |
| CN | 109729523 A | 5/2019 |
| CN | 110309659 A | 10/2019 |
| CN | 110321741 A | 10/2019 |
| EP | 3916593 A1 | 12/2021 |
| JP | H06261033 A | 9/1994 |
| JP | 2005269656 A | 9/2005 |
| JP | 2012253817 A | 12/2012 |
| JP | 2016502373 A | 1/2016 |
| WO | 2008126183 A1 | 10/2008 |
| WO | 2010113266 A1 | 10/2010 |
| WO | 2010118610 A1 | 10/2010 |
| WO | 2014105994 A2 | 7/2014 |
| WO | 2019084578 A1 | 5/2019 |

OTHER PUBLICATIONS

H. Birkholz et al, "Architecture and Reference Terminology for Remote Attestation Procedures," draft-birkholz-rats-architecture-01, Mar. 12, 2019, 36 pages.

H. Birkholz et al, "YANG Module for Basic Challenge-Response-based Remote Attestation Procedures," draft-birkholz-rats-basic-yang-module-01, Jul. 8, 2019, 36 pages.

H. Birkholz et al, "Reference Interaction Model for Challenge-Response-based Remote Attestation," draft-birkholz-rats-reference-interaction-model-00, Mar. 12, 2019, 9 pages.

H. Birkholz et al, "Reference Interaction Model for Challenge-Response-based Remote Attestation," draft-birkholz-rats-reference-interaction-model-01, Jul. 8, 2019, 13 pages.

Hu Hao et al, "Information-flow-based measurement architecture of trusted operating system," Journal of the Graduate School of the Chinese Academy of Sciences, vol. 26, No. 4, Jul. 2009, with the English Abstract, 8 pages.

Ma Na et al, "The Program about Security Protection of RTU Based on Trusted Computing," China Instrumentation, Issue 4, 2019, with the English Abstract, 4 pages.

* cited by examiner

REMOTE ATTESTATION METHOD AND DEVICE FOR COMPOSITE DEVICE

CROSS-REFERENCE TO RELATED APPLICATIONS

This is a continuation of International Patent Application No. PCT/CN2020/116936 filed on Sep. 22, 2020, which claims priority to Chinese Patent Application No. 201911089398.X filed on Nov. 8, 2019 and Chinese Patent Application No. 201910990240.3 filed on Oct. 17, 2019. All of the aforementioned applications are hereby incorporated by reference in their entireties.

TECHNICAL FIELD

This disclosure relates to the field of communications technologies, and in particular, to a remote attestation method for a composite device and a related device. The remote attestation method is used to perform remote attestation on system trustworthiness of a composite device.

BACKGROUND

As remote attestation for system trustworthiness is applied to more scenarios, in a current circumstance in which all things are connected, there are more network devices in systems such as the Internet of things (IoT), and system trustworthiness of each network device is critical for the entire system. These network devices also include many composite network devices.

In view of this, to improve trustworthiness of a composite device and trustworthiness of a network including the composite device, a remote attestation manner for the composite device urgently needs to be provided to appraise system trustworthiness of the composite device.

SUMMARY

In view of this, embodiments of this application provide a remote attestation method for a composite device and a related device, to appraise system trustworthiness of the composite device through remote attestation on the composite device, thereby improving reliability of an entire system.

In the embodiments of this application, trustworthiness attestation can be performed by a remote attestation device on each unit in the composite device, and some units in the composite device are assigned a remote attestation capability to perform trustworthiness attestation on another unit in the composite device. The composite device may include a router, a switch, or a packet transport network (PTN) device.

According to a first aspect, a remote attestation method for a composite device is provided. The composite device may include a first unit and a second unit. In this case, the composite device performs trustworthiness attestation in a remote attestation manner, which may further include that the first unit performs trustworthiness attestation on the second unit, and sends an attestation result to a remote attestation device. A specific remote attestation process may include: Step 1: The first unit obtains first measurement information of the second unit. Step 2: The first unit performs trustworthiness attestation on the second unit based on the first measurement information, to obtain a first attestation result. Step 3: The first unit sends the first attestation result to the remote attestation device. In this way, the first unit in the composite device has a remote attestation function, and may perform trustworthiness attestation on another unit (for example, the second unit) in the composite device to which the first unit belongs. In this case, the first unit in the composite device may directly send a trustworthiness attestation result of the other unit to the remote attestation device, and the remote attestation device only needs to receive the attestation result of the other unit that is sent by the first unit, without receiving measurement information of each unit and performing trustworthiness attestation on each unit, so that an amount of data that needs to be exchanged between the remote attestation device and the composite device in the remote attestation process can be effectively reduced, thereby improving remote attestation efficiency for the composite device to some extent.

The first unit may be a control plane, and the second unit may be a control plane or a forwarding plane. For example, when the composite device is a router, the first unit may be an active main control board, and the second unit may be a standby main control board, a forwarding board, or a service board.

Each unit in this application is actually a unit including a Trusted Platform Module (TPM) chip. For example, the first unit includes a first TPM chip, and the second unit includes a second TPM chip. Measurement information of the second unit includes measurement information stored in at least one platform configuration register (PCR) in the second TPM chip.

In an example, when a measurement process such as startup of the composite device is determinate, the first measurement information may include a first PCR value and a PCR reference value. In this case, in step 1 in the first aspect, that the first unit obtains first measurement information of the second unit may further include that the first unit obtains the first PCR value from the second unit, and the first unit obtains the PCR reference value from the remote attestation device or local secure storage space. In view of this, in step 2 in the first aspect, a specific process in which the first unit performs trustworthiness attestation on the second unit based on the first measurement information, to obtain the first attestation result may include that the first unit compares the first PCR value with the PCR reference value, to obtain the first attestation result, where if the first PCR value is consistent with the PCR reference value, the first attestation result represents that the second unit is trustworthy, or, if the first PCR value is inconsistent with the PCR reference value, the first attestation result represents that the second unit is untrustworthy. In this way, when the measurement process such as startup of the composite device is a determinate process, the first unit in the composite device performs trustworthiness attestation on the second unit based on the PCR reference value, thereby implementing fast, convenient, and effective remote attestation on the composite device.

The first PCR value may be a PCR value currently recorded by a trusted computing base (TCB) module built in the second unit, and the PCR reference value is a trusted PCR value of the second unit, and is used to check the first PCR value generated by the second unit.

In another example, when a measurement process of the composite device is uncertain, for example, a running process after the composite device is started up, the first measurement information may include a second PCR value and a first measurement log that are reported by the second unit, the first measurement log includes a first baseline value and information about a process of extending the first baseline value to obtain the second PCR value, the first baseline value is a baseline value reported by the second unit, the first measurement information further includes a second baseline value, the second baseline value is a trusted baseline value of the second unit, and the second baseline value is used to check the first baseline value. In this case, in step 1 in the first aspect, that the first unit obtains first measurement information of the second unit may further include that the first unit obtains the second PCR value and the first measurement log from the second unit, where the first measurement log includes the first baseline value and the information about the process of extending the first baseline value to obtain the second PCR value, and the first unit obtains the second baseline value from the remote attestation device or local secure storage space. In view of this, in step 2 in the first aspect, a specific process in which the first unit performs trustworthiness attestation on the second unit based on the first measurement information, to obtain the first attestation result may include that the first unit calculates a third PCR value based on the first measurement log, the first unit compares the second PCR value with the third PCR value, and if the second PCR value is consistent with the third PCR value, the first unit compares the second baseline value with the first baseline value, to obtain the first attestation result, or, if the second PCR value is inconsistent with the third PCR value, the first unit may not compare the second baseline value with the first baseline value, but directly obtains the first attestation result, where the first attestation result is used to represent that the second unit is untrustworthy. In this way, when the measurement process of the composite device is an uncertain process, the first unit in the composite device performs trustworthiness attestation on the second unit based on the second baseline value, thereby implementing fast, convenient, and effective remote attestation on the composite device.

The second PCR value may be a PCR value currently recorded by the TCB module built in the second unit, and the first measurement log records the information about the process of extending the first baseline value to obtain the second PCR value (for example, an extension sequence and a quantity of extensions of the first baseline value) and the first baseline value. The second PCR value is calculated by the TCB module in the second unit based on the first baseline value and the information about the process, and the third PCR value may be calculated by the first unit based on the second baseline value and the information about the process in the first measurement log. The second baseline value may be considered as a trusted baseline value of the second unit, and is used to check the first baseline value.

For the foregoing two examples, it may be understood that, in one case, the PCR reference value or the second baseline value of the second unit may be stored in the local secure storage space of the first unit, and the secure storage space may be physical space that cannot be tampered with or accessed by an attacker, for example, physical space that can be accessed only by a module that implements remote attestation (RAT) through a RAT related process or a running process (which is referred to as a RAT component), in another case, the PCR reference value or the second baseline value of the second unit may alternatively be obtained from the remote attestation device, and the remote attestation device stores a PCR reference value of each unit in the composite device and/or the second baseline value.

In some possible implementations, when the composite device further includes a third unit, this embodiment of this application may further include that the first unit obtains second measurement information of the third unit, and the first unit sends the second measurement information to the remote attestation device. In this way, the first unit only forwards the measurement information of the third unit to the remote attestation device, and the remote attestation device performs remote attestation on the third unit. This also implements trustworthiness attestation on the unit in the composite device.

During specific implementation, when the remote attestation uses a challenge-response manner, before that the first unit sends the first attestation result to the remote attestation device, for example, before step 1 in the first aspect, or between step 2 and step 3, this embodiment of this application may further include that the first unit receives a first measurement request message sent by the remote attestation device, where the first measurement request message may be considered as a "challenge" and is used to request to perform trustworthiness attestation on the composite device. In this case, in step 3, the first unit may include the first attestation result in a first measurement response message, and send the first measurement response message as a "response" to the "challenge" to the remote attestation device.

In some other possible implementations, this embodiment of this application may further include that the first unit sends third measurement information of the first unit to the remote attestation device, so that the remote attestation device performs trustworthiness attestation on the first unit. In this way, on the one hand, in a process in which the remote attestation device performs trustworthiness attestation on the first unit, trustworthiness attestation on the composite device is more complete, that is, trustworthiness attestation is implemented on all units including the first unit in the composite device. On the other hand, before the first unit performs trustworthiness attestation on the second unit, the remote attestation device may first perform trustworthiness attestation on the first unit, and only under the condition that the first unit is trustworthy, it is determined that the first unit is to perform remote attestation on the second unit, so that the remote attestation process is more secure, thereby improving reliability of remote attestation on the composite device.

In some possible implementations of the first aspect, different remote attestation modes, for example, a relay mode, a proxy mode, and a mixed mode, may be used for remote attestation on the composite device. In the relay mode, the remote attestation device performs trustworthiness attestation on all the units in the composite device, in the proxy mode, the first unit in the composite device performs trustworthiness attestation on another unit in the composite device, and in the mixed attestation mode, the first unit in the composite device performs trustworthiness attestation on some units in the composite device, and the remote attestation device performs trustworthiness attestation on the other units in the composite device. To ensure that remote attestation can be performed in an orderly manner, before the foregoing remote attestation is performed, the remote attestation device and the composite device may first determine the remote attestation mode to be used.

In an example, for determining of a remote attestation manner to be used, the composite device and the remote attestation device may determine, through local static configuration, the remote attestation mode to be used for subsequent remote attestation.

In another example, the composite device and the remote attestation device may alternatively determine, through negotiation, the remote attestation mode to be used for subsequent remote attestation. For example, the first unit sends a mode negotiation request message to the remote attestation device, the first unit receives a mode negotiation response message sent by the remote attestation device, and the first unit determines the remote attestation mode based on the mode negotiation response message. The mode negotiation request message may carry first indication information, and the first indication information is used to indicate a remote attestation mode supported and recommended by the first unit. The mode negotiation response message carries second indication information, and the second indication information is used to indicate the remote attestation device to determine the remote attestation mode to be used subsequently. It should be noted that, a negotiation process for the remote attestation mode may be initiated by the first unit, or may be initiated by the remote attestation device. A final remote attestation mode may be determined by the first unit, or may be determined by the remote attestation device. In this way, the remote attestation manner to be used subsequently is determined through negotiation between the composite device and the remote attestation device, to provide a data basis for performing orderly remote attestation on the composite device subsequently.

It may be understood that, when the determined remote attestation mode is the proxy mode, in the proxy mode, the first unit is responsible for performing trustworthiness attestation on all units including TCB modules except the first unit in the composite device. When the determined remote attestation mode is the mixed attestation mode, in the mixed attestation mode, the first unit performs trustworthiness attestation on the second unit, and the remote attestation device performs trustworthiness attestation on a fourth unit in the composite device, that is, the first unit performs trustworthiness attestation on some units in the composite device, where the some units include the second unit, and the other units send measurement information of the other units to the remote attestation device by using the first unit, and the remote attestation device performs trustworthiness attestation, where the other units include the third unit.

It should be noted that, for the mixed attestation mode, specific units on which the remote attestation device and the first unit need to perform trustworthiness attestation may be determined and notified to the remote attestation device by the first unit, or may be determined and notified to the first unit by the remote attestation device, or may be determined through negotiation by the remote attestation device and the first unit. A process of determining through negotiation the specific units to be verified may be implemented in a process of negotiating the remote attestation mode, or may be separately negotiated after the remote attestation mode is determined as the mixed attestation mode. In an example, in this embodiment of this application, for example, the specific units on which the remote attestation device and the first unit need to perform trustworthiness attestation may be determined through the following process. The first unit sends a first request message to the remote attestation device, where the first request message is used to request an attestation permission from the remote attestation device, the attestation permission indicates a set of units on which the first unit performs trustworthiness attestation, and the set includes the second unit, and the first unit receives a first response message returned by the remote attestation device, where the first response message is used to indicate the attestation permission. The first response message includes identification information of each unit on which the first unit performs trustworthiness attestation, and the identification information may be, for example, an identifier of the unit, and is used to uniquely identify the unit.

It should be noted that, the first unit is a leader unit in an active state. For example, the first unit may be a leader unit that is switched from a standby state to the active state before step 1 in the first aspect.

In some possible implementations of the first aspect, for a manner of triggering remote attestation on the composite device, in one case, the first unit may periodically perform trustworthiness attestation on the second unit. For example, the first unit periodically sends a first triggering request to the remote attestation device, where the first triggering request is used to periodically trigger the remote attestation device to perform trustworthiness attestation on the composite device. In another case, the first unit may alternatively perform trustworthiness attestation on the second unit based on triggering of an event. For example, the first unit sends a second triggering request to the remote attestation device based on occurrence of the event, where the second triggering request is used to trigger the remote attestation device to perform trustworthiness attestation on the composite device, and the event may include one of the following cases: an active/standby switchover of the first unit, a state change of the second unit, or a configuration command, that is, when the first unit is switched from the standby state to the active state, or when the first unit senses the state change of the second unit (for example, a new second unit is added, or the second unit is replaced), or when the second unit receives the configuration command, the first unit is triggered to perform trustworthiness attestation on the second unit. In this way, when the event occurs or a preset period is reached, the first unit may actively perform trustworthiness attestation on the second unit without passively waiting for initiation of remote attestation, thereby saving an interaction procedure in the remote attestation process, and improving remote attestation efficiency.

In some other possible implementations of the first aspect, when a unit in the composite device has an incremental change, that is, measurement information corresponding to some PCR values remains unchanged and measurement information corresponding to the other PCR values changes in the unit, in this embodiment of this application, to save system resources occupied by remote attestation and improve remote attestation efficiency, remote attestation may be performed only on the changed measurement information, that is, measurement information corresponding to the incremental change is obtained and remote attestation is performed based on the measurement information corresponding to the incremental change. In an example, when the second unit has a first incremental change, this embodiment of this application may further include when the second unit has the first incremental change, the first unit obtains fifth measurement information corresponding to the first incremental change, and the first unit performs trustworthiness attestation on the second unit based on the fifth measurement information. In another example, when the first unit has a second incremental change, this embodiment of this application may further include that the first unit sends, to the remote attestation device, sixth measurement information corresponding to the second incremental change of the first unit, and the remote attestation device performs, based on the sixth measurement information, trustworthiness attestation on the first unit that has the second incremental change. In this way, according to this embodiment of this application, only measurement information corresponding to PCR values that change in various units is verified, but full verification is not performed on measurement information corresponding to all PCR values, thereby avoiding repeated verification on measurement information corresponding to a PCR value that does not change, saving network resources, and improving remote attestation efficiency for the composite device.

According to a second aspect, an embodiment of this application further provides a remote attestation method for a composite device. The method is applied to a remote attestation device, the composite device may include a first unit and a second unit, and this embodiment of this application may further include: Step 1: The remote attestation device receives a first message sent by the first unit, where the first message carries a first attestation result of performing trustworthiness attestation by the first unit on the second unit. Step 2: The remote attestation device obtains the first attestation result based on the first message.

In some possible implementations, this embodiment of this application may further include that the remote attestation device receives a second message sent by the first unit, where the second message carries first measurement information of the first unit, and the remote attestation device performs trustworthiness attestation on the first unit based on the first measurement information, to obtain a second attestation result.

In some other possible implementations, this embodiment of this application may further include that the remote attestation device checks the first attestation result, to obtain a third attestation result. Further, whether a signature of the second unit is correct and whether a process in which the first unit performs trustworthiness attestation on the second unit is accurate are verified.

In some other possible implementations, this embodiment of this application may further include determining a remote attestation mode. In one case, the remote attestation mode may be set in the remote attestation device and the first unit through static configuration. In another case, the remote attestation mode may alternatively be determined through negotiation. In an example, a negotiation process may include that the remote attestation device receives a mode negotiation request message sent by the first unit, the remote attestation device determines the remote attestation mode based on the mode negotiation request message, and the remote attestation device sends a mode negotiation response message to the first unit, where the mode negotiation response message carries the remote attestation mode, and the mode negotiation response message is used to indicate the first unit to perform remote attestation in the remote attestation mode.

In an example, when the remote attestation mode is a proxy mode, in the proxy mode, the first unit is responsible for performing trustworthiness attestation on all units except the first unit in the composite device, and each of all the units includes a TCB module. In this case, this embodiment of this application may further include that the remote attestation device generates a fourth attestation result based on the first attestation result, the second attestation result, and the third attestation result, where the fourth attestation result is used to represent system trustworthiness of the composite device. If the first attestation result indicates that the second unit is trustworthy, the second attestation result indicates that the first unit is trustworthy, and the third attestation result indicates that a signature of the second unit is correct and a process in which the first unit performs trustworthiness attestation on the second unit is accurate, the fourth attestation result indicates that a system of the composite device is trustworthy.

In another example, when the remote attestation mode is a mixed attestation mode, in the mixed attestation mode, the first attestation result is a result of performing trustworthiness attestation by the first unit on the second unit, and this embodiment of this application may further include that the remote attestation device performs trustworthiness attestation on the third unit in the composite device, to obtain a fifth attestation result. In this case, this embodiment of this application may further include that the remote attestation device generates a sixth attestation result based on the first attestation result, the second attestation result, the third attestation result, and the fifth attestation result, where the sixth attestation result is used to represent system trustworthiness of the composite device. If the first attestation result indicates that the second unit is trustworthy, the second attestation result indicates that the first unit is trustworthy, the third attestation result indicates that a signature of the second unit is correct and a process in which the first unit performs trustworthiness attestation on the second unit is accurate, and the fifth attestation result indicates that the third unit is trustworthy, the sixth attestation result indicates that a system of the composite device is trustworthy.

In the mixed attestation mode, this embodiment of this application further includes determining a set of units on which the first unit performs remote attestation and a set of units on which the remote attestation device performs remote attestation. The process may be set through static configuration, or may be determined through negotiation. When the process is determined through negotiation, the process may be determined during negotiation of the remote attestation mode, or may be independently determined after the remote attestation mode is determined as the mixed attestation mode. In this case, for example, this embodiment of this application may include that the remote attestation device receives a first request message sent by the first unit, where the first request message is used to request an attestation permission from the remote attestation device, the remote attestation device determines the attestation permission, where the attestation permission indicates the remote attestation device to perform trustworthiness attestation on the third unit, and the remote attestation device sends a first response message to the first unit, so that the first unit performs trustworthiness attestation on the second unit based on the attestation permission.

It should be noted that, the method provided in the second aspect is applied to the remote attestation device, and corresponds to the method applied to the composite device and provided in the first aspect. Therefore, for various possible implementations of the method provided in the second aspect and achieved technical effects, refer to the descriptions of the method provided in the first aspect.

According to a third aspect, an embodiment of this application further provides a remote attestation apparatus for a composite device. The apparatus is used in a composite device, and the composite device includes a receiving unit, a sending unit, and a processing unit. The receiving unit is configured to perform a receiving operation in the method provided in the first aspect. The sending unit is configured to perform a sending operation in the method provided in the first aspect. The processing unit is configured to perform an operation other than the receiving operation and the sending operation in the first aspect. For example, the processing unit may perform an operation in the embodiment in the first aspect that the first unit performs trustworthiness attestation on the second unit based on the first measurement information, to obtain the first attestation result.

According to a fourth aspect, an embodiment of this application further provides a remote attestation apparatus for a composite device. The apparatus is used in a remote attestation device, and the remote attestation device includes a receiving unit, a sending unit, and a processing unit. The receiving unit is configured to perform a receiving operation in the method provided in the second aspect. The sending unit is configured to perform a sending operation in the method provided in the second aspect. The processing unit is configured to perform an operation other than the receiving operation and the sending operation in the second aspect. For example, the processing unit may perform an operation in the embodiment in the second aspect includes obtaining the first attestation result based on the first message.

According to a fifth aspect, an embodiment of this application further provides a composite device, including a first unit and a second unit. The second unit is configured to send measurement information of the second unit to the first unit. The first unit is configured to perform the remote attestation method provided in the first aspect, to implement trustworthiness attestation on the second unit.

According to a sixth aspect, an embodiment of this application further provides a composite device, including a communications interface and a processor. The communications interface is configured to perform receiving and sending operations in the method provided in the first aspect. The processor is configured to perform an operation other than the receiving and sending operations in the method provided in the first aspect.

According to a seventh aspect, an embodiment of this application further provides a composite device. The composite device includes a memory and a processor. The memory is configured to store program code. The processor is configured to run instructions in the program code, to enable the composite device to perform the method provided in the first aspect.

According to an eighth aspect, an embodiment of this application further provides a remote attestation device. The remote attestation device includes a communications interface and a processor. The communications interface is configured to perform receiving and sending operations in the method provided in the second aspect. The processor is configured to perform an operation other than the receiving and sending operations in the method provided in the second aspect.

According to a ninth aspect, an embodiment of this application further provides a remote attestation device. The remote attestation device includes a memory and a processor. The memory is configured to store program code. The processor is configured to run instructions in the program code, to enable the remote attestation device to perform the method provided in the second aspect.

According to a tenth aspect, an embodiment of this application further provides a computer-readable storage medium. The computer-readable storage medium stores instructions, and when the instructions are run on a computer, the computer is enabled to perform the remote attestation method for a composite device provided in the first aspect or the second aspect.

According to an eleventh aspect, an embodiment of this application further provides a computer program product. When the computer program product runs on a computer, the computer is enabled to perform the remote attestation method for a composite device provided in the first aspect or the second aspect.

BRIEF DESCRIPTION OF DRAWINGS

To describe technical solutions in some of the embodiments of this application more clearly, the following briefly describes the accompanying drawings for describing the embodiments. It is clear that the accompanying drawings in the following descriptions show merely some embodiments of this application, and a person of ordinary skill in the art may derive other drawings from these accompanying drawings.

DESCRIPTION OF EMBODIMENTS

To describe the embodiments of this application more clearly, before the embodiments of this application are described, some basic concepts and processes for trustworthiness attestation are briefly described.

It may be understood that a network device has a TPM. The TPM has a component of trust (or a root of trust) that cannot be tampered with, is absolutely trustworthy, and does not require external maintenance, and the root of trust is an indispensable part of trustworthiness attestation.

System trustworthiness attestation for a network device may include that a TPM in the network device performs trustworthiness measurement on a system state such as a system startup process, a process running process, and a configuration file on the network device, to obtain system trustworthiness measurement information, and verifies, based on the measurement information, whether a system of the network device is trustworthy.

Figure 1:
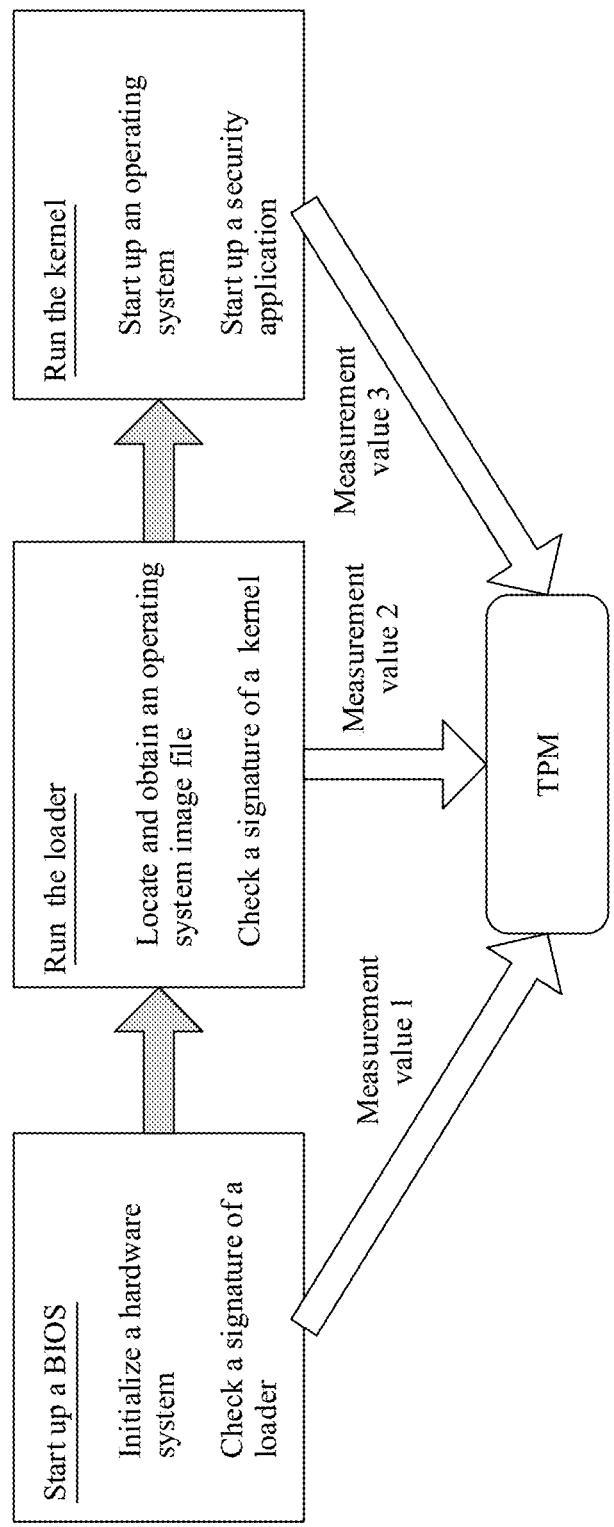
FIG. 1 is a schematic diagram of a structure of a trustworthiness attestation process for a measured boot according to an embodiment of this application.

In an example, refer to a boot model shown in FIG. 1. In a boot process, for example, a system trustworthiness attestation process of the network device may include: Step 1: The root of trust in the TPM provides a foundation of trust for a basic input/output system (BIOS). Step 2: The BIOS starts up, initializes a hardware system, checks, by invoking the root of trust in the TPM, a signature of a loader that needs to run in a next phase, measures the loader and configuration information, and records the measurement information in the TPM. Step 3: The loader runs, locates and obtains an operating system image file, checks, by invoking the root of trust in the TPM, a signature of a kernel of an operating system that needs to run in a next phase, measures the kernel, and records measurement information in the TPM. Step 4: The kernel runs, starts up the operating system, a security application, and the like, measures configuration information, and records measurement information in the TPM. It can be learned that when the foregoing network device completes startup, remote attestation may be performed, that is, the network device generates a report based on the measurement information recorded in the TPM, and sends the report to a server having a remote attestation function, and the server performs trustworthiness attestation on a startup process of the network device based on the received report, to obtain an attestation result. The measurement information may include at least a PCR value calculated on the TPM and stored in a PCR, and the PCR value is generally a value obtained after a baseline value is extended for a plurality of times in a running process, and is further related to a quantity of extensions and an extension sequence in the running process.

It may be understood that remote attestation means that a network device on which trustworthiness attestation is to be performed sends measurement information to the server, and the server performs, based on the received measurement information, remote attestation on the network device on which trustworthiness attestation is to be performed. Through remote attestation, network devices can be more easily monitored in a centralized manner. Therefore, more network devices use a remote attestation manner for system trustworthiness attestation. For example, the remote attestation of the network device may include that the server having the remote attestation function performs remote attestation on measurement information generated in a determinate measurement process such as startup of the network device. On the other hand, the server having the remote attestation function performs remote attestation on measurement information generated in a dynamic process in the running process of the network device.

Figure 2:
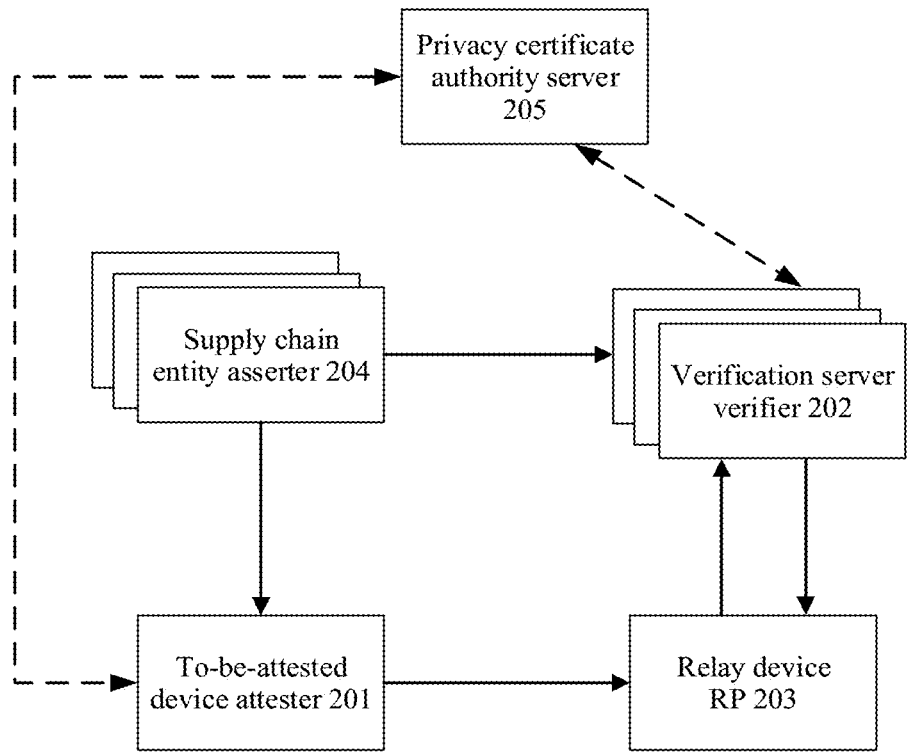
FIG. 2 is a schematic diagram of a framework of remote attestation in an application scenario according to an embodiment of this application.

Refer to a network model shown in FIG. 2. The model shows a scenario of remote attestation. The scenario includes a to-be-attested device attester 201, a verification server verifier 202, a relay device relying party (RP) 203, and a supply chain entity asserter 204. The attester 201 is a terminal, an IoT gateway, or a network device on which remote attestation needs to be performed, such as an application server. The terminal may be, for example, a switch, a router, or a personal computer (PC). The attester 201 may include four parts: a central processing unit (CPU) & a TPM, a BIOS, a kernel, and an application (APP), is configured to calculate and record measurement information, and may also be referred to as an attestation platform attest platform. The verifier 202 is a server having a remote attestation function, and may also be referred to as an attestation server attest server. The RP 203 is a device that can communicate with the attester 201 and the verifier 202, and is responsible for information exchange between the attester 201 and the verifier 202, for example, may be a network management device. The supply chain entity asserter 204 may be, for example, a network device of a device manufacturer.

During specific implementation, a process in which the verifier 202 performs remote attestation on the attester 201 may further include: S11: The attester 201 calculates and collects measurement information of the attester 201 by using a root of trust, and provides the measurement information to the RP 203. S12: The RP 203 receives the measurement information sent by the attester 201, and verifies an identity of the attester 201 through signature authentication. S13: After the RP 203 succeeds in identity authentication of the attester 201, the RP 203 signs the measurement information of the attester 201 by using a certificate of the RP 203, and sends the measurement information to the verifier 202. S14: After the verifier 202 succeeds in identity authentication of the RP 203, the verifier 202 verifies, based on the measurement information, whether the attester 201 is trustworthy, and sends an attestation result to the RP 203. In this way, a client or a technician may learn of a system trustworthiness status of the attester 201. Before S14, the asserter 204 is configured to provide configuration information such as an initial device identifier (ID) to the attester 201, and the asserter 204 also has a baseline value and a PCR reference value of the attester 201. The asserter 204 may send the baseline value and the PCR reference value of the attester 201 to the verifier 202, as a basis for performing remote attestation by the verifier 202 on the attester 201. The baseline value is a digest obtained by performing hash calculation on a software package on the attester 201, and is generally a fixed value. The PCR reference value is a value obtained by extending the baseline value for a determinate quantity of times in a determinate sequence in a determinate measurement process such as startup, and is used as a standard for performing trustworthiness attestation on the determinate measurement process.

It should be noted that, to ensure device and communication security in an entire interaction process for the remote attestation, on the one hand, it may be considered by default that the verifier in the embodiments of this application is an absolutely secure and trustworthy device, that is, the verifier is qualified to perform trustworthiness attestation on the network device. On the other hand, a certificate mechanism (including certificate application, revocation, and the like) needs to be pre-deployed to support necessary operations such as certificate verification and viewing in the interaction process. Further, the attester 201 uses a certificate obtained from a privacy certificate authority (CA) server 205 to encrypt and sign the measurement information recorded by the attester 201. The verifier 202 decrypts the received information, and interacts with the privacy certificate authority server 205 to verify whether the certificate of the attester 201 is valid. A user may view a certificate issued by the privacy certificate authority server 205, and can view a result of performing remote attestation by the verifier 202 on the attester 201.

The server having the remote attestation function (the verifier is used as an example for description below) may perform remote attestation on the network device (the attester is used as an example for description below) in a challenge-response manner in a Network Configuration protocol (NETCONF). Information related to the remote attestation may be described by using a Yet Another Next Generation (YANG) data model.

It should be noted that, in the embodiments of this application, the verifier is a device responsible for performing remote attestation on the attester. In one case, the verifier may be a device on which functions of both the RP 203 and the verifier 202 are deployed. In another case, the verifier may alternatively be a device that has a function of directly exchanging data with the attester 201. In other words, in the embodiments of this application, the attester 201 only needs to focus on the verifier 202. In subsequent descriptions, processes of information exchange between the RP 203 and the attester 201 and between the RP 203 and the verifier 202 are no longer described, and only descriptions of direct interaction between the attester 201 and the verifier 202 are provided.

It should be noted that, for related descriptions in the embodiments of this application, refer to related descriptions in draft-birkholz-rats-architecture-01 and draft-birkholz-rats-reference-interaction-model-00.

A network device in many scenarios includes a plurality of independent components or units, and is referred to as a composite device, for example, a switch or a router. TCB modules are built in some of the units in the composite device, and the other units are units not including TCB modules. The TCB module is equivalent to the foregoing TPM in the network device, and is configured to calculate and record a system startup process, a process running process, a configuration file, and the like on the unit in which the TCB module is located, to obtain measurement information representing trustworthiness. Only the unit with the built-in TCB module can generate the measurement information and trustworthiness attestation needs to be performed on the unit, and the unit not including the TCB module does not affect trustworthiness attestation of the composite device. Therefore, the unit in the composite device in the embodiments of this application refers in particular to the unit with the built-in TCB module, and the unit without the TCB module is not involved.

The composite device may include a leader unit and a subsidiary unit. The leader unit has a communications interface that can directly interact with an external device, and the subsidiary unit is a unit without a communications interface that can directly interact with an external device. The subsidiary unit needs to interact with the external device by using an internal interconnection structure and the communications interface of the leader unit. It may be understood that the communications interface is a physical interface that can implement communication with the external device, for example, may be a management interface. For example, the composite device is a router. The router is connected to a network management system by using a management interface, the router may interact with the network management system by using the management interface, for example, deliver configuration information to the network management system by using the management interface, and the network management system queries a running state of the router by using the management interface.

For example, when the composite device is the router, the leader unit may be a main control board of the router. To improve reliability of the router, two main control boards are usually deployed in the router, and one main control board is in an active state (that is, a working state). When the main control board in the active state is unavailable, the other main control board in a standby state can take over the original main control board in the active state to continue working. In this way, the router is prevented from restarting or breaking down completely because one original main control board is unavailable and affecting running of an entire network. The subsidiary unit may be a plug-in card, a base card, a line card, or a value-added service board of the router. The line card may be usually a forwarding board, the plug-in card may be a subcard extended on the forwarding board, the base card is a basic forwarding unit, and the value-added service board is, for example, a service board that provides Internet Protocol Security (IPsec).

Figure 3:
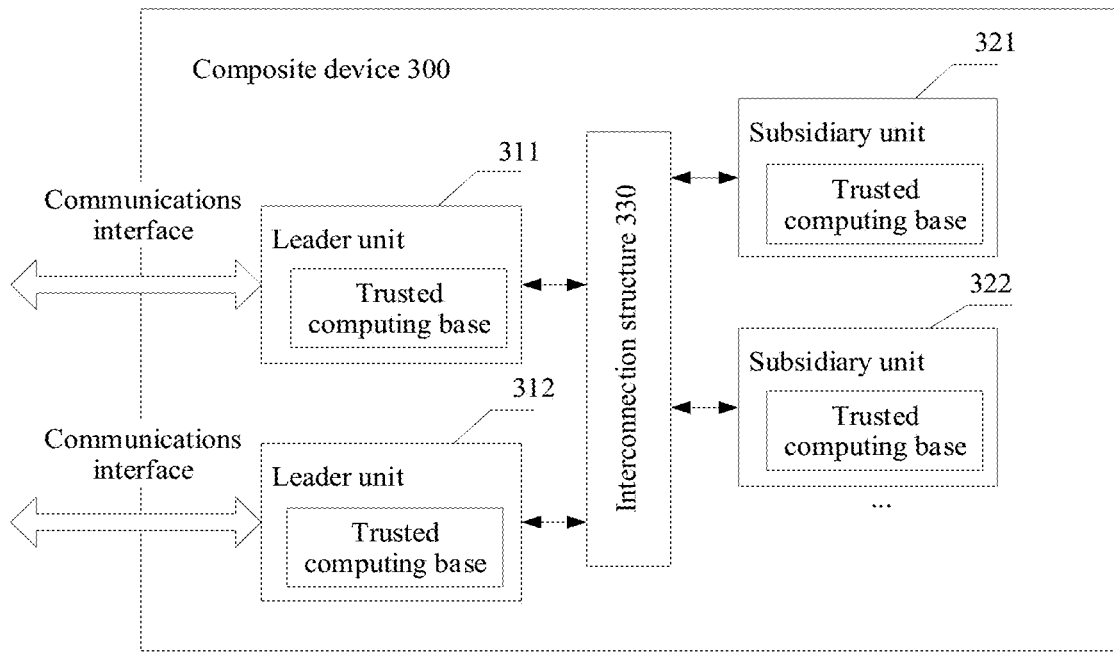
FIG. 3 is a schematic diagram of a structure of a composite device according to an embodiment of this application.

FIG. 3 is a schematic diagram of a composite device 300. The composite device 300 may include a leader unit 311, a leader unit 312, and a plurality of subsidiary units 321, 322, . . . . The leader unit 311 and the leader unit 312 are units having communications interfaces that can directly interact with an external device and integrated with TCB modules. The subsidiary units 321, 322, . . . are integrated with TCB modules, but do not have communications interfaces that can directly interact with an external device, and can interact with the external device only by using an internal interconnection structure 330 and the communications interface on the leader unit 311 or the leader unit 312.

A behavior such as startup or running of the composite device includes a behavior such as startup or running of each leader unit and each subsidiary unit. Therefore, to appraise system trustworthiness of the composite device, trustworthiness of the leader unit and each subsidiary unit that are included in the composite device needs to be separately appraised. It can be determined that a system of the composite device is trustworthy, only when the leader unit and each subsidiary unit are trustworthy.

In view of this, with the explosive growth of information and the grand occasion in which all things are connected, to provide a secure and reliable network environment, a remote attestation manner for a composite device urgently needs to be provided to implement strict trustworthiness attestation on a composite device in a network, thereby meeting a current increasing trustworthiness requirement for the composite device and the network including the composite device.

Figure 4:
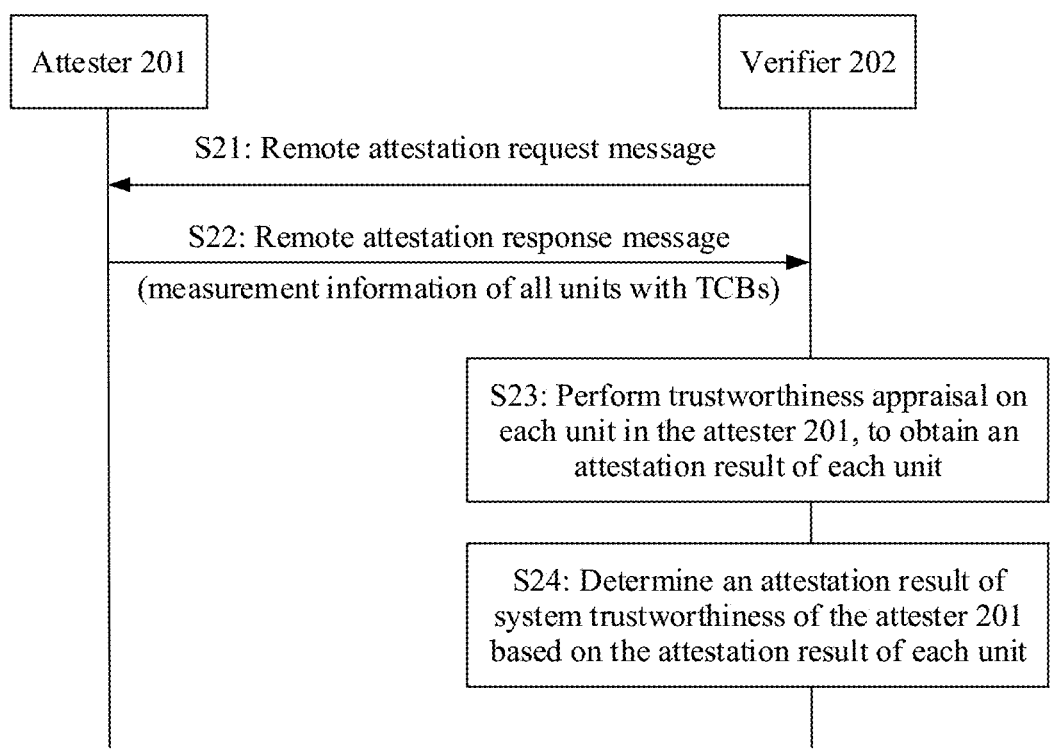
FIG. 4 is a signaling flowchart of a remote attestation method in a relay mode according to an embodiment of this application.

In an example, in the scenario shown in FIG. 2, it is assumed that the attester 201 in FIG. 2 is a composite device having a structure shown in FIG. 3. Refer to FIG. 4. A process in which the verifier 202 performs remote attestation on the attester 201 may include: S21: The verifier 202 initiates a remote attestation request message (or initiating an attestation challenge) to the attester 201, where the remote attestation request message is used to trigger one time of remote attestation on the attester 201. S22: The attester 201 includes measurement information of all the units in a remote attestation response message, and sends the remote attestation response message to the verifier 202, where the leader unit 312 in the standby state and the subsidiary units 321, 322, . . . send the measurement information of the units to the leader unit 311 in the active state, and the leader unit 311 in the active state includes the received measurement information and the measurement information of the leader unit 311 in a remote attestation response message, and sends the remote attestation response message to the verifier 202 by using the communications interface on the leader unit 311 in the active state. S23: The verifier 202 obtains, from the received remote attestation response message, the measurement information of the leader unit 311 in the active state, the leader unit 312 in the standby state, and the subsidiary units 321, 322, . . . , and verifies, based on a PCR reference value or a baseline value of each unit of the attester 201 that is stored on the verifier 202, the measurement information provided by the attester 201, to obtain an attestation result of each unit. S24: The verifier 202 determines, based on the attestation result of each unit, an attestation result of system trustworthiness of the attester 201.

It may be understood that, in the remote attestation method for a composite device shown in FIG. 4, trustworthiness attestation needs to be performed by the verifier on all the units in the composite device. If there are more composite devices in the network and the composite device includes a large quantity of units, when the foregoing remote attestation method is performed, a quantity of packets that need to be exchanged with the verifier increases exponentially, increasing load of the verifier. For example, assuming that a composite device including 10 subsidiary units and two leader units is added to the network, and other parts remain unchanged, remote attestation is performed by using the embodiment shown in FIG. 4, and the composite device needs to exchange related information of the 12 entities (including the 10 subsidiary units and the two leader units) in a measurement process with the verifier. This is equivalent to describing that load of the 12 entities needs to be increased for the verifier.

In view of this, the embodiments of this application provide a remote attestation method for a composite device. A leader unit in the composite device has a remote attestation function, and can perform trustworthiness attestation on another unit in the composite device to which the leader unit belongs. In this case, the leader unit in the composite device may directly send a trustworthiness attestation result of the other unit to a verifier, and the verifier only needs to receive the attestation result of the other unit, without receiving measurement information of each unit and performing trustworthiness attestation on each unit. An example in which a composite device including 10 subsidiary units and two leader units is added to a network is still used. In this implementation, if trustworthiness attestation is performed by one leader unit in the composite device on both the 10 subsidiary units and the other leader unit, for the verifier, the verifier only needs to receive an attestation result sent by the leader unit in the composite device. This is equivalent to describing that only load of one entity (that is, the leader unit) needs to be increased. In addition, an amount of data that needs to be exchanged between the verifier and the composite device in a remote attestation process can be greatly reduced.

Figure 5:
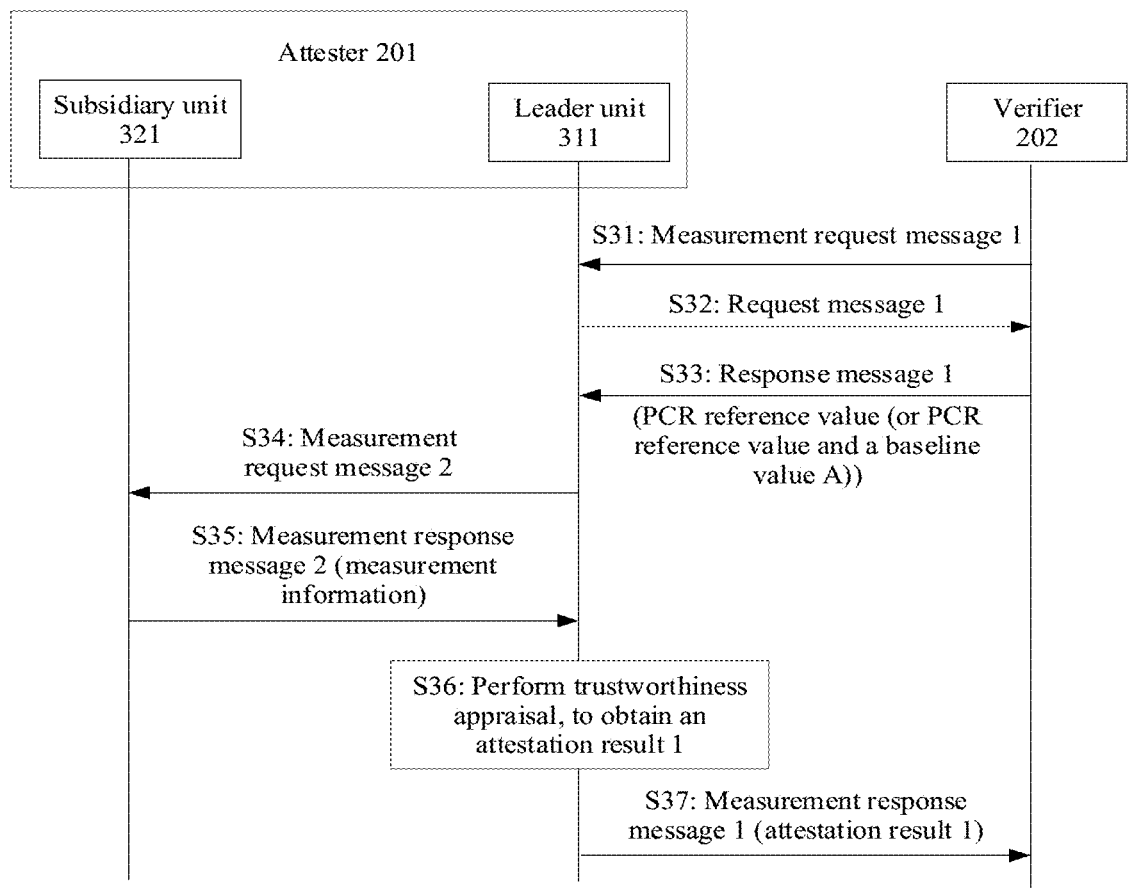
FIG. 5 is a signaling flowchart of a remote attestation method in a proxy mode according to an embodiment of this application.

In another example, the scenario shown in FIG. 2 is still used as an example. It is assumed that the composite device shown in FIG. 3 is the attester 201 in FIG. 2. Refer to FIG. 5. A process in which the verifier 202 performs remote attestation on the attester 201 may include: S31: The verifier 202 sends a measurement request message 1 to the leader unit 311, where the measurement request message 1 may be considered as a "challenge" when remote attestation is performed in a challenge-response manner, and is used to request trustworthiness attestation on the composite device. S32: The leader unit 311 sends a request message 1 to the verifier 202, where the request message 1 is used to request to obtain a basis for trustworthiness attestation on the leader unit 312 and the subsidiary units 321, 322, . . . . For example, if a measurement process such as startup is a determinate process, the basis for trustworthiness attestation may be a PCR reference value. For another example, if another measurement process after startup is an uncertain process, the basis for trustworthiness attestation may be a baseline value A of a standard that does not change with the measurement process. S33: The verifier 202 includes a PCR reference value 1 and/or the baseline value A corresponding to the leader unit 312 and the subsidiary units 321, 322, . . . in a response message 1, and sends the response message 1 to the leader unit 311, where the baseline value A and the PCR reference value 1 are trustworthy baseline values and PCR reference values of the units. S34: The leader unit 311 separately sends measurement request messages 2 to the leader unit 312 and the subsidiary units 321, 322, . . . , to request measurement information of the leader unit 312 and the subsidiary units 321, 322, . . . from the leader unit 312 and the subsidiary units 321, 322, . . . , where the measurement information includes at least a PCR value 1 recorded in a TCB module in each unit, the measurement information may further include a measurement log, and the measurement log records a baseline value a and information about a process of extending the baseline value a to obtain the PCR value 1. S35: The leader unit 312 and the subsidiary units 321, 322, . . . separately include the measurement information of the leader unit 312 and the subsidiary units 321, 322, . . . in measurement response messages 2, and send the measurement response messages 2 to the leader unit 311. S36: The leader unit 311 separately performs trustworthiness attestation on the leader unit 312 and the subsidiary units 321, 322, . . . , to obtain attestation results 1. Further, in one case, for the determinate measurement process, the leader unit 311 determines through comparison whether the PCR value 1 of each unit is consistent with the PCR reference value 1 of each unit. In another case, for the uncertain measurement process, the leader unit 311 first calculates a PCR value 2 based on the measurement log, that is, calculates the PCR value 2 based on the information about the process recorded in the measurement log for the baseline value a, determines through comparison whether the PCR value 1 is consistent with the PCR value 2, and determines through comparison whether the baseline value a in the measurement log is consistent with the baseline value A. S37: The leader unit 311 includes the attestation result 1 in a measurement response message 1, and sends the measurement response message 1 to the verifier 201, where the measurement response message 1 may be considered as a "response" to the "challenge" when remote attestation is performed in the challenge-response manner, that is, a response message of the measurement request message 1 in S31.

Figure 6:
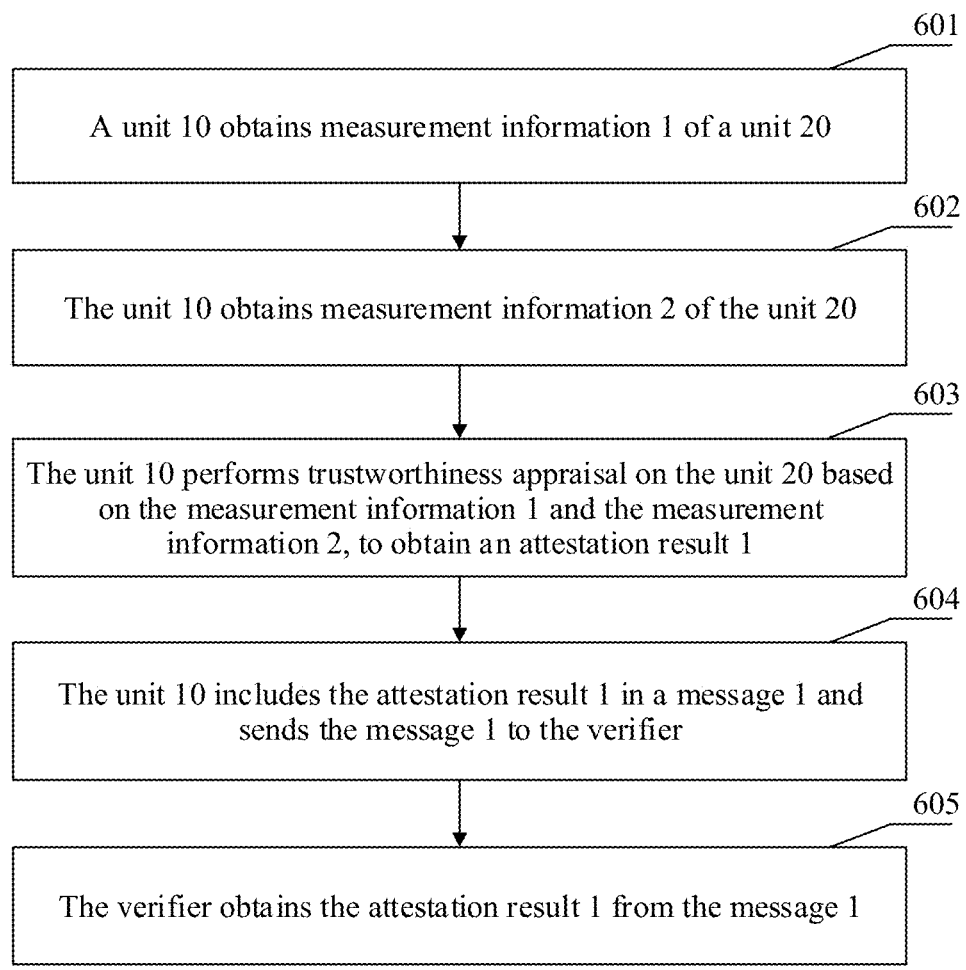
FIG. 6 is a schematic flowchart of a remote attestation method for a composite device according to an embodiment of this application.

It should be noted that, in the remote attestation method for a composite device shown in FIG. 6, an execution sequence between S32 and S33 and S34 and S35 is not limited. As described above, S32 and S33 may be performed before S34 and S35, S34 and S35 may be performed before S32 and S33, or the two parts may be performed simultaneously. In addition, S31 may be performed on any occasion before S37.

It should be noted that, in one case, in each remote attestation process, S32 and S33 may be performed to provide a reliable data basis for current remote attestation. In another case, in a plurality of remote attestation processes, S32 and S33 may alternatively be performed only once, and the PCR reference value (or the PCR reference value and the baseline value A) is stored locally in the leader unit, and directly locally read in a subsequent remote attestation process.

It may be understood that the foregoing scenario is merely a scenario example provided in the embodiments of this application, and the embodiments of this application are not limited to this scenario.

With reference to the accompanying drawings, the following describes in detail specific implementations of a remote attestation method for a composite device and a related device in the embodiments of this application by using embodiments.

It may be understood that a specific function is assigned to a leader unit in the composite device attester, so that the leader unit can perform trustworthiness attestation on another unit in the composite device to which the leader unit belongs, thereby effectively reducing an amount of data exchanged between the composite device attester and a remote attestation server verifier in a remote attestation process, and reducing load of the verifier.

In some possible implementations, a plurality of remote attestation modes, for example, a relay mode, a local attestation (proxy) mode, and a mixed attestation (mixed) mode are supported between the verifier and the attester. In the relay mode, the verifier performs trustworthiness attestation on the leader unit and a plurality of subsidiary units in the composite device attester. In the proxy mode, the leader unit in the attester performs trustworthiness attestation on all the subsidiary units in the attester. In the mixed attestation mode, the leader unit in the attester performs trustworthiness attestation on some subsidiary units in the attester, and the verifier performs trustworthiness attestation on the other subsidiary units in the attester.

To ensure that remote attestation can be performed in an orderly manner, before remote attestation is performed, the verifier and the attester may first determine the remote attestation mode to be used. For determining of a remote attestation manner to be used, in an example, the attester and the verifier may determine, through local static configuration, the remote attestation mode to be used for subsequent remote attestation. For example, the remote attestation mode is configured as the proxy mode on both the attester and verifier, and then the proxy mode is used in a process of remote attestation between the attester and the verifier. In another example, the attester and the verifier may alternatively determine, through negotiation, the remote attestation mode to be used for subsequent remote attestation. For example, the attester notifies, by using a message, the verifier that the proxy mode and the mixed attestation mode can be used subsequently, to request the verifier to determine a specific remote attestation mode, and the verifier replies that the mixed attestation mode is determined to be used. In this case, it is determined, through negotiation, that the mixed attestation mode is to be used in a process of remote attestation between the attester and the verifier. For a specific process of determining the remote attestation mode through negotiation, refer to the following embodiments shown in FIG. 16A and FIG. 16B.

During specific implementation, in an example, when the determined remote attestation mode is the relay mode, remote attestation may be performed according to the embodiment shown in FIG. 4. In another example, when the determined remote attestation mode is the mixed attestation mode, for details, refer to related descriptions of the following embodiment shown in FIG. 12. In still another example, when the determined remote attestation mode is the proxy mode, remote attestation may be performed according to the foregoing embodiment shown in FIG. 3. For details, refer to related descriptions of the following embodiment shown in FIG. 6.

FIG. 6 is a schematic flowchart of a remote attestation method for a composite device according to an embodiment of this application. Refer to FIG. 6. The method is applied to a network including an attester and a verifier, and it is known that the attester is a composite device. The attester includes a unit 10 and a unit 20. The unit 10 may include the leader unit 311 in the active state in the composite device 300 in FIG. 3, and the unit 20 may include any one of the leader unit 312 in the standby state and the subsidiary units 321, 322, . . . in the composite device 300 in FIG. 3. When remote attestation is performed on the composite device in a proxy mode, the leader unit 10 in the active state needs to perform the following method on all other units in the attester. An example in which the leader unit 10 performs trustworthiness attestation on the unit 20 is used. The method may include the following step 601 to step 605.

Step 601: The unit 10 obtains measurement information 1 of the unit 20.

It may be understood that the unit 10 is a leader unit having a function of performing trustworthiness attestation on another unit in the composite device to which the unit 10 belongs, for example, may be a control plane of a switch or a router. The unit 20 is a unit on which trustworthiness attestation may be performed by the unit 10 or the verifier, for example, may be a control plane of the switch or the router, or may be a forwarding plane of the switch or the router.

The measurement information 1 may be information generated by the unit 20 in the attester in a running process and used to appraise trustworthiness of the unit 20. In one case, for a determinate measurement process, for example, a startup process, the measurement information 1 may include a PCR value 1, and the PCR value 1 may include a PCR value currently recorded by a TCB module built in the unit 20. In another case, for an uncertain measurement process, for example, a running process after startup, in addition to a PCR value 2, the measurement information 1 may further include a measurement log. The PCR value 2 may be a PCR value currently recorded by the TCB module built in the unit 20, and the measurement log records information about a process of extending a baseline value a to obtain the PCR value 2 (for example, an extension sequence and a quantity of extensions of the baseline value a) and the baseline value a. Both the PCR value 1 and the PCR value 2 are obtained by the TCB module through calculation based on the baseline value a and the information about the process in a corresponding measurement process, and a specific value is related to a quantity of extensions and an extension sequence in the measurement process.

Figure 7A:
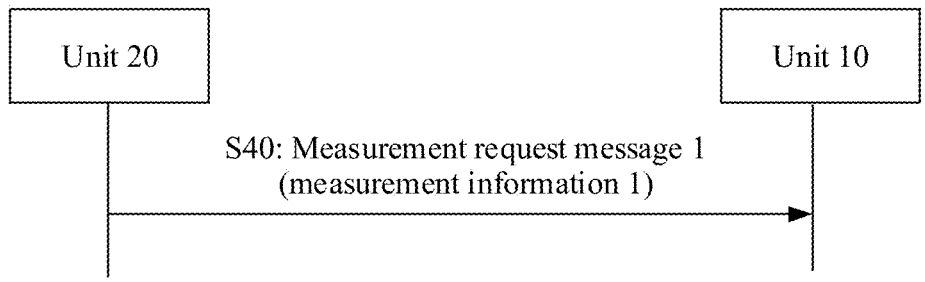
FIG. 7A is a signaling flowchart of an implementation of step 601 according to an embodiment of this application.

In the first example, that the unit 10 obtains measurement information 1 of the unit 20 in step 601 may include that the unit 20 actively sends the measurement information 1 to the unit 10. For example, as shown in FIG. 7A, step 601 includes: S40: The unit 20 sends a measurement request message 1 to the unit 10, where the measurement request message 1 includes the measurement information 1, and the measurement request message 1 is used to request the unit 10 to perform trustworthiness attestation on the unit 20. In this case, after receiving the measurement request message 1, the unit 10 may obtain the measurement information 1 by parsing the measurement request message 1.

It may be understood that the measurement request message 1 may be a message in a NETCONF protocol, and the measurement request message 1 may carry the following information: a random number Nonce, a certificate aik used for a signature, a result quote of signing a PCR value by using the aik certificate, a hash algorithm PcrBanks supported by a PCR, a measurement log EventLog, and the like. Nonce may be a random number generated by the unit 10, sent in advance to the unit 20, and used for security check, aik may be content of an IAK or LAK certificate determined based on a certificate type aikType used by the signature previously sent by the unit 10, PcrBanks may be a hash algorithm such as SHA1 or SHA256, and EventLog records a measurement process of each process in the unit 20, for example, the quantity of extensions and the extension sequence of the baseline value a.

The measurement request message 1 may be triggered periodically or may be triggered through manual configuration.

It should be noted that, for the messages in the embodiments of this application, for example, the measurement request message 1 and the following measurement response message 1, request message 1, response message 1, message 1, mode negotiation request message 1, and mode negotiation response message 1, in an example, messages in a Transmission Control Protocol (TCP)/User Datagram Protocol (UDP), a port, and a router advertisement (RA) may be used. In this case, content carried in each message may be carried by a standard type-length-value (TLV) format field in the message of this type or a field similar to a TLV format (for example, some specific fields are added based on the standard TLV format field). In another example, a message in a Hypertext Transfer Protocol (HTTP) over Secure Socket Layer (HTTPS) and a port number may alternatively be used. In this case, a Uniform Resource Locator (URL) may be used to distinguish between different message types and define message fields in request or response (or reply or acknowledgment) related messages.

In the embodiments of this application, for example, a message may be defined by using a RAType field. For example, a value of the RAType field may be set to 1, indicating that the message is the measurement request message 1. Information carried in each message, for example, measurement information, may be defined by using the standard TLV field or the field similar to the TLV field. The standard TLV field or the field similar to the TLV field may include: a MsgType field, a MsgLen field, and a MsgContext field. A value of the MsgType field may be set to 1, indicating that the TLV field is used to indicate a PCR value, and a value of the MsgContext field in the TLV is used to indicate a specific value of the PCR value. Alternatively, a value of the MsgType field may be set to 2, indicating that the TLV field is used to indicate a measurement log, and a value of the MsgContext field in the TLV is used to indicate a baseline value and an extension sequence and a quantity of extensions of the baseline value.

Figure 7B:
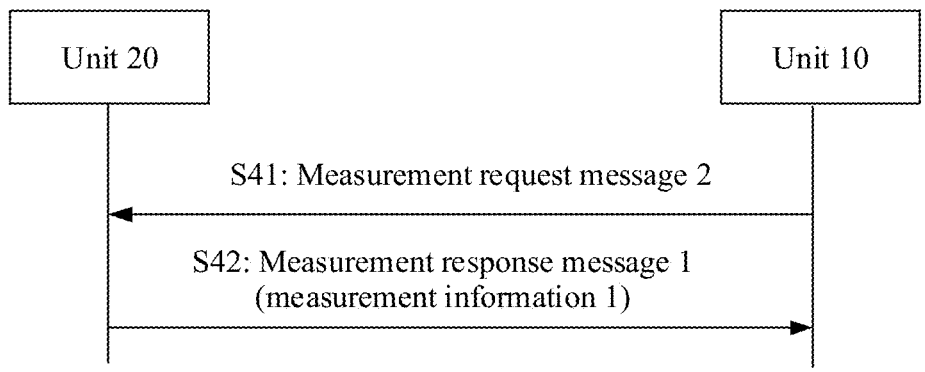
FIG. 7B is a signaling flowchart of another implementation of step 601 according to an embodiment of this application.

In the second example, that the unit 10 obtains measurement information 1 of the unit 20 in step 601 may alternatively be that the unit 10 sends a request to the unit 20, and the unit 20 sends the measurement information 1 to the unit 10 in response to the request. For example, as shown in FIG. 7B, step 601 may include: S41: The unit 10 sends a measurement request message 2 to the unit 20, where the measurement request message 2 is used to request the unit 20 to send the measurement information 1. S42: The unit 20 sends a measurement response message 1 to the unit 10, where the measurement response message 1 includes the measurement information 1 of the unit 20, and the measurement response message 1 is a response message of the measurement request message 2. In this case, after receiving the measurement response message 1, the unit 10 may obtain the measurement information 1 by parsing the measurement response message 1.

It may be understood that, the measurement request message 2 may carry the following information: Nonce, a list of requested PCR values (PCRs), aikType, and the like. Nonce is a random number generated by the unit 10 and sent to the unit 20 to prevent a malicious attack and perform security verification, and aikType is used to carry an IAK or LAK certificate type. For details about information that may be carried in the measurement response message 1 and related explanations, refer to related descriptions of the measurement request message 1 in the first example.

It should be noted that, the measurement request message 2 may not include PCRs. In this case, all PCR values recorded by the TCB module need to be returned in the measurement response message 1.

The measurement request message 2 may be triggered periodically or may be triggered through manual configuration.

Figure 7C:
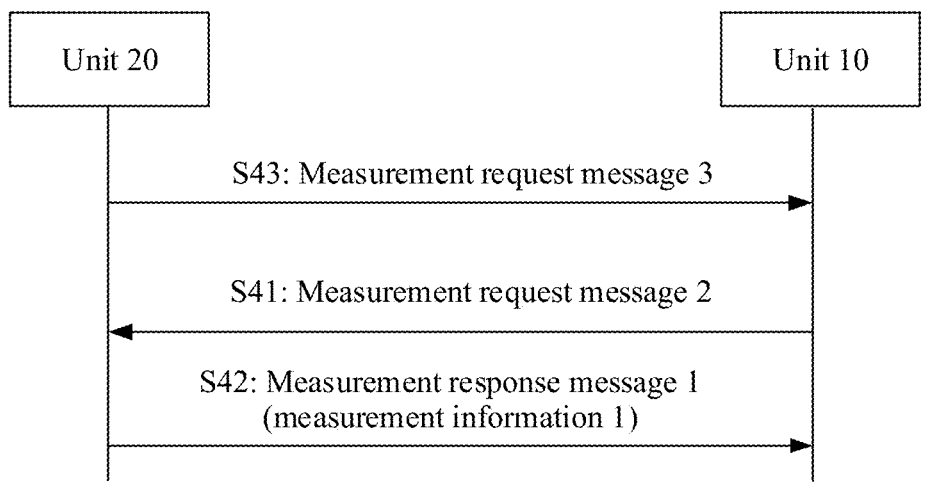
FIG. 7C is a signaling flowchart of still another implementation of step 601 according to an embodiment of this application.

In the third example, that the unit 10 obtains measurement information 1 of the unit 20 in step 601 may alternatively be that the unit 20 sends a request to the unit 10 as a response, the unit 10 sends another request to the unit 20, and the unit 20 sends the measurement information 1 to the unit 10 in response to the other response. For example, as shown in FIG. 7C, step 601 may include: S43: The unit 20 sends a measurement request message 3 to the unit 10, where the measurement request message 3 is used to indicate the unit 10 to obtain the measurement information 1 of the unit 20. S41: The unit 10 sends a measurement request message 2 to the unit 20, where the measurement request message 2 is used to request the unit 20 to send the measurement information 1. S42: The unit 20 sends a measurement response message 1 to the unit 10, where the measurement response message 1 includes the measurement information 1 of the unit 20, and the measurement response message 1 is a response message of the measurement request message 2. In this case, after receiving the measurement response message 1, the unit 10 may obtain the measurement information 1 by parsing the measurement response message 1.

It should be noted that, when step 601 is implemented in the foregoing three examples, a manner of triggering execution of step 601 may include that the execution is triggered through manual configuration or triggered in a scheduled period (for example, 2 hours). For the first example and the third example, the execution may alternatively be triggered by startup of the unit 20, that is, when the unit 20 is started up, the execution of step 601 according to the first example or the third example is triggered.

It may be understood that, through step 601, the unit 10 obtains the measurement information 1 of the unit 20 on which trustworthiness attestation is to be performed, to provide a data basis for performing trustworthiness attestation by the unit 10 on the unit 20.

Step 602: The unit 10 obtains measurement information 2 of the unit 20.

The measurement information 2 is a standard or a basis that the measurement information 1 of the unit 20 in the attester should comply with when the unit 20 is trustworthy. In one case, when the measurement process is a determinate process such as startup, the extension sequence and the quantity of extensions of the baseline value are fixed, and a value obtained by performing a determinate quantity of extensions on the baseline value in a determinate sequence is also a fixed value, so that the fixed value may be used as a PCR reference value, as a standard for checking the determinate measurement process. In this case, the measurement information 2 may include the PCR reference value. In another case, when the measurement process is an uncertain measurement process other than startup, the extension sequence and the quantity of extensions of the baseline value cannot be fixed, so that the fixed baseline value may be used as a standard for checking the measurement process. In this case, the measurement information 2 may include the baseline value.

Figure 8:
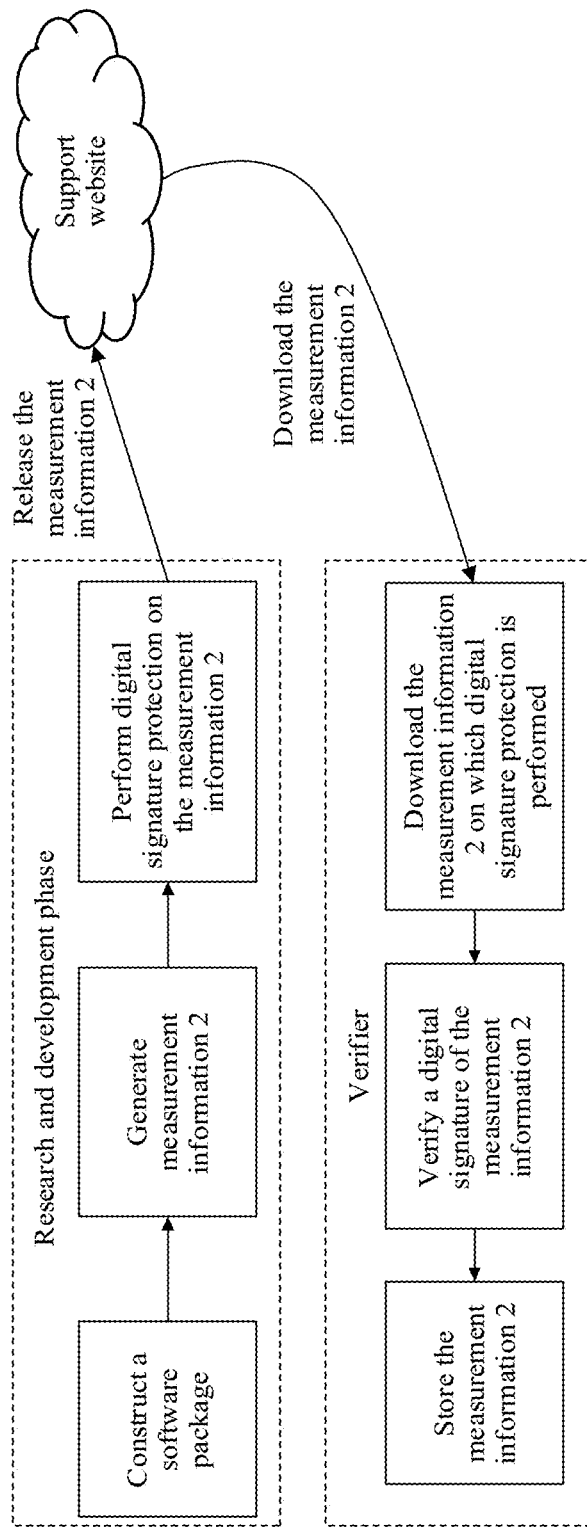
FIG. 8 is a schematic diagram of a process of generating a baseline value of measurement information according to an embodiment of this application.

Usually, the measurement information 2 is generated for each piece of software in a software package at a research and development phase. FIG. 8 shows a process of generating a baseline value of measurement information. Refer to FIG. 8. The process may include a research and development phase, a release phase, and a download phase. The research and development phase may further include: Step 1: Construct a software package. For example, software includes but is not limited to a basic input/output system (BIOS), a bootloader, and an operating system (OS). Step 2: Generate measurement information 2 of each piece of software in the software package. Step 3: Perform digital signature protection on the measurement information 2. In this case, the release phase is entered, where the generated measurement information 2 on which digital signature protection is performed may be released to a reliable support website, so that each verifier downloads the measurement information 2 from the support website. In this case, the verifier may download the measurement information 2 from the support website. A specific process may include: Step 1: The verifier downloads the measurement information 2 on which digital signature protection is performed. Step 2: Verify a digital signature of the measurement information 2. Step 3: Store the measurement information 2 in the verifier.

It should be noted that, in one case, the measurement information 2 may be stored in the verifier, or may be stored in a supplier or manufacturer device asserter, or may be stored in a trustworthy third-party server. In this case, the verifier, the asserter, and the trustworthy third-party server may be collectively referred to as devices for storing a baseline value of measurement information. In another case, the measurement information 2 may alternatively be preset in a software package. When loading the software package, the leader unit in the composite device may obtain the measurement information 2 accordingly.

In the first possible implementation, the measurement information 2 of the unit 20 in step 602 may be obtained by the unit 10 from a device that stores the measurement information 2. The following uses an example in which the device that stores the measurement information 2 is the verifier for description. For an implementation of the asserter or the trustworthy third-party server, refer to the following descriptions.

Figure 9A:
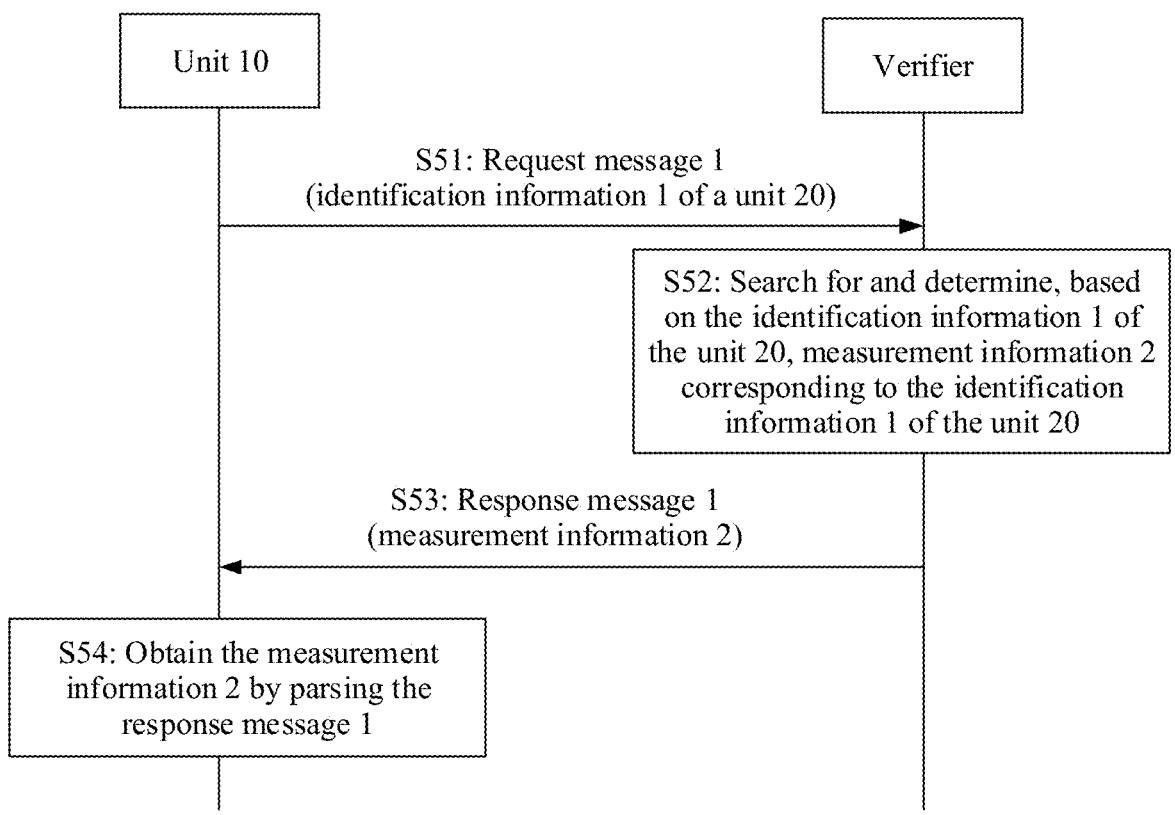
FIG. 9A is a signaling flowchart of an implementation of step 602 according to an embodiment of this application.

In an example, the unit 10 stores identification information of all the other units, that is, the unit 10 stores identification information 1 of the unit 20, and the identification information 1 is used to uniquely identify the unit 20. As shown in FIG. 9A, step 602 may further include: S51: The unit 10 sends a request message 1 to the verifier, where the request message 1 carries the identification information 1 of the unit 20, and the request message 1 is used to request to obtain the measurement information 2 of the unit 20. S52: The verifier obtains the identification information 1 of the unit 20 by parsing the request message 1, and searches for and determines the measurement information 2 corresponding to the identification information 1 of the unit 20 from the measurement information stored in the verifier. S53: The verifier sends a response message 1 to the unit 10, where the response message 1 carries the measurement information 2. S54: The unit 10 obtains the measurement information 2 by parsing the response message 1.

The identification information 1 of the unit 20 may further include an identifier of the unit 20, and is used to uniquely identify the unit 20. The identifier of the unit 20 may include, for example, an index of the unit 20 or a name of the unit 20. The index of the unit 20 may be a definition of the unit 20 in a YANG script, is represented by a number, and may be used as a physical index to uniquely identify the unit 20. The name of the unit 20 is represented by a character string. In this case, the corresponding unit 20 can be more quickly determined by using the index of the unit 20 than the name of the unit 20. Further, the identification information 1 of the unit 20 may include version information of the unit 20. The version information of the unit 20 may further indicate a software version number and/or a type (for example, a board type) of the unit 20. When a software version of the unit 20 changes, the measurement information 2 may also change, and the version information may correspondingly change, but the name and the index of the unit 20 may not be updated. In this case, the identification information 1 of the unit 20 needs to carry the version information and further carries at least one of the name and the index.

Figure 9B:
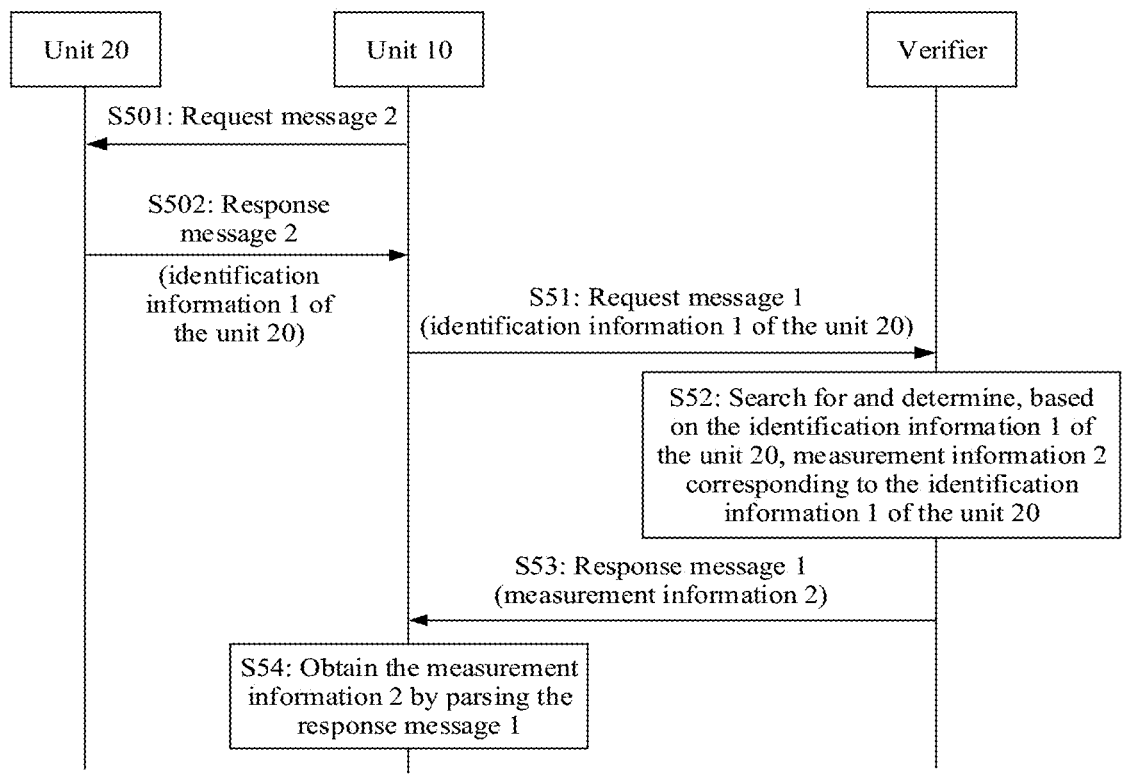
FIG. 9B is a signaling flowchart of another implementation of step 602 according to an embodiment of this application.

In another example, if the unit 10 does not store the identification information 1 of each unit 20, in addition to the foregoing S51 to S54, as shown in FIG. 9B, before S51, step 602 may further include: S501: The unit 10 sends a request message 2 to the unit 20, where the request message 2 is used to request to obtain the identification information 1 of the unit 20. S502: The unit 20 sends a response message 2 to the unit 10, where the response message 2 carries the identification information 1 of the unit 20.

It may be understood that, through the foregoing two examples, the unit 10 can dynamically obtain the measurement information 2 of the unit 20 from the verifier. In one manner, each time the unit 10 performs remote attestation, the unit 10 may perform the step of obtaining the measurement information 2 of the unit 20 from the verifier, and perform remote attestation on the unit 20 based on the measurement information 2 that is obtained this time. In this way, a problem that the measurement information 2 as a basis for remote attestation is maliciously tampered with, and consequently, a standard for remote attestation changes and an attestation result of the remote attestation is unreliable can be effectively avoided. The measurement information 2 is dynamically obtained from the verifier each time, thereby ensuring reliability of the standard for remote attestation and improving security of remote attestation on the composite device provided in this embodiment. In another manner, the unit 10 may perform the step of obtaining the measurement information 2 of the unit 20 from the verifier only once when performing remote attestation for the first time, and permanently store the measurement information 2 in local secure storage space. In a subsequent remote attestation process, the measurement information 2 is obtained locally and remote attestation is performed on the unit 20. In this way, the measurement information 2 does not need to be requested from the verifier each time remote attestation is performed, and an amount of data exchanged between the unit 10 and the verifier can be greatly reduced. In still another manner, the measurement information 2 may alternatively be periodically obtained. That is, after obtaining the measurement information 2 from the verifier once, the unit 10 stores the measurement information 2 and performs trustworthiness attestation on the unit 20 in a preset period (for example, 48 hours), in a next period, the unit 10 re-downloads measurement information 2' from the verifier once, updates the locally stored measurement information 2 with the latest downloaded measurement information 2', and performs remote attestation on the unit 20 by using the updated measurement information 2 in the period, and so on. In this way, validity and reliability of the measurement information 2 can be ensured to some extent, thereby improving security of performing trustworthiness attestation by the unit 10 on the unit 20.

It should be noted that, before step 602, to ensure reliability of the remote attestation, the verifier may send the measurement information 2 only to the unit 10 that is determined to be trustworthy. That is, before the verifier sends the measurement information 2 to the unit 10, the verifier may first perform trustworthiness attestation on the unit 10. A specific process may include: Step 1: The unit 10 sends measurement information 3 of the unit 10 to the verifier. Step 2: The verifier performs trustworthiness attestation on the unit 10 based on the measurement information 3, to obtain an attestation result 2. The measurement information 3 in step 1 may be carried in the request message 1, or may be carried in another message to be sent to the verifier, provided that step 1 is performed before the verifier sends the measurement information 2 of the unit 20 to the unit 10. During specific implementation, only if the verifier determines, based on the attestation result 2, that the unit 10 is trustworthy, the verifier actively provides the measurement information 2 of the unit 20 to the unit 10, or the verifier provides the measurement information 2 of the unit 20 to the unit 10 in response to the request of the unit 10. If the verifier determines, based on the attestation result 2, that the unit 10 is untrustworthy, the verifier needs to feed back the attestation result 2 to a device (for example, an RP) that can be viewed by a user, to notify the user that the unit 10 in the composite device is untrustworthy.

In the second possible implementation, the measurement information 2 of the unit 20 in step 602 may alternatively be obtained by the unit 10 from local secure storage space of the unit 10. In one case, the local measurement information 2 may be downloaded in advance from a device that stores the measurement information 2 such as the verifier and stored. For a specific implementation, refer to related descriptions in the first implementation. In another case, the measurement information 2 may be manually statically configured in the local secure storage space of the unit 10. In still another case, the unit 10 may directly obtain the measurement information 2 and store the measurement information 2 in the local secure storage space when loading the software package.

That the measurement information 2 of the unit 20 is manually statically configured in the unit 10 may include that a technician searches a location at which the measurement information 2 is stored, such as the verifier or the support website, for the measurement information 2 of the unit 20, and manually configures the measurement information 2 in the secure storage space of the unit 10.

That the unit 10 directly obtains the stores the measurement information 2 when loading the software package may include that the measurement information 2 of the unit 20 is preset in the software package, and when loading the software package, the unit 10 may obtain the measurement information 2 of the unit 20 that is preset in the software package, and the unit 10 may store the measurement information 2 in the local secure storage space.

It may be understood that the local secure storage space of the unit 10 is physical space that is in the unit 10 and that is restricted in access or that cannot be tampered with, for example, physical space that can be accessed only by a module that implements RAT through a RAT related process or a running process (which is referred to as a RAT component), and that can be used as secure storage space for storing the baseline value 1 of the measurement information, for another example, a storage area included in a TPM of the unit 10, for example, a storage area in a TPM chip of an entity, or a software isolation area (or a virtual TPM (VTPM)) in the unit 10, where the storage area included in the TPM and other storage space of the unit 10 are isolated by using a TrustZone technology or the like, and the measurement information 2 stored in the storage area included in the TPM cannot be tampered with.

In this way, the unit 10 locally stores the measurement information 2 of the unit 20. When needing to perform remote attestation on the unit 20, the unit 10 may directly locally obtain the measurement information 2 of the unit 20, and does not need to obtain the measurement information 2 of the unit 20 by interacting with the verifier. This greatly reduces an amount of data exchanged between the unit 10 and the verifier, reduces load of the verifier, and improves remote attestation efficiency for the composite device to some extent.

It may be understood that, through step 602, the unit 10 obtains the measurement information 2 of the unit 20 on which trustworthiness attestation is to be performed, to provide a reliable basis for the unit 10 to perform trustworthiness attestation on the unit 20, and make it possible for the unit 10 to perform trustworthiness attestation on the unit 20.

It should be noted that, a sequence of performing step 61 and step 602 is not limited. Step 601 may be performed before step 602, or step 602 may be performed before step 601, or step 601 and step 602 may be performed simultaneously.

Step 603: The unit 10 performs trustworthiness attestation on the unit 20 based on the measurement information 1 and the measurement information 2, to obtain an attestation result 1.

It may be understood that, after obtaining the measurement information 1 of the unit 20 and the measurement information 2 corresponding to the measurement information 1, the unit 10 may compare the measurement information 1 with the measurement information 2, determine whether an exception exists, and generate the attestation result 1.

In an example, when the measurement process is determinate, the measurement information 1 may include the PCR value 1, and the measurement information 2 may include the PCR reference value. In this case, step 603 may further include that the unit 10 determines through comparison whether the PCR value 1 is consistent with the PCR reference value, and generates the attestation result 1. If the PCR value 1 is consistent with the PCR reference value, the attestation result 1 indicates that the unit 20 is determined to be trustworthy through trustworthiness attestation by the unit 10, or, if the PCR value 1 is inconsistent with the PCR reference value, the attestation result 1 indicates that the unit 20 is determined to be untrustworthy through trustworthiness attestation by the unit 10.

In another example, when the measurement process is uncertain, the measurement information 1 may include the PCR value 2 and the measurement log, and the measurement information 2 may include a baseline value. In this case, step 603 may include: Step 1: The unit 10 calculates a PCR value 3 based on the measurement log. Step 2: The unit 10 determines through comparison whether the PCR value 3 is consistent with the PCR value 2, to obtain a comparison result 1. Step 3: The unit 10 determines through comparison whether the baseline value in the measurement log is consistent with the baseline value in the measurement information 2, to obtain a comparison result 2. Step 4: Generate the attestation result 1 based on the comparison result 1 and the comparison result 2. If both the comparison result 1 and the comparison result 2 indicate consistency, the attestation result 1 indicates that the unit 20 is determined to be trustworthy through trustworthiness attestation by the unit 10, or, if at least one of the comparison result 1 and the comparison result 2 indicates inconsistency, the attestation result 1 indicates that the unit 20 is determined to be untrustworthy through trustworthiness attestation by the unit 10.

The attestation result 1 may include information used to represent whether the unit 20 is trustworthy or untrustworthy, and may further include comparison information of a process of performing trustworthiness attestation based on the measurement information 1 and the measurement information 2. In addition, the attestation result 1 may further include a log of a trustworthiness attestation process that causes the unit 20 to be untrustworthy, so that the verifier learns of a specific reason why trustworthiness attestation performed by the unit 10 on the unit 20 fails.

Step 604: The unit 10 includes the attestation result 1 in a message 1 and sends the message 1 to the verifier.

Step 605: The verifier obtains the attestation result 1 from the message 1.

It may be understood that after obtaining the attestation result 1 of each unit 20, the unit 10 may generate, based on the attestation result 1, a message 1 corresponding to the unit 20, and send the message 1 to the verifier. The message 1 is used to indicate the attestation result 1 of the unit 10 for the unit 20 in the composite device to which the unit 10 belongs. During specific implementation, after receiving the message 1 sent by the unit 10, the verifier may obtain the attestation result 1 by parsing the message 1.

Figure 10:
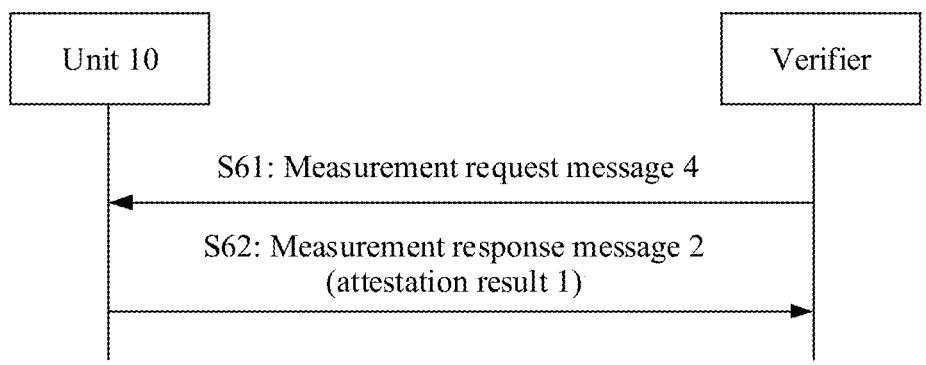
FIG. 10 is a signaling flowchart of an implementation of step 603 according to an embodiment of this application.

In an example, the message 1 may alternatively be a measurement response message 2 for a measurement request message 4. In this case, at any moment before the measurement response message 2, as shown in FIG. 10, this embodiment of this application further includes: S61: The verifier sends the measurement request message 4 to the unit 10, where the measurement request message 4 is used to request to perform trustworthiness attestation on the composite device. S62: The unit 10 feeds back the measurement response message 2 to the verifier. In this example, the measurement request message 4 carries the following information: Nonce, PCRs, aikType, and the like. If the measurement request message 4 does not include PCRs, the unit 10 needs to return all PCR values. The measurement request message 4 may be triggered periodically or may be triggered through manual configuration. The measurement response message 2 may carry the following information: Nonce, aik, quote, PcrBanks, EventLog, and the like, and may further carry the identification information 1 of the unit 20 and the attestation result 1 (which may be represented as Unit-RAResult).

In another example, the message 1 may alternatively be a measurement result notification message, and is used to notify a result of performing trustworthiness attestation by the unit 10 on the unit 20. For content carried in the message 1 and a specific function, refer to related descriptions of the measurement response message 2.

In addition, to reduce a quantity of times of communicating with the verifier and save network resources, after obtaining attestation results for all the other units in the composite device, the unit 10 may generate a message 1 based on all the attestation results and send the message 1 to the verifier. The message 1 is used to indicate an attestation result of the unit 10 for another unit in the composite device to which the unit 10 belongs.

In this way, when remote attestation is performed on the composite device, the unit 10 in the composite device may perform trustworthiness attestation on the other unit 20 in the composite device, and send an attestation result to the verifier, and the measurement information of the other unit 20 does not need to be sent to the verifier by using the unit 10. The verifier separately performs trustworthiness attestation on all the units. This greatly reduces an amount of data exchanged between the composite device and the verifier in a process of performing trustworthiness attestation on the composite device, reduces load of the verifier, and improves remote attestation efficiency for the composite device.

Figure 11:
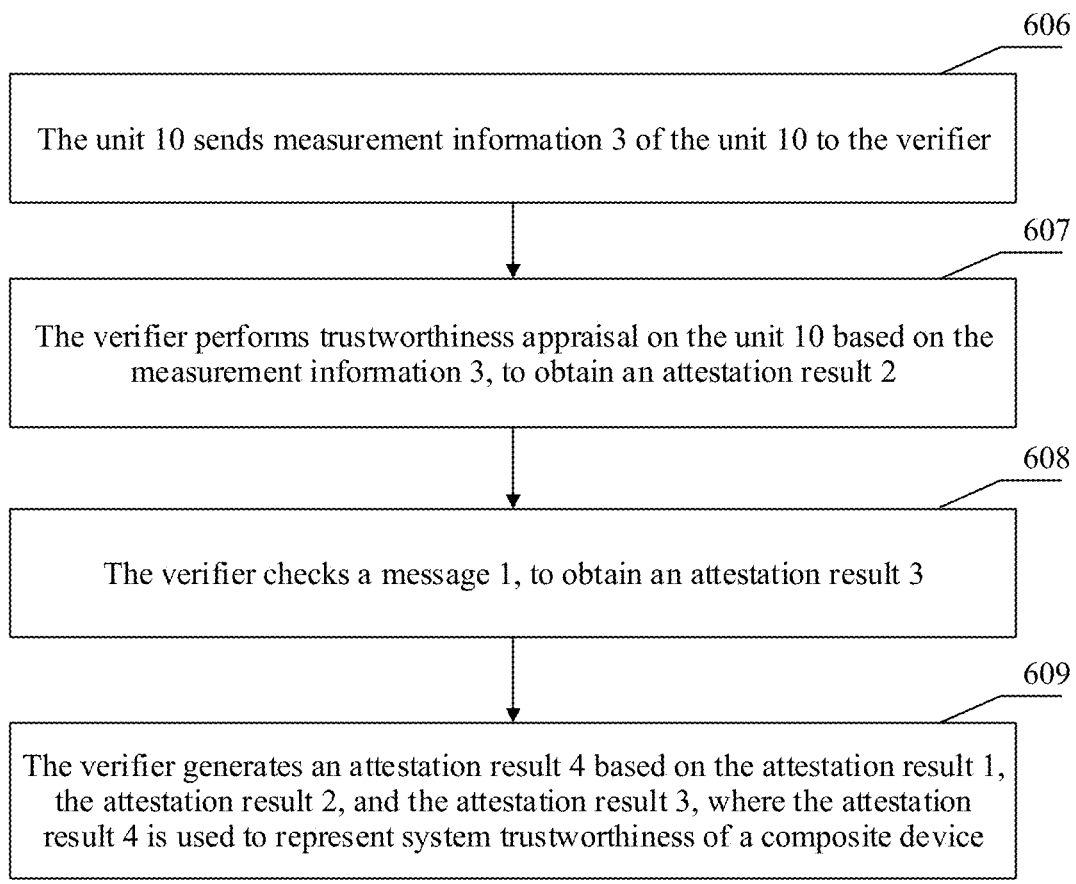
FIG. 11 is a schematic flowchart of another remote attestation method for a composite device according to an embodiment of this application.

In addition, after the verifier obtains the attestation result 1 of the unit 20, to determine system trustworthiness of the composite device, this embodiment of this application may further include that the verifier performs trustworthiness attestation on the unit 10, and the verifier checks the attestation result 1, and generates a final attestation result that is used to represent the system trustworthiness of the composite device. Refer to FIG. 11. This embodiment of this application may further include the following step 606 to step 609.

Step 606: The unit 10 sends measurement information 3 of the unit 10 to the verifier.

Step 607: The verifier performs trustworthiness attestation on the unit 10 based on the measurement information 3, to obtain an attestation result 2.

Step 608: The verifier checks the message 1, to obtain an attestation result 3.

Step 609: The verifier generates an attestation result 4 based on the attestation result 1, the attestation result 2, and the attestation result 3, where the attestation result 4 is used to represent the system trustworthiness of the composite device.

Step 606 and step 607 only need to be performed before step 609, for example, may be performed after step 605, or may be performed before step 601.

It may be understood that, after obtaining the measurement information 3 of the unit 10, the verifier may search for measurement information 4 of the unit 10 that is stored in the verifier. For a verification process in step 607, refer to descriptions of the process of performing trustworthiness attestation by the unit 10 on the unit 20 in step 603. Details are not described herein again.

For step 608, when receiving the message 1 sent by the unit 10, the verifier may obtain not only the attestation result 1, but also a log of the trustworthiness attestation process and a signature of the unit 20. The verifier may check the content in the message 1. Further, on the one hand, the verifier may obtain the signature of the unit 20 based on the message 1, determine whether the signature of the unit 20 is correct, and generate a check result 1. On the other hand, the verifier may also obtain, based on the message 1, the log of the process of performing trustworthiness attestation by the unit 10 on the unit 20, determine whether the process of performing trustworthiness attestation by the unit 10 on the unit 20 is accurate, and generate a check result 2. The check process is similar to the trustworthiness attestation process in step 603. For specific descriptions, refer to corresponding descriptions in step 603. In view of this, the verifier may generate the attestation result 3 based on the check result 1 and the check result 2.

When the check result 1 indicates that the signature of the unit 20 is correct, and the check result 2 indicates that the process of performing trustworthiness attestation by the unit 10 on the unit 20 is accurate, the attestation result 3 indicates that the check performed by the verifier on the attestation result 1 succeeds, or, when the check result 1 indicates that the signature of the unit 20 is incorrect, and/or the check result 2 indicates that the process of performing trustworthiness attestation by the unit 10 on the unit 20 is inaccurate, the attestation result 3 indicates that the check performed by the verifier on the attestation result 1 fails.

During specific implementation, when the verifier obtains the attestation result 1, the attestation result 2, and the attestation result 3, the verifier may perform step 609, that is, generate the attestation result 4 based on the attestation result 1, the attestation result 2, and the attestation result 3. The attestation result 4 may include information used to represent whether the composite device is trustworthy or untrustworthy. If the composite device is untrustworthy, the attestation result 4 may further include related information representing a reason why the composite device is untrustworthy. In one case, if each attestation result 1 indicates that the corresponding unit 20 is trustworthy, the attestation result 2 indicates that the unit 10 is trustworthy, and the attestation result 3 indicates that the signature of the unit 20 is correct and the process of performing trustworthiness attestation by the unit 10 on the unit 20 is accurate, the attestation result 4 indicates that a system of the composite device is trustworthy. In another case, if at least one of the following conditions is met: the attestation result 1 indicates that the unit 20 is untrustworthy, the attestation result 2 indicates that the unit 10 is untrustworthy, and the attestation result 3 indicates that the signature of the unit 20 is incorrect or the process of performing trustworthiness attestation by the unit 10 on the unit 20 is inaccurate, the attestation result 4 indicates that a system of the composite device is untrustworthy, and the attestation result 4 may further indicate the reason why the system of the composite device is untrustworthy. For example, when each attestation result 1 indicates that the corresponding unit 20 is trustworthy, the attestation result 2 indicates that the unit 10 is trustworthy, and the attestation result 3 indicates that the signature of the unit 20 is correct but the process of performing trustworthiness attestation by the unit 10 on the unit 20 is inaccurate, the attestation result 4 not only indicates that the system of the composite device is untrustworthy, but also indicates that the system of the composite device is untrustworthy because the process of performing trustworthiness attestation by the unit 10 on the unit 20 is inaccurate.

It can be learned that, in this embodiment of this application, in the proxy mode, the unit 10 in the composite device may perform local trustworthiness attestation on the other unit 20 in the composite device, and after obtaining the attestation result 1, send the attestation results 1 of all the units 20 to the verifier. The verifier does not need to obtain measurement information of a plurality of units 20, and does not need to perform trustworthiness attestation on each unit 20. This can not only greatly reduce load of the verifier, but also can reduce an amount of data exchanged between the composite device and the verifier and save network resources. Further, the verifier may check a local attestation result sent by the unit 10, and generate, based on the local attestation result, an overall attestation result of the system trustworthiness of the composite device. That is, the verifier can implement remote attestation on the composite device by performing a simple verification process based on little information, to determine the system trustworthiness of the composite device, and implement convenient, fast, and effective remote attestation on the composite device, thereby improving network reliability and security.

Figure 12:
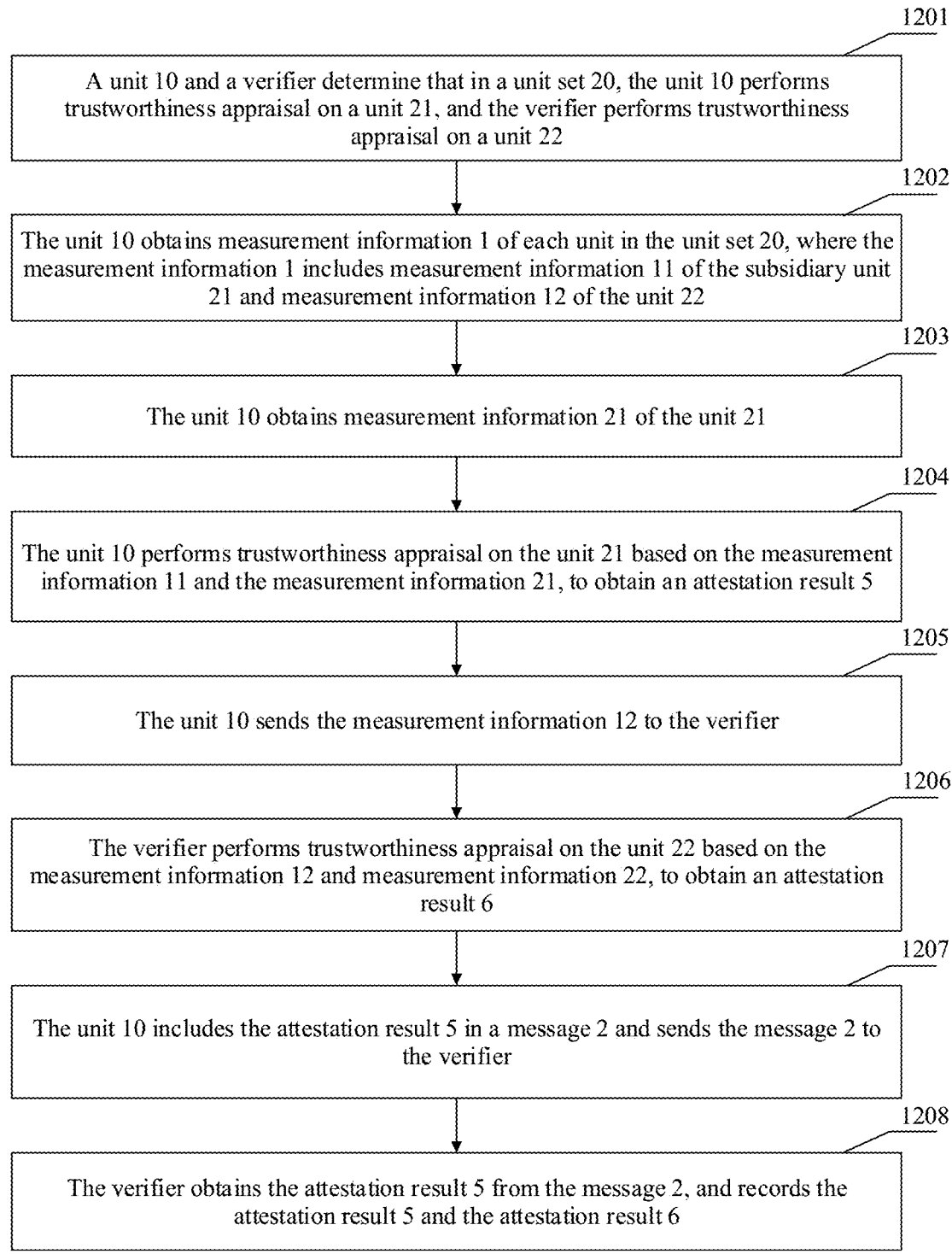
FIG. 12 is a schematic flowchart of still another remote attestation method for a composite device according to an embodiment of this application.

FIG. 12 is a schematic flowchart of another remote attestation method for a composite device according to an embodiment of this application. Refer to FIG. 12. The method is applied to a network including an attester and a verifier, and it is known that the attester is a composite device. The attester includes a unit 10 and a unit 20. The unit 10 may be the leader unit 311 in the active state in the composite device 300 in FIG. 3, a unit set 20 may be the leader unit 312 in the standby state and the subsidiary units 321, 322, . . . in the composite device 300 in FIG. 3, a unit 21 may be any one of the leader unit 312 in the standby state and the subsidiary units 321, 322, . . . , and a unit 22 may be any other unit than the unit 21 in the leader unit 312 in the standby state and the subsidiary units 321, 322, . . . . When remote attestation is performed on the composite device in a mixed attestation mode, using an example in which the leader unit 10 in the active state performs trustworthiness attestation on the unit 21, and the verifier performs trustworthiness attestation on the unit 22, the method may include the following step 1201 to step 1207.

Step 1201: The unit 10 and the verifier determine that in the unit set 20, the unit 10 performs trustworthiness attestation on the unit 21, and the verifier performs trustworthiness attestation on the unit 22.

Step 1202: The unit 10 obtains measurement information 1 of each unit in the unit set 20, where the measurement information 1 includes measurement information 11 of the unit 21 and measurement information 12 of the unit 22.

Step 1203: The unit 10 obtains measurement information 21 of the subsidiary unit 21.

Step 1204: The unit 10 performs trustworthiness attestation on the unit 21 based on the measurement information 11 and the measurement information 21, to obtain an attestation result 5.

Step 1205: The unit 10 sends the measurement information 12 to the verifier.

Step 1206: The verifier performs trustworthiness attestation on the unit 22 based on the measurement information 12 and measurement information 22, to obtain an attestation result 6.

Step 1207: The unit 10 includes the attestation result 5 in a message 2 and sends the message 2 to the verifier.

Step 1208: The verifier obtains the attestation result 5 from the message 2, and records the attestation result 5 and the attestation result 6.

For step 1201, in a possible implementation, identification information of a unit may be preconfigured in the unit 10. The identification information includes identification information 11 of the unit 21, indicating a set of units on which the unit 10 needs to perform trustworthiness attestation in the mixed attestation mode, where the set includes the unit 21. Similarly, identification information of a unit is also preconfigured in the verifier. The identification information includes identification information 12 of the unit 22, indicating a set of units on which the verifier needs to perform trustworthiness attestation in the mixed attestation mode, where the set includes the unit 22. In this way, in the mixed attestation mode, the unit 10 and the verifier can determine subsidiary units on which the unit 10 and the verifier are responsible for performing trustworthiness attestation, without performing additional negotiation, thereby saving negotiation time for remote attestation, and making the remote attestation more efficient in this manner.

Figure 13:
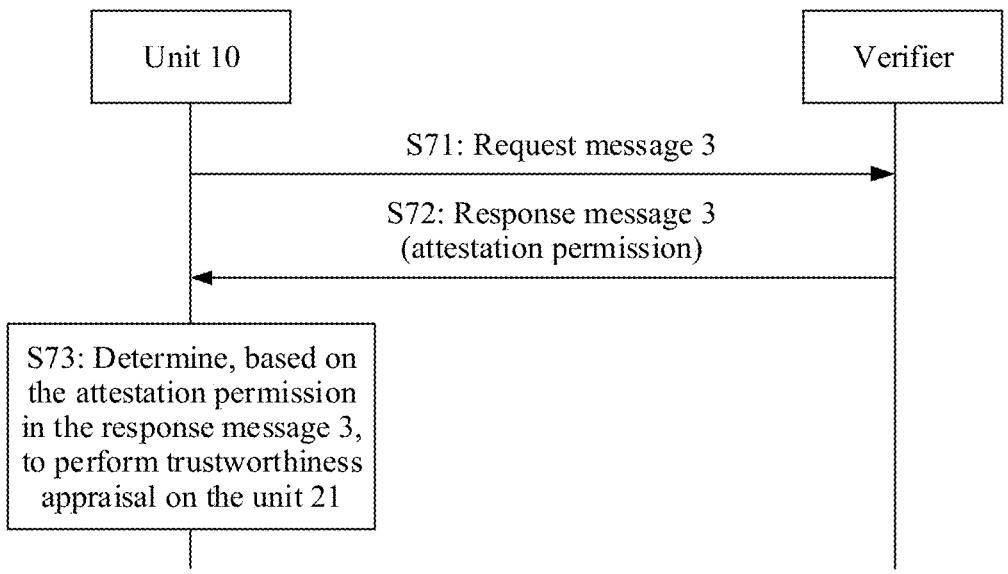
FIG. 13 is a signaling flowchart of an implementation of step 1201 according to an embodiment of this application.

In another possible implementation, the verifier and the unit 10 perform separate negotiation, to determine respective units on which the verifier and the unit 10 are responsible for performing trustworthiness attestation. As shown in FIG. 13, the method may include: S71: The unit 10 sends a request message 3 to the verifier, where the request message 3 is used to request an attestation permission from the verifier. S72: The verifier feeds back a response message 3 to the unit 10, where the response message 3 is used to indicate the determined attestation permission. S73: The unit 10 determines, based on the attestation permission in the response message 3, to perform trustworthiness attestation on the unit 21. The attestation permission may mean that in the mixed attestation mode, the verifier is requested to specify a set of units on which the unit 10 can perform trustworthiness attestation in all the units in the composite device. The unit 10 may learn, based on the attestation permission, of a specific unit on which the unit 10 is responsible for performing trustworthiness attestation, where the unit may include the unit 21.

It may be understood that the request message 3 may carry identification information 1 of the unit set 20 in the composite device, so that the verifier determines, from the unit set 20, a subset on which the unit 10 is to perform trustworthiness attestation, where the subset includes the unit 21. Alternatively, the request message 3 may carry a candidate unit set 20' that is determined by the unit 10 and on which the unit 10 is to perform trustworthiness attestation, to provide reference for the verifier to determine a subset on which the unit 10 is to perform trustworthiness attestation. A subset indicated in the response message 3 is not limited to a range of the candidate unit set 20'. In one case, units included in the subset may be all or some units in the candidate unit set 20'. In another case, units in the subset may alternatively include a unit other than a unit in the candidate unit set 20'. It should be noted that, when the response message 3 does not carry the identification information of the unit, it may be considered that the unit 10 is indicated to perform trustworthiness attestation on all other units. For a specific implementation in this case, refer to related descriptions in the embodiment shown in FIG. 6.

It should be noted that, in this implementation, the unit 10 may alternatively determine the attestation permission, that is, in this embodiment of this application, further, execution bodies of the steps in FIG. 13 may alternatively be exchanged, which may include: S71': The verifier sends a request message 3' to the unit 10, where the request message 3' is used to request an attestation permission from the unit 10. S72': The unit 10 feeds back a response message 3' to the verifier, where the response message 3' is used to indicate the determined attestation permission. S73': The verifier determines, based on the attestation permission in the response message 3', to perform trustworthiness attestation on the unit 22. For specific explanations, refer to the foregoing specific descriptions in FIG. 13.

It should be noted that, in one case, provided that it is determined that the mixed attestation mode is used, one targeted negotiation is performed, and respective unit sets on which the unit 10 and the verifier are responsible for performing trustworthiness attestation are determined. In another case, only one negotiation may alternatively be performed, and the determined attestation permission is stored, so that remote attestation is subsequently performed by using the attestation permission in the mixed attestation mode. In still another case, negotiation may be performed periodically, that is, a negotiation period (for example, 7 days) is preset, and one negotiation is performed in each negotiation period, to determine respective unit sets on which the unit 10 and the verifier are responsible for performing trustworthiness attestation, as a basis for division of labor when the verifier and the unit 10 perform remote attestation on the units in the composite device in the negotiation period.

In still another possible implementation, when a remote attestation mode is determined through negotiation, respective units on which the verifier and the unit 10 are responsible for performing trustworthiness attestation in the mixed attestation mode may alternatively be determined through negotiation. For a specific implementation, refer to related descriptions in the following embodiments shown in FIG. 15A and FIG. 15B.

For specific implementations of step 1202 to step 1208, refer to related descriptions in the foregoing embodiment shown in FIG. 6.

It should be noted that, step 1203 and step 1204 and step 1205 and step 1206 may be performed simultaneously, or step 1203 and step 1204 may be performed before step 1205 and step 1206, or step 1205 and step 1206 may be performed before step 1203 and step 1204. Step 1207 only needs to be performed after step 1204, that is, may be performed between step 1204 and step 1205, or may be performed at a location shown in FIG. 12.

Figure 14:
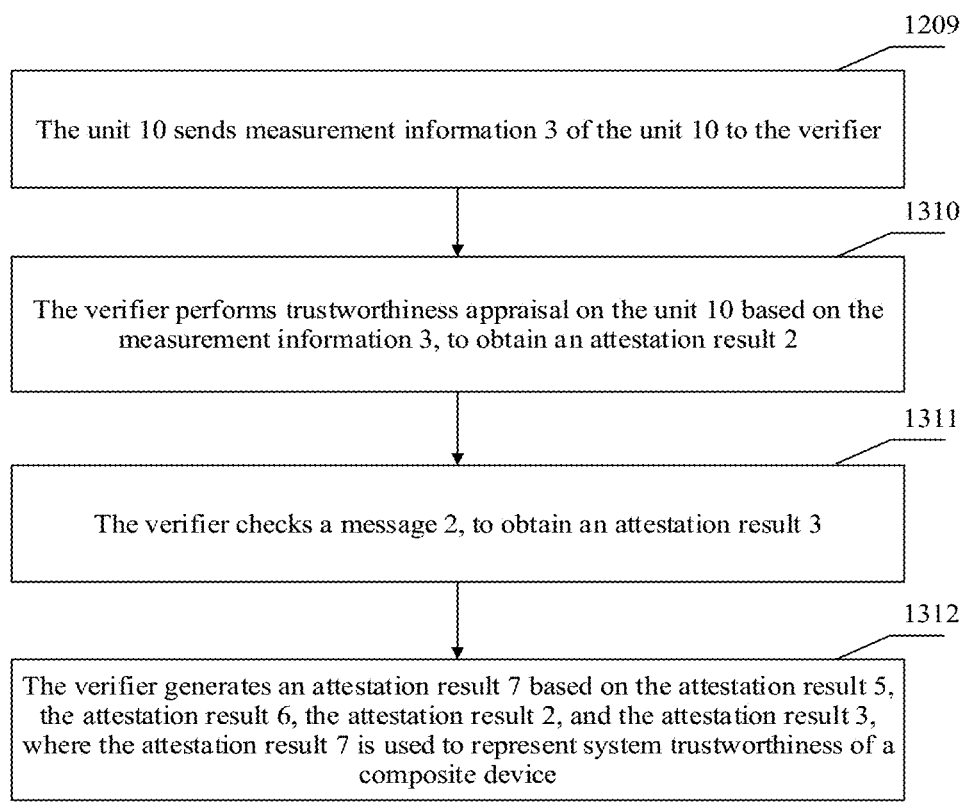
FIG. 14 is a schematic flowchart of yet another remote attestation method for a composite device according to an embodiment of this application.

In addition, after the verifier records the attestation result 5 and the attestation result 6, to determine system trustworthiness of the composite device, this embodiment of this application may further include that the verifier performs trustworthiness attestation on the unit 10, and the verifier checks the attestation result 5, and generates a final attestation result that is used to represent the system trustworthiness of the composite device. Refer to FIG. 14. This embodiment of this application may further include the following step 1209 to step 1212.

Step 1209: The unit 10 sends measurement information 3 of the unit 10 to the verifier.

Step 1210: The verifier performs trustworthiness attestation on the unit 10 based on the measurement information 3, to obtain an attestation result 2.

Step 1211: The verifier checks the message 2, to obtain an attestation result 3.

Step 1212: The verifier generates an attestation result 7 based on the attestation result 5, the attestation result 6, the attestation result 2, and the attestation result 3, where the attestation result 7 is used to represent the system trustworthiness of the composite device.

Step 1209 and step 1210 only need to be performed before step 1212, for example, may be performed after step 1208, or may be performed before step 1201.

It should be noted that, for implementations of step 1209 to step 1212, refer to related descriptions of step 606 to step 609 in FIG. 11.

It may be understood that, when the verifier obtains the attestation result 5, the attestation result 6, the attestation result 2, and the attestation result 3, the verifier may perform step 1212, that is, generate the attestation result 7 based on the attestation result 5, the attestation result 6, the attestation result 2, and the attestation result 3. The attestation result 7 may include information used to represent whether the composite device is trustworthy or untrustworthy. If the composite device is untrustworthy, the attestation result 7 may further include related information representing a reason why the composite device is untrustworthy. In one case, if the attestation result 5 indicates that each unit 21 on which the unit 10 performs trustworthiness attestation is trustworthy, the attestation result 6 indicates that each unit 22 on which the verifier performs trustworthiness attestation is trustworthy, the attestation result 2 indicates that the unit 10 is trustworthy, and the attestation result 3 indicates that a signature of the unit 21 is correct and a process of performing trustworthiness attestation by the unit 10 on the unit 21 is accurate, the attestation result 7 indicates that a system of the composite device is trustworthy. In another case, if at least one of the following conditions is met: the attestation result 5 indicates that the unit 21 is untrustworthy, the attestation result 6 indicates that the unit 22 is untrustworthy, the attestation result 2 indicates that the unit 10 is untrustworthy, and the attestation result 3 indicates that a signature of the unit 21 is incorrect or a process of performing trustworthiness attestation by the unit 10 on the unit 21 is inaccurate, the attestation result 7 indicates that a system of the composite device is untrustworthy, and the attestation result 7 may further indicate a reason why the system of the composite device is untrustworthy. For example, when the attestation result 5 indicates that there is an untrustworthy unit in units 21 on which the unit 10 performs trustworthiness attestation, the attestation result 6 indicates that each unit 22 is trustworthy, the attestation result 2 indicates that the unit 10 is trustworthy, the attestation result 3 indicates that the signature of the unit 20 is correct and the process of performing trustworthiness attestation by the unit 10 on the unit 20 is accurate, the attestation result 7 not only indicates that the system of the composite device is untrustworthy, but also indicates that the system of the composite device is untrustworthy because the unit 10 verifies that there is an untrustworthy unit.

It can be learned that, in this embodiment of this application, in the mixed attestation mode, the unit 10 in the composite device may perform local trustworthiness attestation on some units in the composite device, and the verifier performs trustworthiness attestation on the other units. In this way, the verifier does not need to perform trustworthiness attestation on all the units in the composite device. This can reduce load of the verifier to some extent, reduce an amount of data exchanged between the composite device and the verifier, and save network resources. Further, the verifier may check a local attestation result sent by the unit 10, and generate, based on the local attestation result, an overall attestation result of the system trustworthiness of the composite device. That is, the verifier can implement remote attestation on the composite device by performing a simple verification process based on little information, to determine the system trustworthiness of the composite device, and implement convenient, fast, and effective remote attestation on the composite device, thereby improving network reliability and security.

In addition, in the remote attestation method for a composite device in this embodiment of this application, a plurality of remote attestation modes are used. In this case, this embodiment of this application further includes a process of determining the remote attestation mode. During specific implementation, methods for determining the remote attestation mode include but are not limited to the following four types.

In the first example, for determining of the remote attestation mode, further, the remote attestation mode may be manually preconfigured in the composite device and the verifier. In this case, the remote attestation method corresponding to the embodiment shown in FIG. 6 or FIG. 12 may be performed based on the configured remote attestation mode. When the remote attestation mode needs to be switched, a new remote attestation mode may be reconfigured, and the newly configured remote attestation mode is used to perform remote attestation on the composite device.

In the second example, the remote attestation mode may alternatively be determined by a third-party device (for example, a controller or a network management server) and configured in the verifier and the unit 10, to indicate the verifier and the unit 10 to perform remote attestation on the composite device in the remote attestation mode. In one case, the third-party device may separately deliver the determined remote attestation mode to the verifier and the unit 10. In another case, the third-party device may alternatively deliver the determined remote attestation mode to the verifier, and then the verifier sends the determined remote attestation mode to the unit 10. In still another case, the third-party device may alternatively deliver the determined remote attestation mode to the unit 10, and then the unit 10 sends the determined remote attestation mode to the verifier. A message in the NETCONF may be used to deliver the determined remote attestation mode between the third-party device and the verifier, between the third-party device and the unit 10, and between the verifier and the unit 10.

In the third example, the remote attestation mode may not be determined in advance, but may be determined by using a message exchanged when the verifier and the unit 10 perform remote attestation. For example, if the message sent by the unit 10 to the verifier carries trustworthiness attestation results of all the other units, it may be considered that the proxy mode is used between the unit 10 and the verifier, and the proxy mode is determined as the remote attestation mode between the unit 10 and the verifier. For another example, if the message sent by the unit 10 to the verifier carries measurement information of all the other units, it may be considered that the relay mode is used between the unit 10 and the verifier, and the relay mode is determined as the remote attestation mode between the unit 10 and the verifier. For still another example, if the message sent by the unit 10 to the verifier carries measurement information of some unit sets and trustworthiness attestation results of other units, it may be considered that the mixed attestation mode is used between the unit 10 and the verifier, and the mixed attestation mode is determined as the remote attestation mode between the unit 10 and the verifier.

Figure 15A:
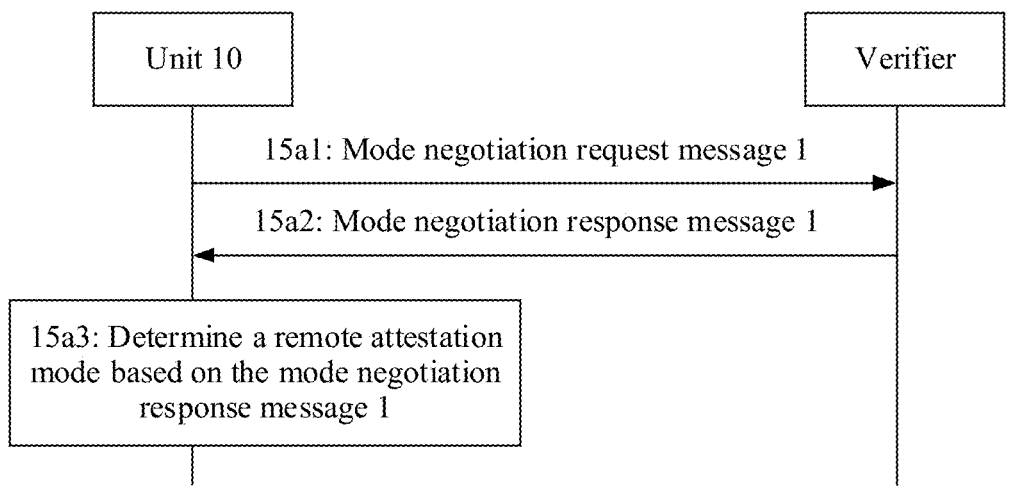
FIG. 15A is a signaling flowchart of a negotiation method for a remote attestation mode according to an embodiment of this application.
Figure 15B:
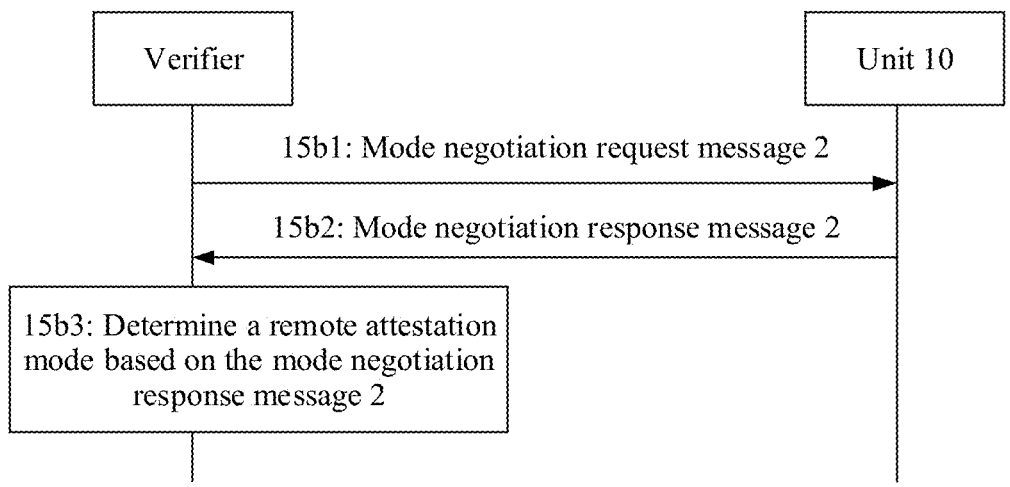
FIG. 15B is a signaling flowchart of another negotiation method for a remote attestation mode according to an embodiment of this application.

In the fourth example, the embodiments of this application further provide a negotiation method for a remote attestation mode. In the method, the remote attestation mode used between the verifier and the unit 10 is determined through negotiation. The method is applied to a network including an attester and a verifier, and it is known that the attester is a composite device, and the attester includes a unit 10 and a unit 20. In one case, as shown in FIG. 15A, the remote attestation mode may be determined by the verifier. In another case, as shown in FIG. 15B, the remote attestation mode may alternatively be determined by the unit 10.

FIG. 15A is a signaling flowchart of a negotiation method for a remote attestation mode according to an embodiment of this application. The negotiation method for a remote attestation mode may include the following steps.

Step 15a1: The unit 10 sends a mode negotiation request message 1 to the verifier.

Step 15a2: The verifier feeds back a mode negotiation response message 1 to the unit 10.

Step 15a3: The unit 10 determines a remote attestation mode based on the mode negotiation response message 1.

It may be understood that, in one case, the mode negotiation request message 1 may carry a candidate remote attestation mode, and the candidate remote attestation mode may be at least one of the following modes: a relay mode, a proxy mode, and a mixed attestation mode. In another case, the mode negotiation request message 1 may not carry any candidate remote attestation mode. In this case, it may be considered by default that the unit 10 supports any remote attestation mode, and the verifier completely determines the remote attestation mode.

For the verifier, after receiving the mode negotiation request message 1, the verifier needs to determine the remote attestation mode to be used. In one case, when the mode negotiation request message 1 carries the candidate remote attestation mode, the verifier may determine, from the candidate remote attestation mode, the remote attestation mode to be used, or the verifier may independently determine the remote attestation mode to be used, without considering the candidate remote attestation mode. In another case, when the mode negotiation request message 1 does not carry the candidate remote attestation mode, the verifier may determine, based on a requirement and a capability of the verifier, the remote attestation mode to be used.

After determining the remote attestation mode to be used, the verifier may generate the mode negotiation response message 1 based on the remote attestation mode to be used, and feed back the mode negotiation response message 1 to the unit 10. Usually, the unit 10 determines, by parsing the mode negotiation response message 1, the remote attestation mode to be used.

It should be noted that, when the candidate mode includes the mixed attestation mode, to reduce time consumed by remote attestation and improve remote attestation efficiency, the mode negotiation request message 1 may further carry a candidate unit set 20' on which the unit 10 is to perform trustworthiness attestation. Similarly, when the verifier determines that the remote attestation mode to be used is the mixed attestation mode, the mode negotiation response message 1 may further carry a unit set that is determined by the verifier and on which the unit 10 is responsible for performing trustworthiness attestation, where the unit set includes a unit 21.

In this way, in a negotiation manner provided in FIG. 15A, the verifier may determine the remote attestation mode to be used between the verifier and the composite device, and notify the unit 10 in the composite device of the remote attestation mode, so that the remote attestation mode is determined between the unit 10 and the verifier. In this way, the remote attestation method shown in FIG. 6 or FIG. 12 can be determinedly performed between the verifier and the composite device, thereby providing a prerequisite for performing efficient remote attestation on the composite device in an orderly manner.

FIG. 15B is a signaling flowchart of another negotiation method for a remote attestation mode according to an embodiment of this application. The negotiation method for a remote attestation mode may include the following steps.

Step 15b1: The verifier sends a mode negotiation request message 2 to the unit 10.

Step 15b2: The unit 10 feeds back a mode negotiation response message 2 to the verifier.

Step 15b3: The verifier determines a remote attestation mode based on the mode negotiation response message 2.

It should be noted that, in this embodiment, only the execution bodies of the steps in FIG. 15A are exchanged, and the unit 10 determines the remote attestation mode to be used between the unit 10 and the verifier. Therefore, for a specific implementation and related descriptions in this embodiment of this application, refer to related descriptions in FIG. 15A.

In this way, in a negotiation manner provided in FIG. 15B, the unit 10 in the composite device may determine the remote attestation mode to be used between the unit 10 and the verifier, and notify the verifier of the remote attestation mode, so that the remote attestation mode is determined between the unit 10 and the verifier. In this way, the remote attestation method shown in FIG. 6 or FIG. 12 can be determinedly performed between the verifier and the composite device, thereby providing a prerequisite for performing efficient remote attestation on the composite device in an orderly manner.

It should be noted that, in an actual negotiation process for the remote attestation mode, in addition to the implementations shown in FIG. 15A and FIG. 15B, the remote attestation mode may be further negotiated through a plurality of complex interactions between the unit 10 and the verifier. To describe more clearly a possible implementation of negotiating the remote attestation mode through a plurality of interactions in an actual communication process, the following describes, by using FIG. 16A and FIG. 16B as examples, a plurality of cases that may occur in a process of negotiating the remote attestation mode between the unit 10 and the verifier.

Figure 16A:
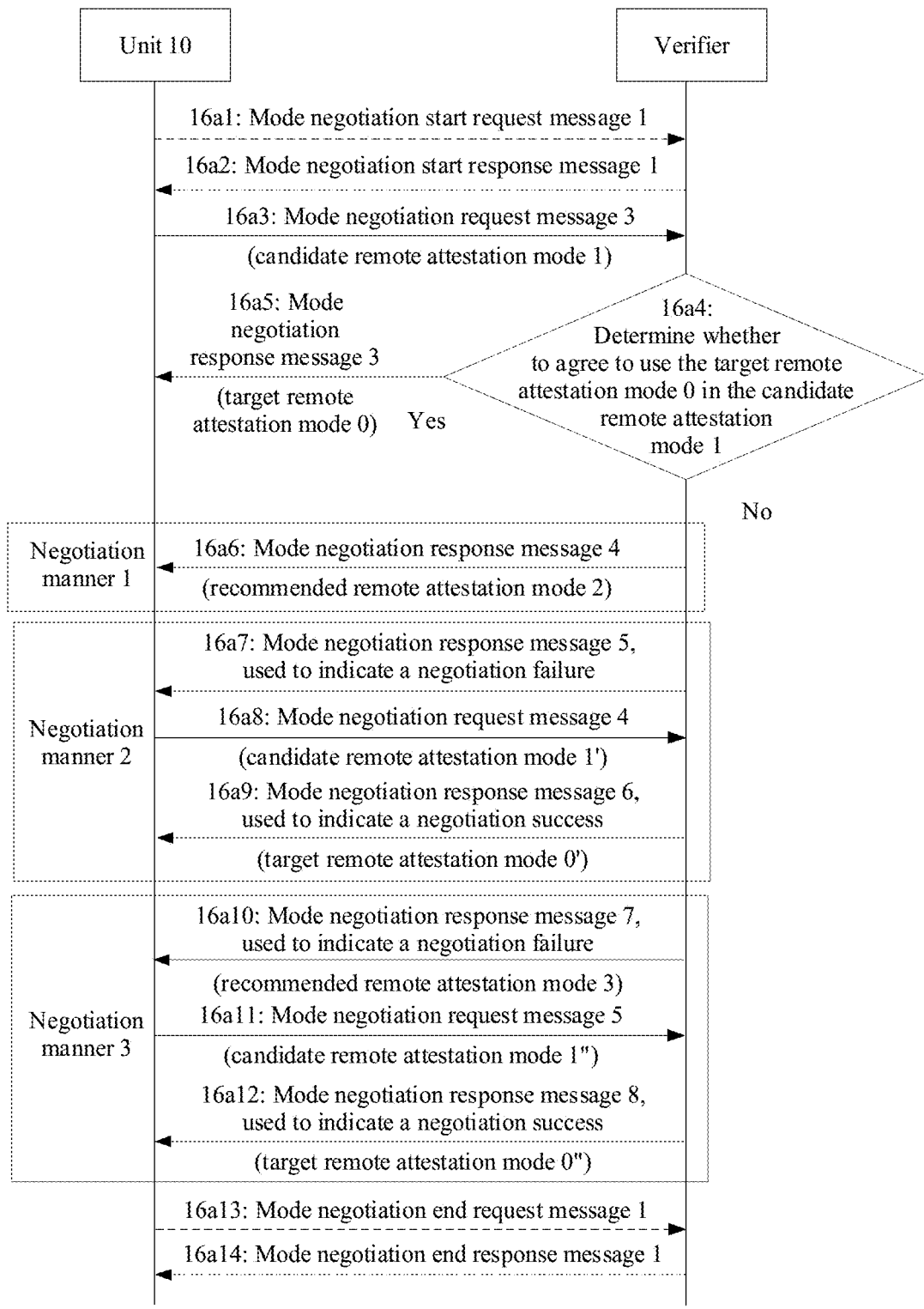
FIG. 16A is a signaling flowchart of still another negotiation method for a remote attestation mode according to an embodiment of this application.

Refer to FIG. 16A. When the verifier determines a target remote attestation mode to be used, the negotiation method for a remote attestation mode provided in this embodiment of this application may include, for example, the following steps.

Step 16a1: The unit 10 sends a mode negotiation start request message 1 to the verifier.

It may be understood that the mode negotiation start request message 1 does not include specific content of remote attestation mode negotiation, and is only used to notify the verifier that the unit 10 expects to start negotiation of the remote attestation mode with the verifier, and requests the verifier to start negotiation of the remote attestation mode.

Step 16a2: The verifier sends a mode negotiation start response message 1 to the unit 10.

It may be understood that the mode negotiation start response message 1 is used to indicate whether the verifier agrees to start negotiation of the remote attestation mode with the unit 10. If yes, the following steps are performed, otherwise, the negotiation is terminated, and subsequent steps are not performed.

It should be noted that, step 16a1 and step 16a2 are steps that may be optionally performed in this embodiment.

Step 16a3: The unit 10 sends a mode negotiation request message 3 to the verifier.

It may be understood that the mode negotiation request message 3 includes a candidate remote attestation mode 1 recommended by the unit 10. The candidate remote attestation mode 1 may be a remote attestation mode most desired by the unit 10, or may be a plurality of remote attestation modes supported by the unit 10.

When the mode negotiation request message 3 carries a plurality of candidate remote attestation modes 1, the mode negotiation request message 3 may further include a use priority corresponding to each candidate remote attestation mode 1. The use priority may be flexibly defined for each candidate remote attestation mode 1 based on a load status of the verifier and an actual status of a subsidiary unit in the composite device. For example, it is assumed that three candidate remote attestation modes 1 are sequentially included in the mode negotiation request message 3 from front to back: a proxy mode, a mixed attestation mode, and a relay mode. In this case, use priorities corresponding to the candidate remote attestation modes 1 in descending order may be: the proxy mode>the mixed attestation mode>the relay mode, or may be: the proxy mode<the mixed attestation mode<the relay mode. During specific implementation, the use priority may be indicated by using a separate priority field, and a value type in the priority field may be an integer value type (for example, a larger number indicates a higher use priority, or a larger number indicates a lower use priority), a character string type, or the like.

Step 16a4: The verifier determines whether to agree to use a target remote attestation mode 0 in the candidate remote attestation mode 1. If yes, step 16a5 is performed, otherwise, any one of the following processes step 16a6, step 16a7 to step 16a9, or step 16a10 to step 16a12 may be performed.

Step 16a5: The verifier sends a mode negotiation response message 3 to the unit 10, to indicate a negotiation success.

To represent the determined target remote attestation mode 0, the mode negotiation response message 3 may include a negotiation result field. In addition to indicating that a negotiation result is the negotiation success, a value of the field may be further used to indicate the remote attestation mode 0 that the verifier agrees to use.

It should be noted that, when the candidate remote attestation mode 1 in the mode negotiation request message 3 includes only the target remote attestation mode 0, the value of the negotiation result field in the mode negotiation response message 3 may be used only to indicate that the negotiation result is the negotiation success, and does not need to indicate the remote attestation mode 0 that the verifier agrees to use.

If the verifier does not agree to use the candidate remote attestation mode 1 for subsequent remote attestation, the negotiation is considered as unsuccessful. In this case, the following three possible implementations may be included.

In a possible implementation, the following step 16a6 may be performed.

Step 16a6: The verifier sends a mode negotiation response message 4 to the unit 10.

The mode negotiation response message 4 carries a negotiation result field. In addition to indicating that a negotiation result is a negotiation failure, a value of the negotiation result field may be further used to indicate a remote attestation mode 2 recommended by the verifier.

It may be understood that, after the unit 10 receives the mode negotiation response message 4, if the unit 10 agrees on the remote attestation mode 2, the negotiation is considered as successful, and the remote attestation mode 2 is used for remote attestation. For the verifier, if no new mode negotiation request message is received after step 16a6, the negotiation is also considered as successful, and the remote attestation mode 2 is used for subsequent remote attestation.

In another possible implementation, the following step 16a7 to step 16a9 may be performed.

Step 16a7: The verifier sends a mode negotiation response message 5 to the unit 10, to indicate a negotiation failure.

The mode negotiation response message 5 carries a negotiation result field, and a value of the negotiation result field may only be used to indicate that the negotiation result is a negotiation failure. The mode negotiation response message 5 may not include content of a specific remote attestation mode, and is only used to notify the unit 10 that the previous negotiation fails.

Step 16a8: The unit 10 sends a mode negotiation request message 4 to the verifier.

It may be understood that the mode negotiation request message 4 includes a candidate remote attestation mode 1' that is newly proposed and recommended by the unit 10.

Step 16a9: The verifier sends a mode negotiation response message 6 to the unit 10, where the message carries a target remote attestation mode 0' determined from a candidate remote attestation mode 1', and is used to indicate a negotiation success.

It should be noted that, for related descriptions of step 16a8 and step 16a9, refer to related descriptions of step 16a3 to step 16a5.

In still another possible implementation, the following step 16a10 to step 16a12 may be performed.

Step 16*a*10: The verifier sends a mode negotiation response message 7 to the unit 10, to indicate a negotiation failure.

The mode negotiation response message 7 carries a negotiation result field. In addition to indicating that a negotiation result is the negotiation failure, a value of the negotiation result field may be further used to indicate a remote attestation mode 3 recommended by the verifier.

Step 16*a*11: The unit 10 sends a mode negotiation request message 5 to the verifier.

It may be understood that the mode negotiation request message 5 includes a candidate remote attestation mode 1" that is newly proposed and recommended by the unit 10 by referring to the remote attestation mode 3 recommended by the verifier.

Step 16*a*12: The verifier sends a mode negotiation response message 8 to the unit 10, where the message carries a target remote attestation mode 0" determined from the candidate remote attestation mode 1", and is used to indicate a negotiation success.

It should be noted that, for related descriptions of step 16*a*11 and step 16*a*12, refer to related descriptions of step 16*a*3 to step 16*a*5.

In this way, after the first remote attestation mode negotiation fails, the remote attestation mode negotiation may be continued in the foregoing three specific implementations, until the verifier determines the target remote attestation mode that both the verifier and the unit 10 agree to use. This provides a prerequisite for performing subsequent remote attestation provided in this embodiment of this application in an orderly manner.

Optionally, this embodiment of this application may further include the following steps.

Step 16*a*13: The unit 10 sends a mode negotiation end request message 1 to the verifier, to notify the verifier that the mode negotiation procedure ends.

Step 16*a*14: The verifier returns a mode negotiation end response message 1 to the unit 10.

The mode negotiation end request message 1 may include a negotiation result of the current negotiation, for example, a negotiation success or a negotiation failure. If the negotiation result is the negotiation success, the mode negotiation end response message 1 may further include the target remote mode determined through negotiation, or may include the target remote mode determined through negotiation and identification information 11 of the subsidiary unit 21 on which the unit 10 performs trustworthiness attestation. The verifier may determine, based on content in the mode negotiation end request message 1, whether related information such as the negotiation result sent by the unit 10 is consistent with related information such as the negotiation result determined by the verifier, to obtain a comparison result, and include the comparison result in the mode negotiation end response message 1. If the comparison result indicates that the verifier and the unit 10 agree with each other on the related information such as the negotiation result, the negotiation is considered successful, or, if the comparison result indicates that the verifier and the unit 10 disagree with each other on the related information such as the negotiation result, the negotiation is considered unsuccessful.

It can be learned that, through step 16*a*1 to step 16*a*14, the verifier determines, through negotiation, the remote attestation mode used in the remote attestation process of the composite device. This provides a data basis for the remote attestation method provided in this embodiment of this application in an orderly manner.

Figure 16B:
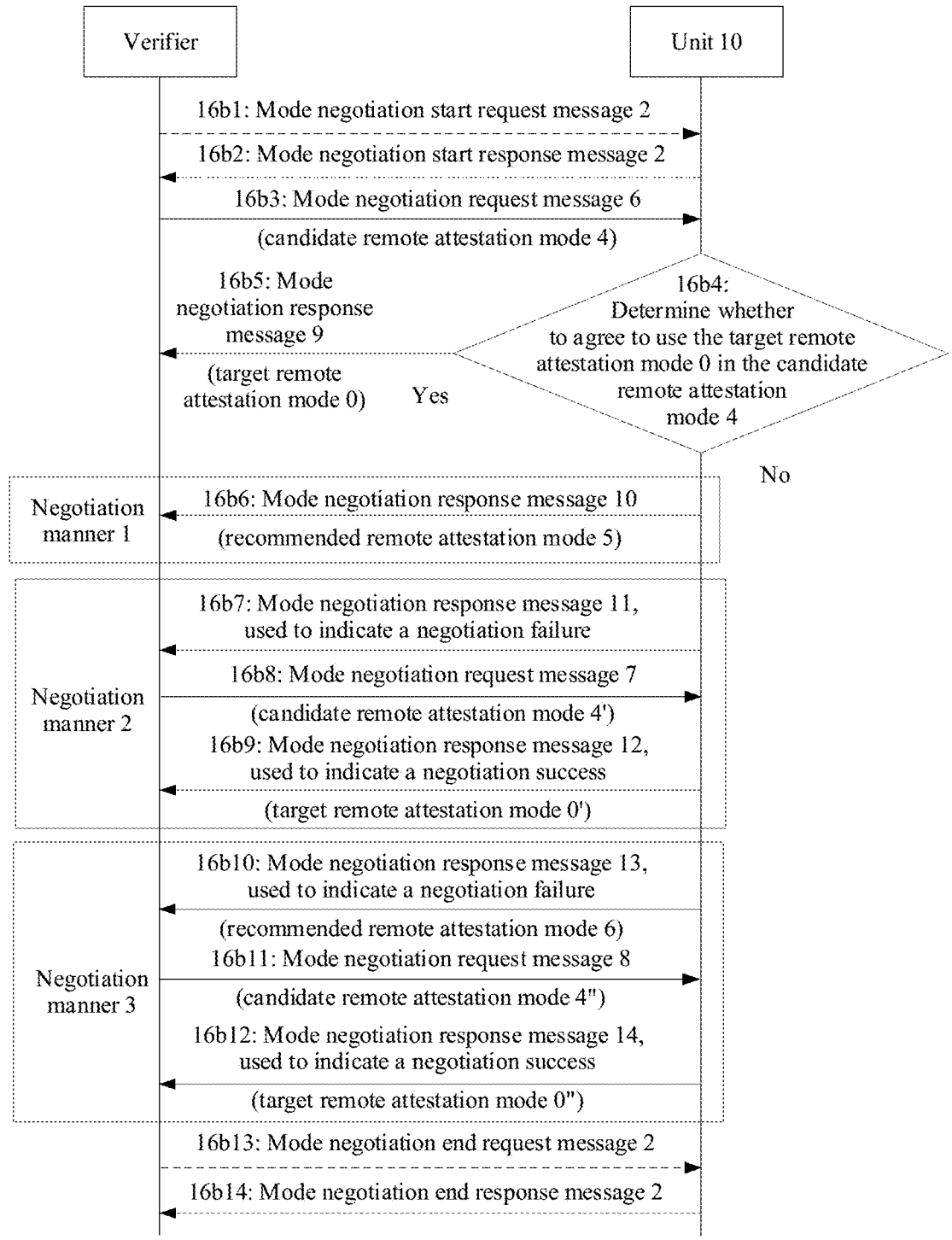
FIG. 16B is a signaling flowchart of yet another negotiation method for a remote attestation mode according to an embodiment of this application.

Refer to FIG. 16B. When the unit 10 determines a target remote attestation mode to be used, the negotiation method for a remote attestation mode provided in this embodiment of this application may include, for example, the following steps.

Step 16*b*1: The verifier sends a mode negotiation start request message 2 to the unit 10.

Step 16*b*2: The unit 10 sends a mode negotiation start response message 2 to the verifier.

It should be noted that, step 16*b*1 and step 16*b*2 are steps that may be optionally performed in this embodiment.

Step 16*b*3: The verifier sends a mode negotiation request message 6 to the unit 10.

Step 16*b*4: The unit 10 determines whether to agree to use a target remote attestation mode 0 in a candidate remote attestation mode 4. If yes, step 16*b*5 is performed, otherwise, any one of the following processes: step 16*b*6, step 16*b*7 to step 16*b*9, or step 16*b*10 to step 16*b*12 may be performed.

Step 16*b*5: The unit 10 sends a mode negotiation response message 9 to the verifier, to indicate a negotiation success.

If the unit 10 does not agree to use the candidate remote attestation mode 1 for subsequent remote attestation, the negotiation is considered as unsuccessful. In this case, the following three possible implementations may be included.

In a possible implementation, the following step 16*b*6 may be performed.

Step 16*b*6: The unit 10 sends a mode negotiation response message 10 to the verifier, where the message carries a recommended remote attestation mode 5.

In another possible implementation, the following step 16*b*7 to step 16*b*9 may be performed.

Step 16*b*7: The unit 10 sends a mode negotiation response message 11 to the verifier, to indicate a negotiation failure.

Step 16*b*8: The verifier sends a mode negotiation request message 7 to the unit 10, where the message carries a candidate remote attestation mode 4' that is newly proposed and recommended by the verifier.

Step 16*b*9: The unit 10 sends a mode negotiation response message 12 to the verifier, where the message carries a target remote attestation mode 0' determined from a candidate remote attestation mode 4', and is used to indicate a negotiation success.

In still another possible implementation, the following step 16*b*10 to step 16*b*12 may be performed.

Step 16*b*10: The unit 10 sends a mode negotiation response message 13 to the verifier, to indicate a negotiation failure, and provide a remote attestation mode 6 recommended by the unit 10.

Step 16*b*11: The verifier sends a mode negotiation request message 8 to the unit 10, where the message carries a candidate remote attestation mode 4" that is newly proposed and recommended by the verifier.

Step 16*b*12: The unit 10 sends a mode negotiation response message 14 to the verifier, where the message carries a target remote attestation mode 0" determined from a candidate remote attestation mode 1", and is used to indicate a negotiation success.

Optionally, this embodiment of this application may further include the following steps.

Step 16*b*13: The verifier sends a mode negotiation end request message 2 to the unit 10, to notify the unit 10 that the mode negotiation procedure ends.

Step 16*b*14: The unit 10 returns a mode negotiation end response message 2 to the verifier.

It should be noted that, for implementations and related descriptions of step 16*b*1 to step 16*b*14, refer to step 16*a*1 to step 16*a*14 in FIG. 16A. Details are not described herein again.

It can be learned that, through step 16*b*1 to step 16*b*14, the unit 10 in the composite device determines, through negotiation, the remote attestation mode used in the remote attestation process of the composite device. This provides a data basis for the remote attestation method provided in this embodiment of this application in an orderly manner.

In addition, manners of triggering trustworthiness attestation on the composite device may include: Manner 1: The unit 10 may periodically send a triggering request 1 to the verifier, where the triggering request 1 is used to periodically trigger the verifier to perform trustworthiness attestation on the composite device. For example, the unit 10 generates a triggering request 1 and sends the triggering request 1 to the verifier every 2 hours, to trigger the verifier to start one time of remote attestation on the composite device in which the unit 10 is located. Manner 2: The unit 10 may alternatively send a triggering request 2 to the verifier based on occurrence of an event, where the triggering request 2 is used to trigger the verifier to perform trustworthiness attestation on the composite device, and the event may include at least one of the following cases: an active/standby switchover of a control plane, update of a forwarding plane, or execution of a command line.

In an example, for a composite device including a plurality of leader units, because the leader unit in an active state is faulty, to ensure that the composite device can be used normally, a state of a leader unit in the standby state may be switched to the active state. In addition, the leader unit that can work normally takes over the unavailable leader unit. This process may be summarized as occurrence of an active/standby switchover event of a control plane. It may be understood that the units 10 in the foregoing embodiments are all leader units that are currently in the active state.

In another example, a subsidiary unit may be newly added or replaced at any time based on a service requirement of the composite device. For example, a new forwarding board is inserted into a router or an original forwarding board 1 is replaced with a forwarding board 1', to improve performance of the router. This process may be summarized as an update event of a forwarding plane.

In still another example, an instruction may be further entered and executed in a command line based on an actual requirement, to trigger sending of a triggering request 2 to the verifier, and triggering the verifier to start one time of remote attestation. This process may be summarized as occurrence of an execution event of a command line.

It may be understood that the events in the foregoing three examples may be sensed by the unit 10, and when sensing occurrence of the foregoing event, the unit 10 may generate the triggering request 2 and send the triggering request 2 to the verifier.

Remote attestation is usually initiated by the verifier. A to-be-attested attester can only passively perform remote attestation after the verifier initiates a request. In this case, to ensure that after the foregoing event occurs on the composite device, trustworthiness attestation may be performed on the composite device in time after the event occurs, to ensure security of the composite device and a network. In this embodiment of this application, a unit in the composite device is further assigned a function of actively initiating remote attestation.

In some possible implementations, when the active/standby switchover event of the control plane occurs on the composite device, that is, the leader unit 10 in the active state is unavailable, the leader unit 11 switches from the standby state to the active state, and takes over the leader unit 10 to continue working. In this case, the leader unit 11 may actively initiate one time of remote attestation to the verifier.

Figure 17A:
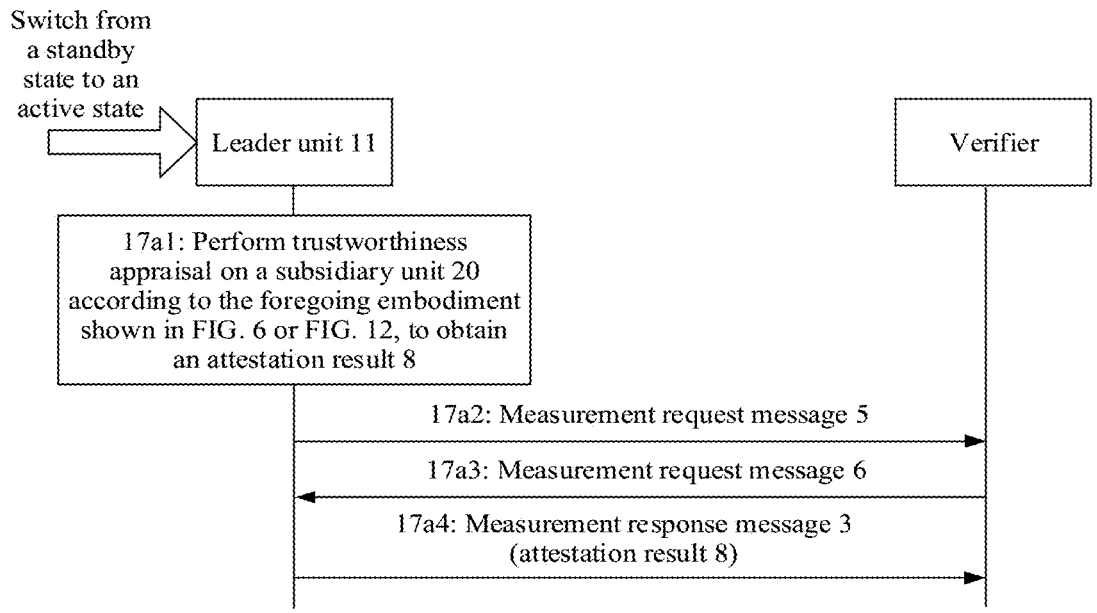
FIG. 17A is a signaling flowchart of a remote attestation method during state switching of a leader unit according to an embodiment of this application.

In an example, as shown in FIG. 17A, an embodiment of this application provides a remote attestation method. The method is applied to a composite device, the composite device further includes a subsidiary unit 20 in addition to a leader unit 10 and a leader unit 11, and the method may include the following steps.

Step 17*a*1: The leader unit 11 performs trustworthiness attestation on the subsidiary unit 20 according to the foregoing embodiment shown in FIG. 6 or FIG. 12, to obtain an attestation result 8.

Step 17*a*2: The leader unit 11 sends a measurement request message 5 to a verifier, to indicate the verifier to perform remote attestation on the composite device.

Step 17*a*3: The verifier sends a measurement request message 6 to the leader unit 11.

Step 17*a*4: The leader unit 11 sends a measurement response message 3 to the verifier, where the message carries the attestation result 8.

It may be understood that, the measurement request message 6 may specially carry the following messages: Nonce, PCRs, aikType, and the like, and the measurement response message 3 may specially carry the following messages: Nonce, aik, quote, PcrBanks, EventLog, and the like.

It should be noted that, step 17*a*2 may be performed before step 17*a*1, or may be performed after step 17*a*1. This is not limited.

It should be noted that, for specific implementations and related concept descriptions of step 17*a*1 to step 17*a*4, refer to the foregoing embodiments shown in FIG. 6 and FIG. 12.

In this way, according to this embodiment of this application, after a leader unit state switching event occurs, the leader unit that switches from a standby state to an active state can actively initiate one remote attestation request without passively waiting for initiation by the verifier, to trigger the verifier to perform remote attestation with the leader unit 11 in time. This ensures that trustworthiness attestation can be performed in time after a replacement event occurs on the composite device, and improves security and reliability of the composite device and an entire network.

Figure 17B:
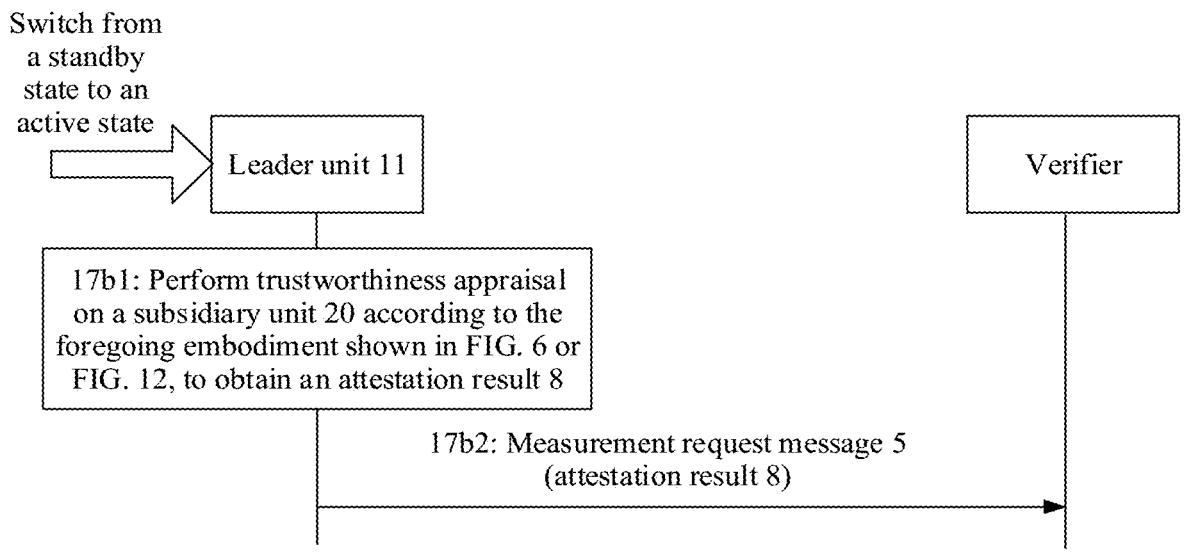
FIG. 17B is a signaling flowchart of another remote attestation method during state switching of a leader unit according to an embodiment of this application.

In another example, as shown in FIG. 17B, an embodiment of this application provides a remote attestation method. The method is applied to a composite device, the composite device further includes a subsidiary unit 20 in addition to a leader unit 10 and a leader unit 11, and the method may include the following steps.

Step 17*b*1: The leader unit 11 performs trustworthiness attestation on the subsidiary unit 20 according to the foregoing embodiment shown in FIG. 7 or FIG. 13, to obtain an attestation result 8.

Step 17*b*2: The leader unit 11 sends a measurement request message 5 to a verifier, where the message carries the attestation result 8.

It should be noted that, for specific implementations and related concept descriptions of step 17*b*1 and step 17*b*2, refer to the foregoing embodiments shown in FIG. 6 and FIG. 12.

In this way, according to this embodiment of this application, after an active/standby switchover event of a control plane occurs, the leader unit that switches from a standby state to an active state can actively initiate one remote attestation request without passively waiting for initiation by the verifier, and directly include the attestation result 8 of the leader unit for the subsidiary unit 20 in the remote attestation request and send the remote attestation request to the verifier. This saves an interaction procedure, ensures that trustworthiness attestation can be performed in time after a replacement event occurs on the composite device, and further improves remote attestation efficiency to some extent on the basis of improving security and reliability of the composite device and an entire network.

In some other possible implementations, because many composite devices support a hot swap, when an update event such as addition or replacement of a subsidiary unit occurs on the composite device, for example, if a new subsidiary unit 25 is added to the subsidiary unit in the composite device or a subsidiary unit 24 is replaced with a subsidiary unit 25, a subsidiary unit set 20 in the composite device is updated to a subsidiary unit set 30, and the composite device is not restarted up. However, such a hot swap is likely to affect system trustworthiness of the composite device. In view of this, in this embodiment of this application, when an update event of a forwarding plane occurs on the composite device, the leader unit 10 may sense that a hot swap occurs on the subsidiary unit, and actively initiate one time of remote attestation to the verifier.

Figure 18:
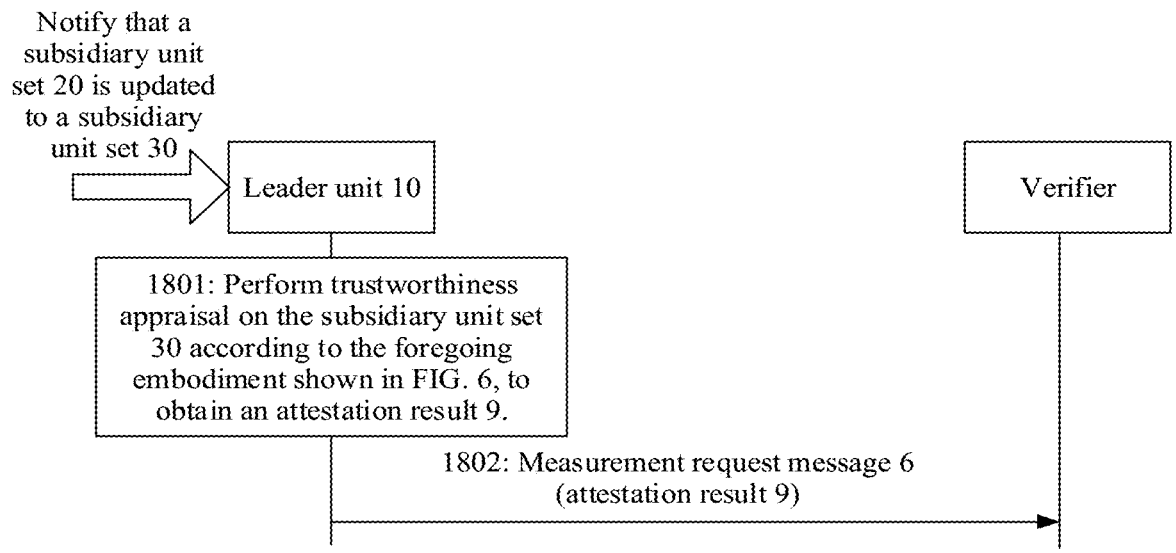
FIG. 18 is a signaling flowchart of a remote attestation method during update of a subsidiary unit according to an embodiment of this application.

In an example, as shown in FIG. 18, an embodiment of this application provides a remote attestation method. The method is applied to a composite device, the composite device includes a leader unit 10 and an updated subsidiary unit set 30, and the method may include the following steps.

Step 1801: The leader unit 10 performs trustworthiness attestation on the subsidiary unit set 30 according to the foregoing embodiment shown in FIG. 6, to obtain an attestation result 9.

Step 1802: The leader unit 10 sends a measurement request message 6 to a verifier, where the message carries the attestation result 9.

It should be noted that, for specific implementations and related concept descriptions of step 1801 and step 1802, refer to the foregoing embodiment shown in FIG. 6.

It should be noted that, in this embodiment of this application, a proxy mode is used as an example for description. In an actual case, when a remote attestation mode is a mixed attestation mode, the leader unit 10 may alternatively perform trustworthiness attestation on some subsidiary units in the subsidiary unit set 30 according to the foregoing embodiment shown in FIG. 12, to obtain an attestation result 9, and the leader unit 10 sends a measurement request message 6 to the verifier, where the message carries the attestation result 9 and measurement information of remaining subsidiary units, so that the verifier also performs trustworthiness attestation on the remaining subsidiary units in the composite device. For a specific implementation and related concept descriptions in this case, refer to the foregoing embodiment shown in FIG. 12.

In this way, according to this embodiment of this application, after an update event of a forwarding plane occurs, the leader unit 10 can sense the occurrence of the event and actively perform trustworthiness attestation on the changed subsidiary unit set 30 without passively waiting for initiation by the verifier, and directly include the attestation result 9 in the remote attestation request and send the remote attestation request to the verifier. This saves an interaction procedure, ensures that trustworthiness attestation can be performed in time after a hot swap of the subsidiary unit in the composite device, and further improves remote attestation efficiency to some extent on the basis of improving security and reliability of the composite device and an entire network.

It may be understood that, measurement information generated by the subsidiary unit or the leader unit in the composite device in a running process generally includes a plurality of PCR values. Currently, trustworthiness attestation is performed on all the PCR values in the measurement information during remote attestation. However, in many scenarios, the unit has an incremental change. That is, some PCR values in the measurement information do not change, and only the other PCR values (that is, measurement information corresponding to the incremental change) change. If all the PCR values are still verified, a PCR value that does not change is repeatedly verified, causing a waste of network resources. In view of this, this embodiment of this application further provides a method for performing remote attestation on a changed PCR value in the measurement information.

Figure 19A:
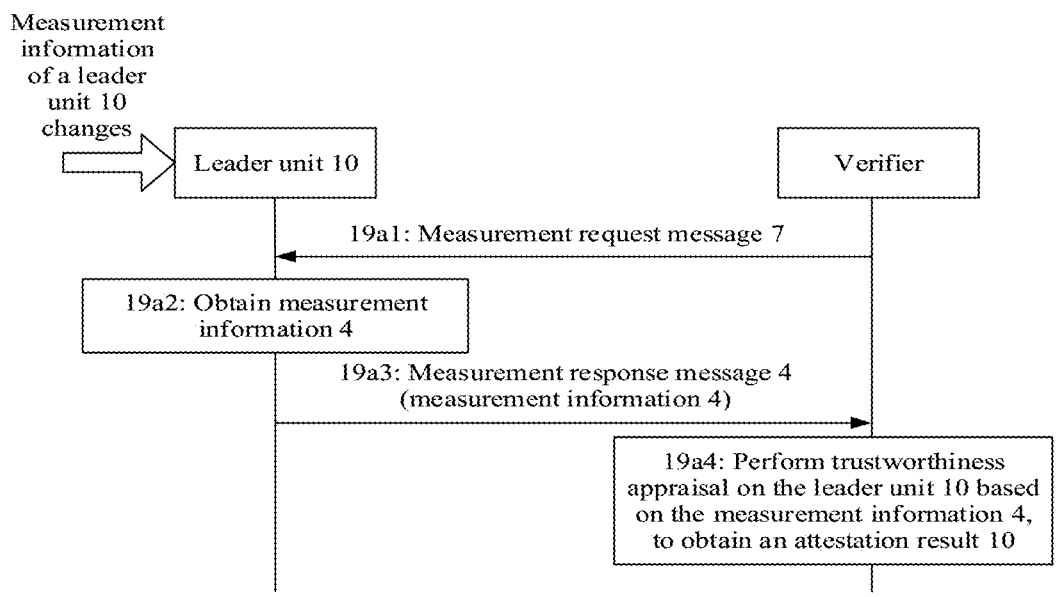
FIG. 19A is a signaling flowchart of a remote attestation method during change of measurement information of a leader unit according to an embodiment of this application.

In an example, when the measurement information of the leader unit 10 in the composite device changes, as shown in FIG. 19A, this embodiment of this application may further include the following steps.

Step 19a1: The verifier sends a measurement request message 7 to the leader unit 10.

Step 19a2: The leader unit 10 obtains measurement information 4.

Step 19a3: The leader unit 10 includes the measurement information 4 in a measurement response message 4, and sends the measurement response message 4 to the verifier.

Step 19a4: The verifier performs trustworthiness attestation on the leader unit 10 based on the measurement information 4, to obtain an attestation result 10.

It may be understood that, the measurement information 4 is measurement information including a changed PCR value of the leader unit 10, that is, measurement information corresponding to an incremental change of the leader unit 10, for example, may be the measurement information 3 of the unit 10 in the embodiment shown in FIG. 6. In this case, in the embodiment shown in FIG. 6, the unit 10 is a leader unit in which the measurement information changes. In this way, the leader unit 10 directly reports the changed PCR value of the leader unit 10, and requests the verifier to verify the changed PCR value. This not only reduces an amount of data exchanged between the verifier and the leader unit 10, but also reduces workload of trustworthiness attestation by the verifier, thereby improving remote attestation efficiency. It should be noted that, in this case, the leader unit 10 records all PCR values of the leader unit 10 that are used during previous trustworthiness attestation, so that after new measurement information is generated, a changed PCR value is determined through comparison.

In some other cases, the measurement information 4 may be measurement information including all current PCR values of the leader unit 10. The leader unit 10 reports all the PCR values to the verifier, and the verifier determines a changed PCR value from the PCR values, and verifies the changed PCR value. This can still reduce workload of trustworthiness attestation by the verifier and improve remote attestation efficiency. It should be noted that, in this case, the verifier records all the PCR values of the leader unit 10 that are used during previous trustworthiness attestation, so that after receiving the new measurement information sent by the leader unit 10, the verifier determines the changed PCR value through comparison.

Figure 19B:
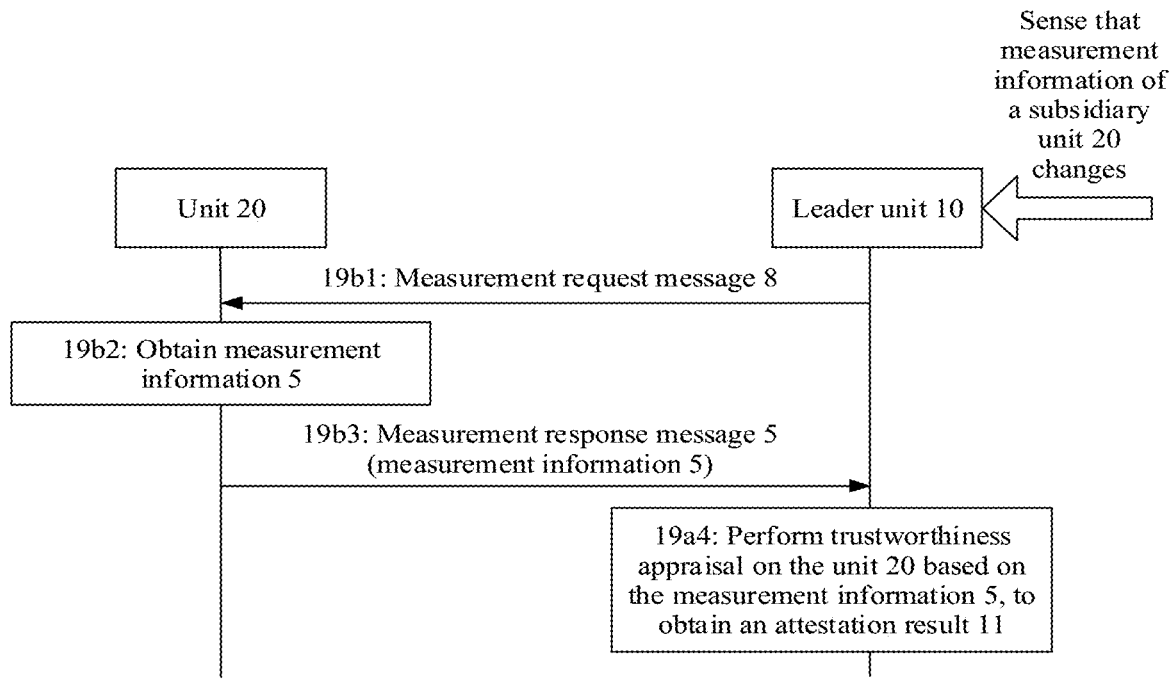
FIG. 19B is a signaling flowchart of another remote attestation method during change of measurement information of a leader unit according to an embodiment of this application.

In another example, when measurement information of a unit 20 other than the leader unit 10 in the composite device changes, as shown in FIG. 19B, this embodiment of this application may include the following steps.

Step 19b1: The leader unit 10 sends a measurement request message 8 to the unit 20.

Step 19b2: The unit 20 obtains measurement information 5.

Step 19b3: The unit 20 includes the measurement information 5 in a measurement response message 5, and sends the measurement response message 5 to the leader unit 10.

Step 19b4: The leader unit 10 performs trustworthiness attestation on the unit 20 based on the measurement information 5, to obtain an attestation result 11.

It may be understood that, the measurement information 5 is measurement information including a changed PCR value of the unit 20, for example, may be the measurement information 1 of the unit 20 that is obtained by the unit 10 in the embodiment shown in FIG. 6. In this case, in the embodiment shown in FIG. 6, the unit 20 is a leader unit or a subsidiary unit in which the measurement information changes. In this way, the unit 20 directly reports the changed PCR value of the unit 20, and requests the leader unit 10 to verify the changed PCR value. This not only reduces an amount of data exchanged between the leader unit 10 and the unit 20, but also reduces workload of trustworthiness attestation by the leader unit 10, thereby improving remote attestation efficiency. It should be noted that, in this case, the unit 20 records all PCR values of the unit 20 that are used during previous trustworthiness attestation, so that after new measurement information is generated, a changed PCR value is determined through comparison.

In some other cases, the measurement information 5 may be measurement information including all current PCR values of the unit 20. The unit 20 reports all the PCR values to the leader unit 10, and the leader unit 10 determines a changed PCR value from the PCR values, and verifies the changed PCR value. This can still reduce workload of trustworthiness attestation by the leader unit 10 and improve remote attestation efficiency. It should be noted that, in this case, the leader unit 10 records all the PCR values of the unit 20 that are used during previous trustworthiness attestation, so that after receiving new measurement information sent by the unit 20, the leader unit 10 determines a changed PCR value through comparison.

It can be learned that, in FIG. 19A and FIG. 19B, according to the embodiments of this application, only the PCR value that changes in the leader unit or the subsidiary unit is verified, but full verification is not performed on all the PCR values, thereby avoiding repeated verification on a PCR value that does not change, saving network resources, and improving remote attestation efficiency for the composite device.

It should be noted that, for security, in the foregoing embodiments, various messages exchanged between the verifier and the composite device and various messages exchanged between units in the composite device may be encrypted and transmitted. A specific implementation is not described in detail in this application.

Figure 20:
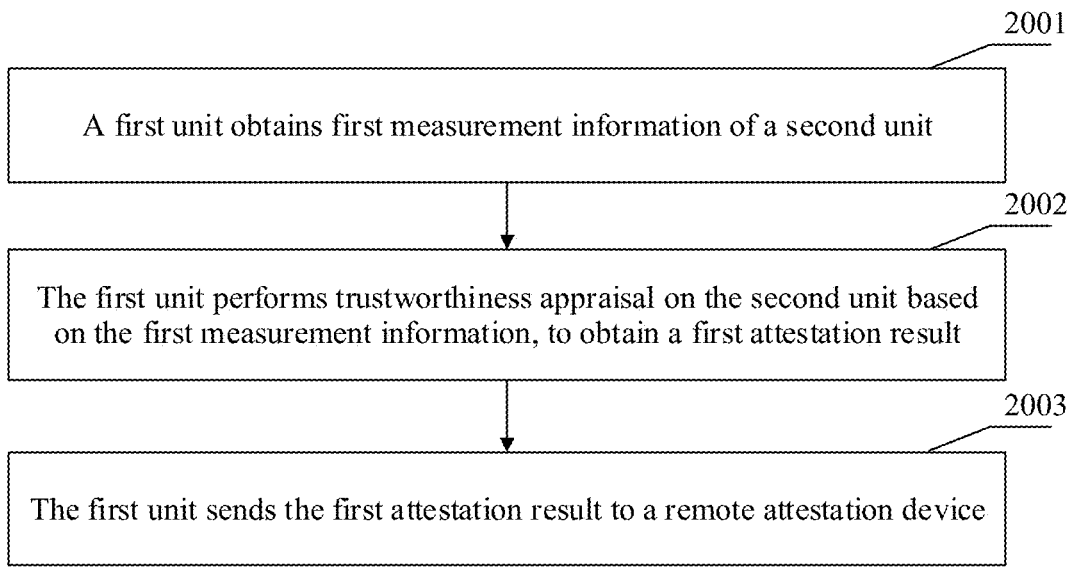
FIG. 20 is a schematic flowchart of a remote attestation method for a composite device according to an embodiment of this application.

FIG. 20 is a schematic flowchart of a remote attestation method for a composite device according to an embodiment of this application. The composite device may include a first unit and a second unit, and a process of performing remote attestation by the first unit as an execution body on the composite device may include, for example, the following steps.

Step 2001: The first unit obtains first measurement information of the second unit.

Step 2002: The first unit performs trustworthiness attestation on the second unit based on the first measurement information, to obtain a first attestation result.

Step 2003: The first unit sends the first attestation result to a remote attestation device.

In this way, the first unit in the composite device has a remote attestation function, and may perform trustworthiness attestation on another unit (for example, the second unit) in the composite device to which the first unit belongs. In this case, the first unit in the composite device may directly send a trustworthiness attestation result of the other unit to the remote attestation device, and the remote attestation device only needs to receive the attestation result of the other unit that is sent by the first unit, without receiving measurement information of each unit and performing trustworthiness attestation on each unit, so that an amount of data that needs to be exchanged between the remote attestation device and the composite device in the remote attestation process can be effectively reduced, thereby improving remote attestation efficiency for the composite device to some extent.

The first unit may be a control plane, and the second unit may be a control plane or a forwarding plane. For example, when the composite device is a router, the first unit may be a main control board, and the second unit may be a main control board, a forwarding board, or a service board.

In an example, when a measurement process such as startup of the composite device is determinate, the first measurement information may include a first PCR value and a PCR reference value. In this case, in step 2001, that the first unit obtains first measurement information of the second unit may include that the first unit obtains the first PCR value from the second unit, and the first unit obtains the PCR reference value from the remote attestation device or local secure storage space. In view of this, in step 2002, a specific process in which the first unit performs trustworthiness attestation on the second unit based on the first measurement information, to obtain the first attestation result may include that the first unit compares the first PCR value with the PCR reference value, to obtain the first attestation result, where if the first PCR value is consistent with the PCR reference value, the first attestation result represents that the second unit is trustworthy, or, if the first PCR value is inconsistent with the PCR reference value, the first attestation result represents that the second unit is untrustworthy. In this way, when the measurement process such as startup of the composite device is a determinate process, the first unit in the composite device performs trustworthiness attestation on the second unit based on the PCR reference value, thereby implementing fast, convenient, and effective remote attestation on the composite device.

In another example, when a measurement process of the composite device is uncertain, for example, a running process after the composite device is started up, the first measurement information may include a second PCR value and a first measurement log that are reported by the second unit, the first measurement log includes a first baseline value and information about a process of extending the first baseline value to obtain the second PCR value, the first baseline value is a baseline value reported by the second unit, the first measurement information further includes a second baseline value, the second baseline value is a trusted baseline value of the second unit, and the second baseline value is used to check the first baseline value. In this case, in step 2001, that the first unit obtains first measurement information of the second unit may further include that the first unit obtains the second PCR value and the first measurement log from the second unit, where the first measurement log includes the first baseline value and the information about the process of extending the first baseline value to obtain the second PCR value, and the first unit obtains the second baseline value from the remote attestation device or local secure storage space. In view of this, in step 2002, a specific process in which the first unit performs trustworthiness attestation on the second unit based on the first measurement information, to obtain the first attestation result may include that the first unit calculates a third PCR value based on the first measurement log, the first unit compares the second PCR value with the third PCR value, and if the second PCR value is consistent with the third PCR value, the first unit compares the second baseline value with the first baseline value, to obtain the first attestation result, or, if the second PCR value is inconsistent with the third PCR value, the first unit may not compare the second baseline value with the first baseline value, but directly obtains the first attestation result, where the first attestation result is used to represent that the second unit is untrustworthy. In this way, when the measurement process of the composite device is an uncertain process, the first unit in the composite device performs trustworthiness attestation on the second unit based on the second baseline value, thereby implementing fast, convenient, and effective remote attestation on the composite device.

For the foregoing two examples, it may be understood that, in one case, the PCR reference value or the second baseline value of the second unit may be stored in the local secure storage space of the first unit, and the secure storage space may be physical space that cannot be tampered with or accessed by an attacker, for example, physical space that can be accessed only by a module that implements RAT through a RAT related process or a running process (which is referred to as a RAT component), in another case, the PCR reference value or the second baseline value of the second unit may alternatively be obtained from the remote attestation device, and the remote attestation device stores a PCR reference value of each unit in the composite device.

In some possible implementations, when the composite device further includes a third unit, this embodiment of this application may further include that the first unit obtains second measurement information of the third unit, and the first unit sends the second measurement information to the remote attestation device. In this way, the first unit only forwards the measurement information of the third unit to the remote attestation device, and the remote attestation device performs remote attestation on the third unit. This also implements trustworthiness attestation on the unit in the composite device.

During specific implementation, when the remote attestation uses a challenge-response manner, before that the first unit sends the first attestation result to the remote attestation device, for example, before step 2001, or between step 2002 and step 2003, this embodiment of this application may further include that the first unit receives a first measurement request message sent by the remote attestation device, where the first measurement request message may be considered as a "challenge" and is used to request to perform trustworthiness attestation on the composite device. In this case, in step 2003, the first unit may include the first attestation result in a first measurement response message, and send the first measurement response message as a "response" to the "challenge" to the remote attestation device.

In some other possible implementations, this embodiment of this application may further include that the first unit sends third measurement information of the first unit to the remote attestation device, so that the remote attestation device performs trustworthiness attestation on the first unit. In this way, on the one hand, in a process in which the remote attestation device performs trustworthiness attestation on the first unit, trustworthiness attestation on the composite device is more complete, that is, trustworthiness attestation is implemented on all units including the first unit in the composite device. On the other hand, before the first unit performs trustworthiness attestation on the second unit, the remote attestation device may first perform trustworthiness attestation on the first unit, and only under the condition that the first unit is trustworthy, it is determined that the first unit is to perform remote attestation on the second unit, so that the remote attestation process is more secure, thereby improving reliability of remote attestation on the composite device.

In some other possible implementations, different remote attestation modes may be used for remote attestation on the composite device. To ensure that remote attestation can be performed in an orderly manner, before the foregoing remote attestation is performed, the remote attestation device and the composite device may first determine the remote attestation mode to be used.

In an example, for determining of a remote attestation manner to be used, the composite device and the remote attestation device may determine, through local static configuration, the remote attestation mode to be used for subsequent remote attestation.

In another example, the composite device and the remote attestation device may alternatively determine, through negotiation, the remote attestation mode to be used for subsequent remote attestation. For example, the first unit sends a mode negotiation request message to the remote attestation device, the first unit receives a mode negotiation response message sent by the remote attestation device, and the first unit determines the remote attestation mode based on the mode negotiation response message. The mode negotiation request message may carry first indication information, and the first indication information is used to indicate a remote attestation mode supported and recommended by the first unit. The mode negotiation response message carries second indication information, and the second indication information is used to indicate the remote attestation device to determine the remote attestation mode to be used subsequently. It should be noted that, a negotiation process for the remote attestation mode may be initiated by the first unit, or may be initiated by the remote attestation device. A final remote attestation mode may be determined by the first unit, or may be determined by the remote attestation device. In this way, the remote attestation manner to be used subsequently is determined through negotiation between the composite device and the remote attestation device, to provide a data basis for performing orderly remote attestation on the composite device subsequently.

It may be understood that, when the determined remote attestation mode is the proxy mode, in the proxy mode, the first unit is responsible for performing trustworthiness attestation on all units including TCB modules except the first unit in the composite device. When the determined remote attestation mode is the mixed attestation mode, in the mixed attestation mode, the first unit performs trustworthiness attestation on the second unit, and the remote attestation device performs trustworthiness attestation on a fourth unit in the composite device, that is, the first unit performs trustworthiness attestation on some units in the composite device, where the some units include the second unit, and the other units send measurement information of the other units to the remote attestation device by using the first unit, and the remote attestation device performs trustworthiness attestation, where the other units include the second unit.

It should be noted that, for the mixed attestation mode, specific units on which the remote attestation device and the first unit need to perform trustworthiness attestation may be determined and notified to the remote attestation device by the first unit, or may be determined and notified to the first unit by the remote attestation device, or may be determined through negotiation by the remote attestation device and the first unit. A process of determining through negotiation the specific units to be verified may be implemented in a process of negotiating the remote attestation mode, or may be separately negotiated after the remote attestation mode is determined as the mixed attestation mode. In an example, in this embodiment of this application, for example, the specific units on which the remote attestation device and the first unit need to perform trustworthiness attestation may be determined through the following process. The first unit sends a first request message to the remote attestation device, where the first request message is used to request an attestation permission from the remote attestation device, the attestation permission indicates a set of units on which the first unit performs trustworthiness attestation, and the set includes the second unit, and the first unit receives a first response message returned by the remote attestation device, where the first response message is used to indicate the attestation permission. The first response message includes identification information of each unit on which the first unit performs trustworthiness attestation, and the identification information may be, for example, an identifier of the unit, and is used to uniquely identify the unit.

It should be noted that, the first unit is a leader unit in an active state. For example, the first unit may be a leader unit that is switched from a standby state to the active state before step 1 in the first aspect.

In some other possible implementations, for a manner of triggering remote attestation on the composite device, in one case, the first unit may periodically perform trustworthiness attestation on the second unit. For example, the first unit periodically sends a first triggering request to the remote attestation device, where the first triggering request is used to periodically trigger the remote attestation device to perform trustworthiness attestation on the composite device. In another case, the first unit may alternatively perform trustworthiness attestation on the second unit based on triggering of an event. For example, the first unit sends a second triggering request to the remote attestation device based on occurrence of the event, where the second triggering request is used to trigger the remote attestation device to perform trustworthiness attestation on the composite device, and the event may include one of the following cases: an active/standby switchover of the first unit, a state change of the second unit, or a configuration command, that is, when the first unit is switched from the standby state to the active state, or when the first unit senses the state change of the second unit (for example, a new second unit is added, or the second unit is replaced), or when the second unit receives the configuration command, the first unit is triggered to perform trustworthiness attestation on the second unit. In this way, when the event occurs or a preset period is reached, the first unit may actively perform trustworthiness attestation on the second unit without passively waiting for initiation of remote attestation, thereby saving an interaction procedure in the remote attestation process, and improving remote attestation efficiency.

In some other possible implementations, when a unit in the composite device has an incremental change, that is, some measurement information remains unchanged and the other measurement information changes in the unit, in this embodiment of this application, to save system resources occupied by remote attestation and improve remote attestation efficiency, remote attestation may be performed only on the changed measurement information, that is, measurement information corresponding to the incremental change is obtained and remote attestation is performed based on the measurement information corresponding to the incremental change. In an example, when the second unit has a first incremental change, this embodiment of this application may further include, when the second unit has the first incremental change, the first unit obtains fifth measurement information corresponding to the first incremental change, and the first unit performs trustworthiness attestation on the second unit based on the fifth measurement information. In another example, when the first unit has a second incremental change, this embodiment of this application may further include that the first unit sends, to the remote attestation device, sixth measurement information corresponding to the second incremental change of the first unit, and the remote attestation device performs, based on the sixth measurement information, trustworthiness attestation on the first unit that has the second incremental change. In this way, according to this embodiment of this application, only measurement information corresponding to PCR values that change in various units is verified, but full verification is not performed on measurement information corresponding to all PCR values, thereby avoiding repeated verification on measurement information corresponding to a PCR value that does not change, saving network resources, and improving remote attestation efficiency for the composite device.

Figure 21:
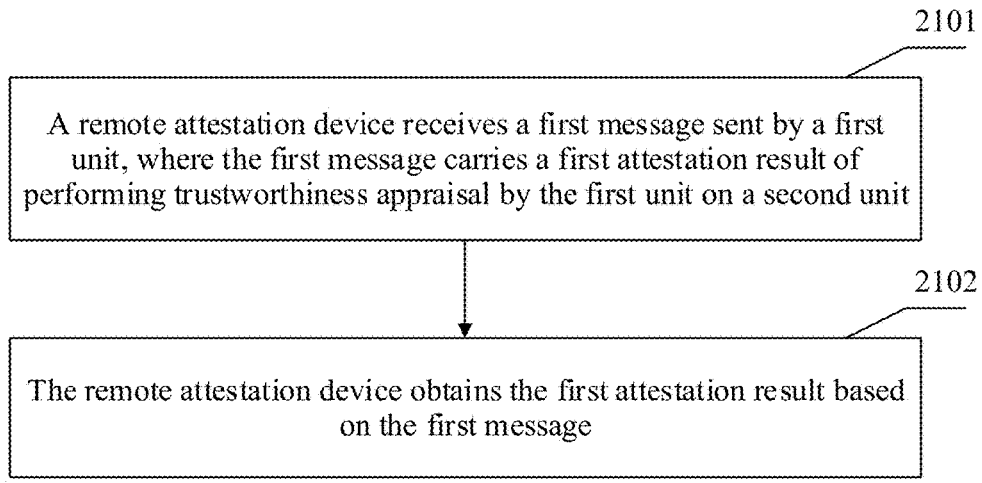
FIG. 21 is a schematic flowchart of another remote attestation method for a composite device according to an embodiment of this application.

FIG. 21 is a schematic flowchart of another remote attestation method for a composite device according to an embodiment of this application. The method is applied to a remote attestation device, the composite device may include a first unit and a second unit, and this embodiment of this application may further include the following steps.

Step 2101: The remote attestation device receives a first message sent by the first unit, where the first message carries a first attestation result of performing trustworthiness attestation by the first unit on the second unit.

Step 2102: The remote attestation device obtains the first attestation result based on the first message.

In some possible implementations, this embodiment of this application may further include that the remote attestation device receives a second message sent by the first unit, where the second message carries first measurement information of the first unit, and the remote attestation device performs trustworthiness attestation on the first unit based on the first measurement information, to obtain a second attestation result.

In some other possible implementations, this embodiment of this application may further include that the remote attestation device checks the first attestation result, to obtain a third attestation result. Further, whether a signature of the second unit is correct and whether a process in which the first unit performs trustworthiness attestation on the second unit is accurate are verified.

In some other possible implementations, this embodiment of this application may further include determining a remote attestation mode. In one case, the remote attestation mode may be set in the remote attestation device and the first unit through static configuration. In another case, the remote attestation mode may alternatively be determined through negotiation. In an example, a negotiation process may include that the remote attestation device receives a mode negotiation request message sent by the first unit, the remote attestation device determines the remote attestation mode based on the mode negotiation request message, and the remote attestation device sends a mode negotiation response message to the first unit, where the mode negotiation response message carries the remote attestation mode, and the mode negotiation response message is used to indicate the first unit to perform remote attestation in the remote attestation mode.

In an example, when the remote attestation mode is a proxy mode, in the proxy mode, the first unit is responsible for performing trustworthiness attestation on all units except the first unit in the composite device, and each of all the units includes a TCB module. In this case, this embodiment of this application may further include that the remote attestation device generates a fourth attestation result based on the first attestation result, the second attestation result, and the third attestation result, where the fourth attestation result is used to represent system trustworthiness of the composite device. If the first attestation result indicates that the second unit is trustworthy, the second attestation result indicates that the first unit is trustworthy, and the third attestation result indicates that a signature of the second unit is correct and a process in which the first unit performs trustworthiness attestation on the second unit is accurate, the fourth attestation result indicates that a system of the composite device is trustworthy.

In another example, when the remote attestation mode is a mixed attestation mode, in the mixed attestation mode, the first attestation result is a result of performing trustworthiness attestation by the first unit on the second unit, and this embodiment of this application may further include that the remote attestation device performs trustworthiness attestation on the third unit in the composite device, to obtain a fifth attestation result. In this case, this embodiment of this application may further include that the remote attestation device generates a sixth attestation result based on the first attestation result, the second attestation result, the third attestation result, and the fifth attestation result, where the sixth attestation result is used to represent system trustworthiness of the composite device. If the first attestation result indicates that the second unit is trustworthy, the second attestation result indicates that the first unit is trustworthy, the third attestation result indicates that a signature of the second unit is correct and a process in which the first unit performs trustworthiness attestation on the second unit is accurate, and the fifth attestation result indicates that the third unit is trustworthy, the sixth attestation result indicates that a system of the composite device is trustworthy.

In the mixed attestation mode, this embodiment of this application further includes determining a set of units on which the first unit performs remote attestation and a set of units on which the remote attestation device performs remote attestation. The process may be set through static configuration, or may be determined through negotiation. When the process is determined through negotiation, the process may be determined during negotiation of the remote attestation mode, or may be independently determined after the remote attestation mode is determined as the mixed attestation mode. In this case, for example, this embodiment of this application may include that the remote attestation device receives a first request message sent by the first unit, where the first request message is used to request an attestation permission from the remote attestation device, the remote attestation device determines the attestation permission, where the attestation permission indicates the remote attestation device to perform trustworthiness attestation on the third unit, and the remote attestation device sends a first response message to the first unit, so that the first unit performs trustworthiness attestation on the second unit based on the attestation permission.

It should be noted that, the method provided in FIG. 21 is applied to the remote attestation device, and corresponds to the method applied to the composite device and provided in FIG. 20. Therefore, for various possible implementations of the method provided in FIG. 21 and achieved technical effects, refer to the descriptions of the foregoing method provided in FIG. 20.

In the foregoing embodiments shown in FIG. 20 and FIG. 21, it may be understood that, in one case, corresponding to the embodiment shown in FIG. 5, the composite device may be the attester 201, the first unit may be the leader unit 311, the second unit may be any one of the leader unit 312 and the subsidiary units 321, 322, . . . , and the remote attestation device may be the verifier 202. In another case, corresponding to the embodiments shown in FIG. 6, FIG. 7A to FIG. 7C, FIG. 8, FIG. 9A and FIG. 9B, FIG. 10 to FIG. 14, FIG. 15A and FIG. 15B, and FIG. 16A and FIG. 16B, the first unit may correspond to the unit 10, the second unit may correspond to the unit 20, and the remote attestation device may be the verifier. In still another case, corresponding to the embodiments shown in FIG. 17A and FIG. 17B, the first unit may correspond to the leader unit 11, the second unit may correspond to the subsidiary unit 20, and the remote attestation device may be the verifier. In yet another case, corresponding to the embodiment shown in FIG. 18, the first unit may correspond to the leader unit 10, the second unit may correspond to the unit in the subsidiary unit set 30, and the remote attestation device may be the verifier. In still yet another case, corresponding to the embodiments shown in FIG. 19A and FIG. 19B, the first unit may correspond to the leader unit 10, the second unit may correspond to the unit 20, and the remote attestation device may be the verifier. In this case, for concept explanations, specific implementations, and achieved effects of step 2001 to step 2003, refer to related descriptions of the foregoing embodiments corresponding to FIG. 5, FIG. 6, FIG. 7A to FIG. 7C, FIG. 8, FIG. 9A and FIG. 9B, FIG. 10 to FIG. 14, FIG. 15A and FIG. 15B, FIG. 16A and FIG. 16B, FIG. 17A and FIG. 17B, FIG. 18, and FIG. 19A and FIG. 19B.

Figure 22:
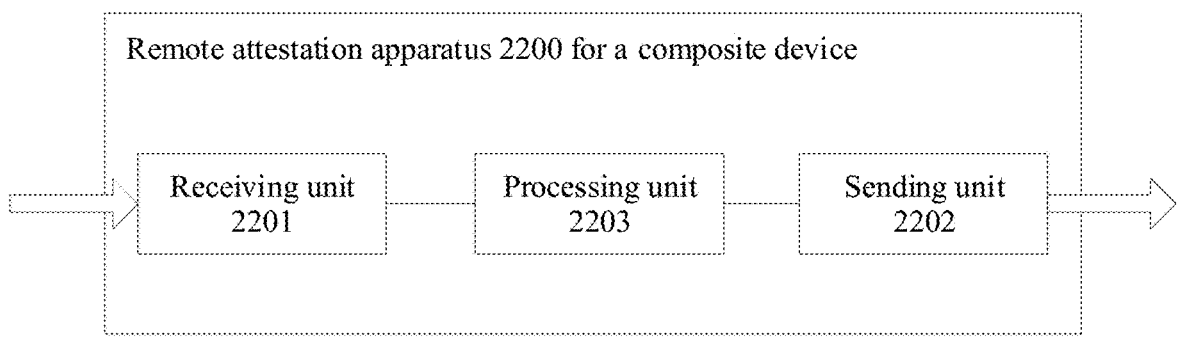
FIG. 22 is a schematic diagram of a structure of a remote attestation apparatus for a composite device according to an embodiment of this application.

In addition, an embodiment of this application further provides a remote attestation apparatus 2200 for a composite device, as shown in FIG. 22. The apparatus 2200 is used in a composite device, and the composite device includes a receiving unit 2201, a sending unit 2202, and a processing unit 2203. The receiving unit 2201 is configured to perform a receiving operation performed by the composite device (or the attester) in the methods corresponding to the foregoing embodiments shown in FIG. 5, FIG. 6, FIG. 7A to FIG. 7C, FIG. 8, FIG. 9A and FIG. 9B, FIG. 10 to FIG. 14, FIG. 15A and FIG. 15B, FIG. 16A and FIG. 16B, FIG. 17A and FIG. 17B, FIG. 18, FIG. 19A and FIG. 19B, and FIG. 20, for example, perform step 601 in the embodiment shown in FIG. 6. The sending unit 2202 is configured to perform a sending operation performed by the composite device (or the attester) in the methods corresponding to the foregoing embodiments shown in FIG. 5, FIG. 6, FIG. 7A to FIG. 7C, FIG. 8, FIG. 9A and FIG. 9B, FIG. 10 to FIG. 14, FIG. 15A and FIG. 15B, FIG. 16A and FIG. 16B, FIG. 17A and FIG.

17B, FIG. 18, FIG. 19A and FIG. 19B, and FIG. 20, for example, perform step 604 in the embodiment shown in FIG. 6. The processing unit 2203 is configured to perform an operation other than the receiving operation and the sending operation performed by the composite device (or the attester) in the methods corresponding to the foregoing embodiments shown in FIG. 5, FIG. 6, FIG. 7A to FIG. 7C, FIG. 8, FIG. 9A and FIG. 9B, FIG. 10 to FIG. 14, FIG. 15A and FIG. 15B, FIG. 16A and FIG. 16B, FIG. 17A and FIG. 17B, FIG. 18, FIG. 19A and FIG. 19B, and FIG. 20, for example, the processing unit 2203 may perform step 603 in the embodiment shown in FIG. 6, that is, perform trustworthiness attestation on the unit 20 based on the measurement information 1 and the measurement information 2, to obtain the attestation result 1.

Figure 23:
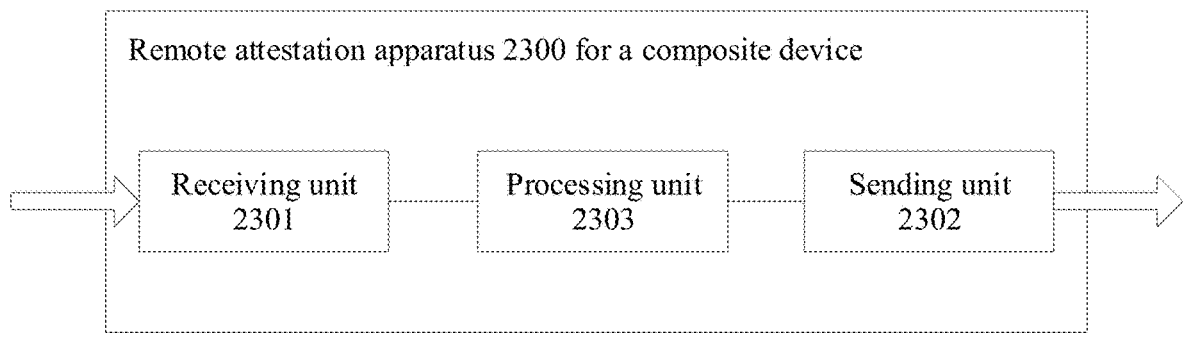
FIG. 23 is a schematic diagram of a structure of another remote attestation apparatus for a composite device according to an embodiment of this application.
Figure 24:
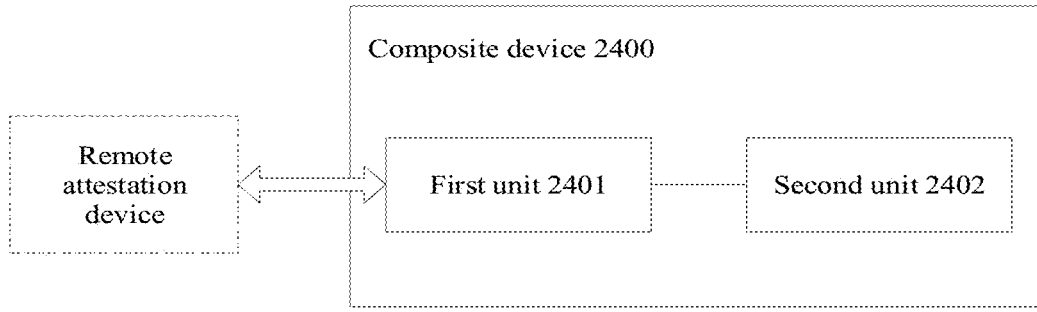
FIG. 24 is a schematic diagram of a structure of a composite device according to an embodiment of this application.

In addition, an embodiment of this application further provides a remote attestation apparatus 2300 for a composite device, as shown in FIG. 23. The apparatus 2300 is used in a remote attestation device, and the remote attestation device includes a receiving unit 2301, a sending unit 2302, and a processing unit 2303. The receiving unit 2301 is configured to perform a receiving operation performed by the remote attestation device (or the verifier) in the methods corresponding to the foregoing embodiments shown in FIG. 5, FIG. 6, FIG. 7A to FIG. 7C, FIG. 8, FIG. 9A and FIG. 9B, FIG. 10 to FIG. 14, FIG. 15A and FIG. 15B, FIG. 16A and FIG. 16B, FIG. 17A and FIG. 17B, FIG. 18, FIG. 19A and FIG. 19B, and FIG. 21, for example, perform step 606 in the embodiment shown in FIG. 11. The sending unit 2302 is configured to perform a sending operation performed by the remote attestation device (or the verifier) in the methods corresponding to the foregoing embodiments shown in FIG. 5, FIG. 6, FIG. 7A to FIG. 7C, FIG. 8, FIG. 9A and FIG. 9B, FIG. 10 to FIG. 14, FIG. 15A and FIG. 15B, FIG. 16A and FIG. 16B, FIG. 17A and FIG. 17B, FIG. 18, FIG. 19A and FIG. 19B, and FIG. 21, for example, perform S53 in the embodiment shown in FIG. 9A. The processing unit 2303 is configured to perform an operation other than the receiving operation and the sending operation performed by the remote attestation device (or the verifier) in the methods corresponding to the foregoing embodiments shown in FIG. 5, FIG. 6, FIG. 7A to FIG. 7C, FIG. 8, FIG. 9A and FIG. 9B, FIG. 10 to FIG. 14, FIG. 15A and FIG. 15B, FIG. 16A and FIG. 16B, FIG. 17A and FIG. 17B, FIG. 18, FIG. 19A and FIG. 19B, and FIG. 21, for example, the processing unit 2303 may perform steps 607 to 609 in the embodiment shown in FIG. 11.

In addition, an embodiment of this application further provides a composite device 2400, including a first unit 2401 and a second unit 2402. The second unit 2402 is configured to send measurement information of the second unit 2402 to the first unit 2401. The first unit 2401 is configured to perform the remote attestation methods corresponding to the foregoing embodiments shown in FIG. 5, FIG. 6, FIG. 7A to FIG. 7C, FIG. 8, FIG. 9A and FIG. 9B, FIG. 10 to FIG. 14, FIG. 15A and FIG. 15B, FIG. 16A and FIG. 16B, FIG. 17A and FIG. 17B, FIG. 18, FIG. 19A and FIG. 19B, and FIG. 20, to implement trustworthiness attestation on the composite device 2400.

Figure 25:
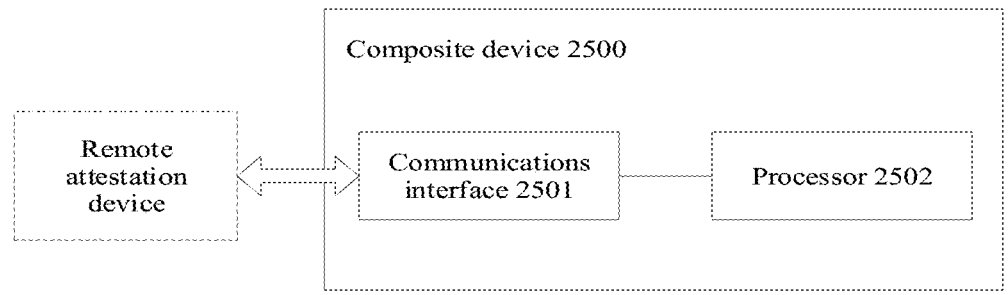
FIG. 25 is a schematic diagram of a structure of another composite device according to an embodiment of this application.

In addition, an embodiment of this application further provides a composite device 2500, as shown in FIG. 25. The composite device 2500 may include a communications interface 2501 and a processor 2502. The communications interface 2501 is configured to perform receiving and sending operations in the foregoing embodiments shown in FIG. 5, FIG. 6, FIG. 7A to FIG. 7C, FIG. 8, FIG. 9A and FIG. 9B, FIG. 10 to FIG. 14, FIG. 15A and FIG. 15B, FIG. 16A and FIG. 16B, FIG. 17A and FIG. 17B, FIG. 18, FIG. 19A and FIG. 19B, and FIG. 20. The processor 2502 is configured to perform an operation other than the receiving and sending operations in the foregoing embodiments shown in FIG. 5, FIG. 6, FIG. 7A to FIG. 7C, FIG. 8, FIG. 9A and FIG. 9B, FIG. 10 to FIG. 14, FIG. 15A and FIG. 15B, FIG. 16A and FIG. 16B, FIG. 17A and FIG. 17B, FIG. 18, FIG. 19A and FIG. 19B, and FIG. 20, for example, perform step 603 in the embodiment shown in FIG. 6.

Figure 26:
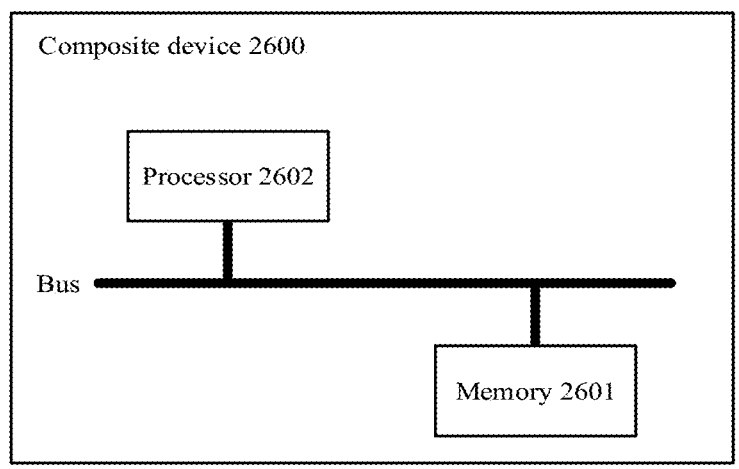
FIG. 26 is a schematic diagram of a structure of still another composite device according to an embodiment of this application.

In addition, an embodiment of this application further provides a composite device 2600, as shown in FIG. 26. The composite device 2600 includes a memory 2601 and a processor 2602. The memory 2601 is configured to store program code. The processor 2602 is configured to run instructions in the program code, to enable the composite device 2600 to perform the methods provided in the foregoing embodiments shown in FIG. 5, FIG. 6, FIG. 7A to FIG. 7C, FIG. 8, FIG. 9A and FIG. 9B, FIG. 10 to FIG. 14, FIG. 15A and FIG. 15B, FIG. 16A and FIG. 16B, FIG. 17A and FIG. 17B, FIG. 18, FIG. 19A and FIG. 19B, and FIG. 20.

Figure 27:
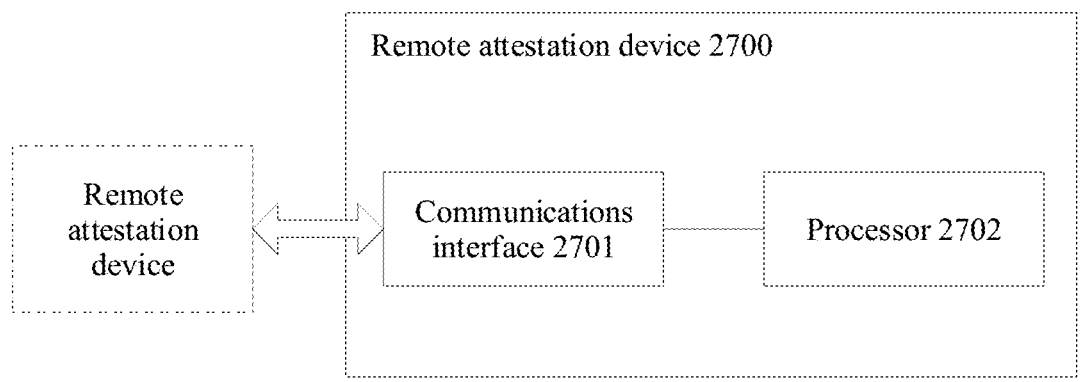
FIG. 27 is a schematic diagram of a structure of a remote attestation device according to an embodiment of this application.

In addition, an embodiment of this application further provides a remote attestation device 2700, as shown in FIG. 27. The remote attestation device 2700 includes a communications interface 2701 and a processor 2702. The communications interface 2701 is configured to perform receiving and sending operations in the foregoing embodiments shown in FIG. 5, FIG. 6, FIG. 7A to FIG. 7C, FIG. 8, FIG. 9A and FIG. 9B, FIG. 10 to FIG. 14, FIG. 15A and FIG. 15B, FIG. 16A and FIG. 16B, FIG. 17A and FIG. 17B, FIG. 18, FIG. 19A and FIG. 19B, and FIG. 21. The processor 2702 is configured to perform an operation other than the receiving and sending operations in the foregoing embodiments shown in FIG. 5, FIG. 6, FIG. 7A to FIG. 7C, FIG. 8, FIG. 9A and FIG. 9B, FIG. 10 to FIG. 14, FIG. 15A and FIG. 15B, FIG. 16A and FIG. 16B, FIG. 17A and FIG. 17B, FIG. 18, FIG. 19A and FIG. 19B, and FIG. 21, for example, perform steps 607 to 609 in the embodiment shown in FIG. 11.

Figure 28:
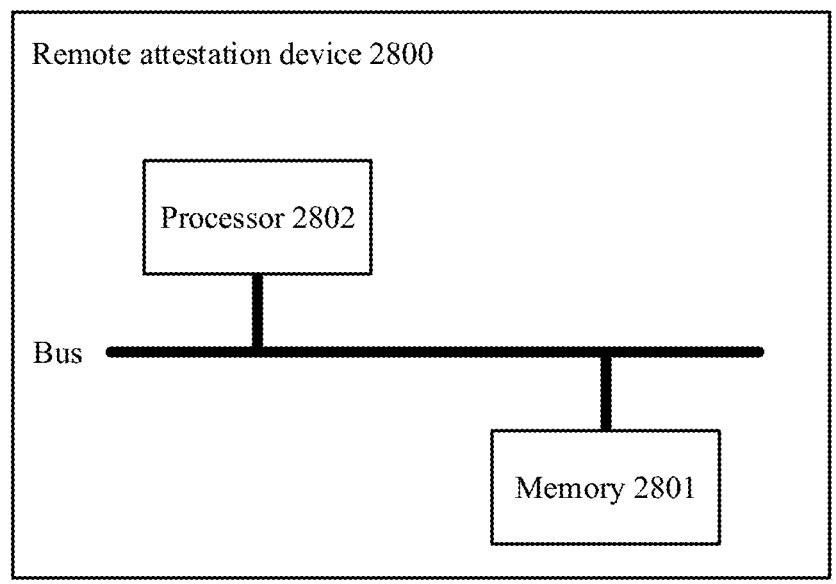
FIG. 28 is a schematic diagram of a structure of another remote attestation device according to an embodiment of this application.

In addition, an embodiment of this application further provides a remote attestation device 2800, as shown in FIG. 28. The remote attestation device 2800 includes a memory 2801 and a processor 2802. The memory 2801 is configured to store program code. The processor 2802 is configured to run instructions in the program code, to enable the remote attestation device 2800 to perform the methods provided in the foregoing embodiments shown in FIG. 5, FIG. 6, FIG. 7A to FIG. 7C, FIG. 8, FIG. 9A and FIG. 9B, FIG. 10 to FIG. 14, FIG. 15A and FIG. 15B, FIG. 16A and FIG. 16B, FIG. 17A and FIG. 17B, FIG. 18, FIG. 19A and FIG. 19B, and FIG. 21.

It may be understood that, in the foregoing embodiment, the processor may be a central processing unit (CPU), a network processor (NP), or a combination of the CPU and the NP. Alternatively, the processor may be an application-specific integrated circuit (ASIC), a programmable logic device (PLD), or a combination thereof. The PLD may be a complex PLD (CPLD), a field-programmable gate array (FPGA), generic array logic (GAL), or any combination thereof. The processor may be one processor, or may include a plurality of processors. The memory may include a volatile memory such as a random-access memory (RAM), the memory may include a non-volatile memory such as a read-only memory (ROM), a flash memory, a hard disk drive (HDD), or a solid-state drive (SSD), or the memory may include a combination of the foregoing types of memories. The memory may be one memory, or may include a plurality of memories. In a specific implementation, the memory stores computer-readable instructions, and the computer-readable instructions include a plurality of software modules, for example, a sending module, a processing module, and a receiving module. After executing each software module, the processor may perform a corresponding operation based on an indication of each software module. In this embodiment, an operation performed by a software module is actually an operation performed by the processor based on an indication of the software module. After executing the computer-readable instructions in the memory, the processor may perform, based on indications of the computer-readable instructions, all operations that may be performed by the composite device or the remote attestation device.

It may be understood that, in the foregoing embodiments, the communications interface 2501/2701 of the composite device 2500/remote attestation device 2700 may be used as the receiving unit 2201/2301 and the sending unit 2202/2302 in the remote attestation apparatus 2200/2300 for a composite device, to implement data communication between the composite device 2500 and the remote attestation device 2700.

In addition, an embodiment of this application further provides a computer-readable storage medium. The computer-readable storage medium stores instructions, and when the instructions are run on a computer, the computer is enabled to perform the remote attestation methods for a composite device provided in the foregoing embodiments shown in FIG. 5, FIG. 6, FIG. 7A to FIG. 7C, FIG. 8, FIG. 9A and FIG. 9B, FIG. 10 to FIG. 14, FIG. 15A and FIG. 15B, FIG. 16A and FIG. 16B, FIG. 17A and FIG. 17B, FIG. 18, FIG. 19A and FIG. 19B, FIG. 20, and FIG. 21.

In addition, an embodiment of this application further provides a computer program product. When the computer program product runs on a computer, the computer is enabled to perform the remote attestation methods for a composite device provided in the foregoing embodiments shown in FIG. 5, FIG. 6, FIG. 7A to FIG. 7C, FIG. 8, FIG. 9A and FIG. 9B, FIG. 10 to FIG. 14, FIG. 15A and FIG. 15B, FIG. 16A and FIG. 16B, FIG. 17A and FIG. 17B, FIG. 18, FIG. 19A and FIG. 19B, FIG. 20, and FIG. 21.

"First" in names such as the "first unit" and the "first measurement information" mentioned in the embodiments of this application is merely used as a name identifier, but does not represent first in sequence. This rule is also applicable to "second" and the like.

It can be learned from the foregoing descriptions of the implementations that, a person skilled in the art may clearly understand that some or all of the steps of the methods in the foregoing embodiments may be implemented by using software and a universal hardware platform. Based on such an understanding, the technical solutions of this application may be implemented in a form of a software product. The computer software product may be stored in a storage medium, for example, a ROM/RAM, a magnetic disk, or an optical disc, and include several instructions for instructing a computer device (which may be a personal computer, a server, or a network communications device such as a router) to perform the methods described in the embodiments or some parts of the embodiments of this application.

The embodiments in this specification are all described in a progressive manner, for same or similar parts in the embodiments, refer to these embodiments, and each embodiment focuses on a difference from other embodiments. Especially, apparatus and device embodiments are basically similar to the method embodiments, and therefore are described briefly. For related parts, refer to partial descriptions in the method embodiments. The described device and apparatus embodiments are merely examples. The modules described as separate parts may or may not be physically separate, and parts displayed as modules may or may not be physical modules, may be located at one position, or may be distributed on a plurality of network units. Some or all of the modules may be selected based on an actual requirement to achieve the objectives of the solutions of the embodiments. A person of ordinary skill in the art may understand and implement the embodiments without creative efforts.

The foregoing descriptions are merely example implementations of this application, but are not intended to limit the protection scope of this application. It should be noted that a person of ordinary skill in the art may make some improvements and polishing without departing from this application and the improvements and polishing shall fall within the protection scope of this application.

What is claimed is:

1. A composite device comprising:
a second communication entity that does not comprise any communications interface configured to directly communicate with an external device; and
a first communication entity coupled to the second communication entity, wherein the first communication entity is a leader unit comprising a communications interface configured to directly communicate with the external device, wherein the composite device comprises a router, a switch, or a packet transport network (PTN) device, and wherein the first communication entity is configured to:
obtain first measurement information of the second communication entity;
perform, based on the first measurement information, trustworthiness attestation on the second communication entity to obtain a first attestation result; and
send the first attestation result to a remote attestation device.

2. The composite device of claim 1, wherein the first measurement information comprises a first platform configuration register (PCR) value and a PCR reference value.

3. The composite device of claim 1, wherein the first measurement information comprises:
a second platform configuration register (PCR) value from the second communication entity;
a first measurement log from the second communication entity, wherein the first measurement log comprises a first baseline value from the second communication entity and information about a process of extending the first baseline value to obtain the second PCR value; and
a second baseline value configured to check the first baseline value, wherein the second baseline value is a trusted baseline value of the second communication entity.

4. The composite device of claim 1, further comprising a third communication entity coupled to the first communication entity, wherein the first communication entity is further configured to:
obtain second measurement information of the third communication entity; and
send the second measurement information to the remote attestation device.

5. The composite device of claim 1, wherein before sending the first attestation result, the first communication entity is further configured to receive, from the remote attestation device, a first measurement request message requesting the first communication entity to perform the trustworthiness attestation on the composite device.

6. The composite device of claim 1, wherein the first communication entity is further configured to send second measurement information of the first communication entity to the remote attestation device.

7. The composite device of claim 1, wherein the first communication entity is further configured to:
send a mode negotiation request message to the remote attestation device;
receive a mode negotiation response message from the remote attestation device in response to the mode negotiation request message; and
determine a remote attestation mode based on the mode negotiation response message.

8. The composite device of claim 7, wherein the remote attestation mode is a proxy mode, and wherein, in the proxy mode, the first communication entity is further configured to perform the trustworthiness attestation on all communication entities in the composite device comprising trusted computing base (TCB) modules except the first communication entity.

9. The composite device of claim 7, wherein the remote attestation mode is a mixed attestation mode, and wherein, in the mixed attestation mode, the first communication entity is further configured to perform the trustworthiness attestation on the second communication entity.

10. The composite device of claim 1, wherein the first communication entity is further configured to:
send, to the remote attestation device, a first request message requesting an attestation permission from the remote attestation device, wherein the attestation permission indicates a set of communication entities on which the first communication entity performs the trustworthiness attestation, and wherein the set comprises the second communication entity; and
receive, from the remote attestation device in response to the first request message, a first response message indicating the attestation permission.

11. The composite device of claim 1, wherein the first communication entity is further configured to periodically perform the trustworthiness attestation on the second communication entity.

12. The composite device of claim 1, wherein the first communication entity is further configured to further perform the trustworthiness attestation on the second communication entity based on triggering of an event.

13. The composite device of claim 12, wherein the event comprises one of:
an active/standby switchover of the first communication entity;
a state change of the second communication entity; or
a configuration command.

14. The composite device of claim 1, wherein the first communication entity is further configured to:
obtain second measurement information corresponding to an incremental change when the second communication entity has the incremental change; and
further perform the trustworthiness attestation on the second communication entity based on the second measurement information.

15. A remote attestation device comprising:
a first communications interface; and
one or more processors coupled to the first communications interface and configured to:
receive, from a first communication entity of a composite device and using the first communications interface, a first message carrying a first attestation result of first trustworthiness attestation on a second communication entity of the composite device, wherein the a first communication entity is a leader unit comprising a second communications interface configured to directly communicate with an external device, wherein the second communication entity does not comprise any communications interface configured to directly communicate with the external device, and wherein the composite device comprises a router, a switch, or a packet transport network (PTN) device; and
obtain the first attestation result from the first message.

16. The remote attestation device of claim 15, wherein the one or more processors are further configured to:
receive, from the first communication entity and using the first communications interface, a second message carrying first measurement information of the first communication entity; and
perform second trustworthiness attestation on the first communication entity based on the first measurement information to obtain a second attestation result.

17. The remote attestation device of claim 15, wherein the one or more processors are further configured to check the first attestation result to obtain a third attestation result.

18. The remote attestation device of claim 15, wherein the one or more processors are further configured to:
receive, using the first communications interface, a mode negotiation request message from the first communication entity;
determine a remote attestation mode based on the mode negotiation request message; and
send, using the first communications interface and to the first communication entity, a mode negotiation response message carrying the remote attestation mode, wherein the mode negotiation response message instructs the first communication entity to perform remote attestation in the remote attestation mode.

19. A first communication entity in a composite device and comprising:
a memory configured to store instructions;
a communications interface configured to directly communicate with an external device; and
one or more processors coupled to the memory and the communications interface, wherein the instructions cause the one or more processors to be configured to:
obtain first measurement information of a second communication entity of the composite device, wherein the second communication entity does not comprise any communications interface configured to directly communicate with the external device, wherein the first communication entity comprises a leader unit in the composite device, and wherein the composite device comprises a router, a switch, or a packet transport network (PTN) device;
perform, based on the first measurement information, trustworthiness attestation on the second communication entity to obtain an attestation result; and
send the attestation result to a remote attestation device.

* * * * *

UNITED STATES PATENT AND TRADEMARK OFFICE
CERTIFICATE OF CORRECTION

| | | |
|---|---|---|
| PATENT NO. | : 12,113,823 B2 | Page 1 of 1 |
| APPLICATION NO. | : 17/720848 | |
| DATED | : October 8, 2024 | |
| INVENTOR(S) | : Junli Hu et al. | |

It is certified that error appears in the above-identified patent and that said Letters Patent is hereby corrected as shown below:

On the Title Page

Page 2, item (56) References, Other Publications, add: "Ge Cheng, "Unattended Remote Attestation Delegation for Grid Computing," IEEE International Conference on Networking Architecture, and Storage, 2009, 4 pages."

Signed and Sealed this
Nineteenth Day of November, 2024

Katherine Kelly Vidal
*Director of the United States Patent and Trademark Office*